(12) United States Patent
Tie et al.

(10) Patent No.: US 12,375,483 B2
(45) Date of Patent: Jul. 29, 2025

(54) IDENTITY AUTHENTICATION METHOD AND APPARATUS, DEVICE, CHIP, STORAGE MEDIUM, AND PROGRAM

(71) Applicant: CHINA IWNCOMM CO., LTD., Shaanxi (CN)

(72) Inventors: Manxia Tie, Xi'an (CN); Jun Cao, Xi'an (CN); Xiaolong Lai, Xi'an (CN); Xiaorong Zhao, Xi'an (CN); Qin Li, Xi'an (CN); Bianling Zhang, Xi'an (CN); Yuehui Wang, Xi'an (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 159 days.

(21) Appl. No.: 18/259,308

(22) PCT Filed: Dec. 21, 2021

(86) PCT No.: PCT/CN2021/140097
§ 371 (c)(1),
(2) Date: Jun. 26, 2023

(87) PCT Pub. No.: WO2022/135398
PCT Pub. Date: Jun. 30, 2022

(65) Prior Publication Data
US 2024/0064025 A1 Feb. 22, 2024

(30) Foreign Application Priority Data
Dec. 26, 2020 (CN) .......................... 202011569219.5

(51) Int. Cl.
*H04L 29/06* (2006.01)
*H04L 9/08* (2006.01)
(Continued)

(52) U.S. Cl.
CPC ........ *H04L 63/0876* (2013.01); *H04L 9/0825* (2013.01); *H04L 9/3247* (2013.01); *H04L 9/3263* (2013.01)

(58) Field of Classification Search
CPC .................................................... H04L 63/0876
See application file for complete search history.

(56) References Cited

U.S. PATENT DOCUMENTS

| 8,312,262 B2 | 11/2012 | Mauro, II |
| 8,892,869 B2 | 11/2014 | Grebovich |

(Continued)

FOREIGN PATENT DOCUMENTS

| CN | 101364875 A | 2/2009 |
| CN | 101631113 A | 1/2010 |

(Continued)

OTHER PUBLICATIONS

International Search Report in the international application No. PCT/CN2021/140073, mailed on Mar. 1, 2022, 2 pages.
(Continued)

*Primary Examiner* — Bradley W Holder
(74) *Attorney, Agent, or Firm* — Finch & Maloney PLLC

(57) ABSTRACT

An identity authentication method and apparatus, a device, a chip, a storage medium, and a program. Confidentiality processing is performed on identity information of a requesting device and an authentication access controller, such that the identity information of the requesting device and the authentication access controller is prevented from being exposed during a transmission process, thereby ensuring that an attacker cannot obtain private and sensitive information of the requesting device and the authentication access controller. In addition, by means of involving an authentication server, mutual identity authentication of the requesting device and the authentication access controller is realized (Continued)

while the confidentiality of information related to an entity identity is ensured.

21 Claims, 12 Drawing Sheets

(51) Int. Cl.
*H04L 9/32* (2006.01)
*H04L 9/40* (2022.01)

(56) References Cited

U.S. PATENT DOCUMENTS

| | | | |
|---|---|---|---|
| 9,450,944 | B1 | 9/2016 | Sousley |
| 2005/0021968 | A1 | 1/2005 | Zimmer |
| 2005/0283608 | A1 | 12/2005 | Halcrow |
| 2011/0055561 | A1 | 3/2011 | Porsch et al. |
| 2013/0205374 | A1 | 8/2013 | Du |
| 2013/0318588 | A1* | 11/2013 | Metzger ............... G06F 21/313 726/7 |
| 2015/0244695 | A1* | 8/2015 | Lin ....................... H04L 63/123 713/155 |
| 2017/0063843 | A1 | 3/2017 | Vijayasankar et al. |
| 2017/0085557 | A1 | 3/2017 | Hu et al. |
| 2017/0155629 | A1* | 6/2017 | Gomi ................... H04W 12/069 |
| 2018/0124597 | A1 | 5/2018 | Malthankar et al. |
| 2018/0181739 | A1 | 6/2018 | Zhong et al. |
| 2018/0278625 | A1 | 9/2018 | Cammarota et al. |
| 2018/0302395 | A1 | 10/2018 | Tse et al. |
| 2018/0375663 | A1 | 12/2018 | Le Saint |
| 2019/0158468 | A1 | 5/2019 | Duong |
| 2020/0250670 | A1* | 8/2020 | Capuzzello ........... G06Q 20/401 |

FOREIGN PATENT DOCUMENTS

| | | | |
|---|---|---|---|
| CN | 101631114 | A | 1/2010 |
| CN | 101635709 | A | 1/2010 |
| CN | 101958890 | A | 1/2011 |
| CN | 104009889 | A | 8/2014 |
| CN | 107948189 | A | 4/2018 |
| CN | 109787988 | A | 5/2019 |
| CN | 111314072 | A | 6/2020 |
| JP | 2006350905 | A | 12/2006 |
| JP | 2013544052 | A | 12/2013 |
| JP | 2018530269 | A | 10/2018 |
| RU | 2733828 | C1 | 10/2020 |
| WO | 2011020279 | A1 | 2/2011 |

OTHER PUBLICATIONS

English translation of the Written Opinion of the International Search Authority in the international application No. PCT/CN2021/140073, mailed on Mar. 1, 2022, 4 pages.
Supplementary European Search Report in the European application No. 21909387.9, mailed on Apr. 26, 2024, 6 pages.
(National Information Security Standardization Technical Committee), "Information security technology-Entity authentication involving a trusted third party and access architecture specification", (National Standards of the People's Republic of China GB/T 28455-2012), Jun. 29, 2012(Jun. 29, 2012), full text, pp. 1-230.
Li Ming et al., "The Implementation and Application of Trusted Connect Architecture", (Journal of Information Security Research), Apr. 30, 2017, entire document.
International Search Report in the international application No. PCT/CN2021/140097, mailed on Mar. 1, 2022, 3 pages.
English translation of the Written Opinion of the International Search Authority in the international application No. PCT/CN2021/140097, mailed on Mar. 1, 2022, 4 pages.
Supplementary European Search Report in the European application No. 21909394.5, mailed on May 27, 2024, 6 pages.
Notice of Allowance of the Japanese application No. 2023-539136, issued on Jul. 9, 2024,5 pages with English translation.
Notice of Allowance of the Russian application No. 2023119361, issued on Sep. 27, 2023, 46 pages with English translation.
International Search Report in the international application No. PCT/CN2021/140078, mailed on Mar. 22, 2022, 2 pages.
English translation of the Written Opinion of the International Search Authority in the international application No. PCT/CN2021/140078, mailed on Mar. 22, 2022, 3 pages.
Supplementary European Search Report in the European application No. 21909388.7, mailed on Apr. 26, 2024, 6 pages.
Notice of Allowance of the U.S. Appl. No. 18/259,307, issued on Mar. 26, 2025, 28 pages.
Non-Final Office Action of the U.S. Appl. No. 18/259,295, issued on Apr. 9, 2025, 21 pages.

* cited by examiner

IDENTITY AUTHENTICATION METHOD AND APPARATUS, DEVICE, CHIP, STORAGE MEDIUM, AND PROGRAM

CROSS-REFERENCE TO RELATED APPLICATION

This application claims priority to Chinese Patent Application No. 202011569219.5, filed on Dec. 26, 2020 and entitled "IDENTITY AUTHENTICATION METHOD AND APPARATUS, DEVICE. CHIP, STORAGE MEDIUM, AND PROGRAM", the disclosure of which is hereby incorporated by reference in its entirety.

TECHNICAL FIELD

The present disclosure relates to the technical field of network communication security, and in particular, to an identity authentication method and apparatus, and a device, a chip, a storage medium and a program.

BACKGROUND

In a communication network, a Requester (REQ) may access a network through an Authentication Access Controller (AAC). In some cases requiring high security, the AAC needs to perform authentication on the identity of the REQ, and the REQ also needs to perform authentication on the identity of the AAC, so as to ensure that the REQ accessing the network belongs to a legitimate user, and the network to which the REQ accesses belongs to a legitimate network. In addition, for point-to-point transmission in a blockchain technology, a trust relationship also needs to be established between different nodes, such that it is also very important for identity authentication of the nodes.

During the process of performing Mutual Identity Authentication (MIA) on the REQ and the AAC, both parties need to provide their own identity information for identity authentication. However, such identity information usually carries private and sensitive information, such as ID numbers, home addresses, bank card information, geographical location information, and affiliated institution information. In addition, during a practical application process, such identity information is generally included in a physical digital certificate, and the digital certificate is used as a physical identity certificate.

If, during MIA of the REQ and the AAC, the identity information of the REQ and the AAC is intercepted by an attacker for illegal use, a great security risk is caused to the AAC, the REQ and the network.

SUMMARY

The present disclosure provides an identity authentication method and apparatus, and a device, a chip, a storage medium and a program. By means of involving an authentication server, MIA between the REQ and the AAC is achieved while the confidentiality of entity identity related information is guaranteed, such that the foundation that only a legitimate user can communicate with a legitimate network is laid.

According to a first aspect, an embodiment of the present disclosure provides an identity authentication method. The method includes the following operations.

An AAC acquires an identity ciphertext message sent by an REQ. The identity ciphertext message includes identity information ciphertext of the REQ, and the identity information ciphertext of the REQ is generated by using a public key of an encryption certificate to encrypt to-be-encrypted data including a digital certificate of the REQ and a first protection nonce.

The AAC sends a first authentication request message to a first Authentication Server (AS) trusted by the AAC. The first authentication request message includes identity information ciphertext of the REQ and identity information ciphertext of the AAC, and the identity information ciphertext of the AAC is generated by using the public key of the encryption certificate to encrypt to-be-encrypted data including a digital certificate of the AAC and a second protection nonce.

The AAC receives a first authentication response message sent by the first AS. The first authentication response message includes first authentication result information ciphertext, a first digital signature, second authentication result information ciphertext and a second digital signature, the first authentication result information ciphertext is generated by using the second protection nonce to encrypt information including first authentication result information, the first authentication result information includes a first verification result for the digital certificate of the AAC, the first digital signature is a digital signature generated by performing, by a second AS trusted by the REQ, calculation on to-be-signed data including the first authentication result information ciphertext, the second authentication result information ciphertext is generated by using the first protection nonce to encrypt information including second authentication result information, the second authentication result information includes a second verification result for the digital certificate of the REQ, and the second digital signature is a digital signature generated by performing, by the first AS, calculation on to-be-signed data including the second authentication result information ciphertext.

The AAC verifies the second digital signature by using a public key of the first AS; when the verification of the second digital signature is successful, the AAC sends a third authentication response message to the REQ. The third authentication response message includes authentication result information ciphertext, and the authentication result information ciphertext is generated by using a message encryption key to encrypt to-be-encrypted data including the first authentication result information ciphertext, the first digital signature and the second protection nonce.

The REQ decrypts the authentication result information ciphertext by using the message encryption key, so as to obtain the first authentication result information ciphertext, the first digital signature and the second protection nonce.

The REQ verifies the first digital signature by using a public key of the second AS, and if the verification is successful, the REQ decrypts the first authentication result information ciphertext by using the second protection nonce, so as to obtain the first authentication result information, determines an identity authentication result of the AAC according to the first verification result in the first authentication result information, and when the REQ determines that the identity authentication result of the AAC is legal, sends a fourth authentication response message to the AAC.

Or, the REQ verifies the first digital signature by using the public key of the second AS, and if the verification is successful, the REQ sends the fourth authentication response message to the AAC, decrypts the first authentication result information ciphertext by using the second protection nonce, so as to obtain the first authentication result information, and determines the identity authentication result of the AAC according to the first verification result in the first authentication result information.

Or, the REQ verifies the first digital signature by using the public key of the second AS, if the verification of the first digital signature is successful, the REQ decrypts the first authentication result information ciphertext by using the second protection nonce, so as to obtain the first authentication result information, determines the identity authentication result of the AAC according to the first verification result in the first authentication result information, and the REQ sends the fourth authentication response message to the AAC.

The fourth authentication response message includes first protection nonce ciphertext, and the first protection nonce ciphertext is obtained by using the message encryption key to encrypt information including the first protection nonce.

After receiving the fourth authentication response message, the AAC decrypts the first protection nonce ciphertext by using the message encryption key, so as to obtain the first protection nonce, decrypts the second authentication result information ciphertext by using the first protection nonce, so as to obtain the second authentication result information, and determines an identity authentication result of the REQ according to the second verification result in the second authentication result information.

According to a second aspect, an embodiment of the present disclosure provides an AAC. The AAC includes an acquisition portion, a first sending portion, a first receiving portion, a first verification portion, a second sending portion, a second receiving portion, a decryption portion, and a first determination portion.

The acquisition portion is configured to acquire an identity ciphertext message sent by an REQ. The identity ciphertext message includes identity information ciphertext of the REQ, and the identity information ciphertext of the REQ is generated by using a public key of an encryption certificate to encrypt to-be-encrypted data including a digital certificate of the REQ and a first protection nonce.

The first sending portion is configured to send a first authentication request message to a first AS trusted by the AAC. The first authentication request message includes identity information ciphertext of the REQ and identity information ciphertext of the AAC, and the identity information ciphertext of the AAC is generated by using the public key of the encryption certificate to encrypt to-be-encrypted data including a digital certificate of the AAC and a second protection nonce.

The first receiving portion is configured to receive a first authentication response message sent by the first AS. The first authentication response message includes first authentication result information ciphertext, a first digital signature, second authentication result information ciphertext and a second digital signature, the first authentication result information ciphertext is generated by using the second protection nonce to encrypt information including first authentication result information, the first authentication result information includes a first verification result for the digital certificate of the AAC, the first digital signature is generated by performing, by a second AS, calculation on to-be-signed data including the first authentication result information ciphertext, the second authentication result information ciphertext is generated by using the first protection nonce to encrypt information including second authentication result information, the second authentication result information includes a second verification result for the digital certificate of the REQ, and the second digital signature is generated by performing, by the first AS, calculation on to-be-signed data including the second authentication result information ciphertext.

The first verification portion is configured to verify the second digital signature by using a public key of a first AS.

The second sending portion is configured to, when the verification of the second digital signature is successful, send a third authentication response message to the REQ. The third authentication response message includes authentication result information ciphertext, and the authentication result information ciphertext is generated by using a message encryption key to encrypt to-be-encrypted data including the first authentication result information ciphertext, the first digital signature and the second protection nonce.

The second receiving portion is configured to receive a fourth authentication response message sent by the REQ. The fourth authentication response message includes first protection nonce ciphertext, and the first protection nonce ciphertext is obtained by using the message encryption key to encrypt information including the first protection nonce ciphertext.

The decryption portion is configured to decrypt the first protection nonce ciphertext by using the message encryption key, so as to obtain the first protection nonce, and decrypt the second authentication result information ciphertext by using the first protection nonce, so as to obtain the second authentication result information.

The first determination portion is configured to determine an identity authentication result of the REQ according to the second verification result in the second authentication result information.

According to a third aspect, an embodiment of the present disclosure provides an REQ. The REQ includes a first sending portion, a first receiving portion, a first decryption portion, and a first verification portion.

The first sending portion is configured to send an identity ciphertext message to an AAC. The identity ciphertext message includes identity information ciphertext of the REQ, and the identity information ciphertext of the REQ is generated by using a public key of an encryption certificate to encrypt to-be-encrypted data including a digital certificate of the REQ and a first protection nonce.

The first receiving portion is configured to receive a third authentication response message sent by the AAC. The third authentication response message includes authentication result information ciphertext; the authentication result information ciphertext is generated by using a message encryption key to encrypt to-be-encrypted data including first authentication result information ciphertext, a first digital signature and a second protection nonce; the first authentication result information ciphertext is generated by using the second protection nonce to encrypt information including first authentication result information, the first authentication result information includes a first verification result for a digital certificate of the AAC, and the first digital signature is a digital signature generated by performing, by a second AS trusted by the REQ, calculation on to-be-signed data including the first authentication result information ciphertext.

The first decryption portion is configured to decrypt the authentication result information ciphertext by using the message encryption key, so as to obtain the first authentication result information ciphertext, the first digital signature and the second protection nonce.

The first verification portion is configured to verify the first digital signature by using a public key of the second AS, wherein if the verification is successful, the first decryption portion decrypts the first authentication result information ciphertext by using the second protection nonce, so as to obtain the first authentication result information, a first determination portion determines an identity authentication result of the AAC according to the first verification result in the first authentication result information, and when the first determination portion determines that the identity authentication result of the AAC is legal, a second sending portion sends a fourth authentication response message to the AAC.

Or, the first verification portion is configured to verify the first digital signature by using the public key of the second AS. If the verification is successful, the second sending portion sends the fourth authentication response message to the AAC, the first decryption portion decrypts the first authentication result information ciphertext by using the second protection nonce, so as to obtain the first authentication result information, and the first determination portion determines the identity authentication result of the AAC according to the first verification result in the first authentication result information.

Or, the first verification portion is configured to verify the first digital signature by using the public key of the second AS. If the verification of the first digital signature is successful, the first decryption portion decrypts the first authentication result information ciphertext by using the second protection nonce, so as to obtain the first authentication result information, the first determination portion determines the identity authentication result of the AAC according to the first verification result in the first authentication result information, and the second sending portion sends the fourth authentication response message to the AAC.

The fourth authentication response message includes first protection nonce ciphertext, and the first protection nonce ciphertext is obtained by using the message encryption key to encrypt information including the first protection nonce.

According to a fourth aspect, an embodiment of the present disclosure provides a first AS. The first AS is an AS trusted by an AAC, and includes a first receiving portion and a first sending portion.

The first receiving portion is configured to receive a first authentication request message sent by the AAC. The first authentication request message includes identity information ciphertext of the REQ and identity information ciphertext of the AAC, and the identity information ciphertext of the AAC is generated by using the public key of the encryption certificate to encrypt to-be-encrypted data including a digital certificate of the AAC and a second protection nonce, and the identity information ciphertext of the REQ is generated by using a public key of an encryption certificate to encrypt to-be-encrypted data including a digital certificate of the REQ and a first protection nonce.

The first sending portion is configured to send a first authentication response message to the AAC. The first authentication response message includes first authentication result information ciphertext, a first digital signature, second authentication result information ciphertext and a second digital signature, the first authentication result information ciphertext is generated by using the second protection nonce to encrypt information including first authentication result information, the first authentication result information includes a first verification result for the digital certificate of the AAC, the first digital signature is a digital signature generated by performing, by a second AS trusted by the REQ, calculation on to-be-signed data including the first authentication result information ciphertext, the second authentication result information ciphertext is generated by using the first protection nonce to encrypt information including second authentication result information, the second authentication result information includes a second verification result for the digital certificate of the REQ, and the second digital signature is a digital signature generated by performing, by the first AS, calculation on to-be-signed data including the second authentication result information ciphertext.

According to a fifth aspect, an embodiment of the present disclosure provides a second AS. The second AS is an AS trusted by an REQ. If a first AS trusted by an AAC and the second AS trusted by the REQ are two different ASs, the second AS includes a receiving portion, a first verification portion, a decryption portion, a second verification portion, a generation portion, and a sending portion.

The receiving portion is configured to receive a second authentication request message sent by the first AS. The second authentication request message includes first authentication result information ciphertext, identity information ciphertext of the REQ, and a third digital signature; and the third digital signature is a digital signature generated by performing, by the AS-AAC, calculation on to-be-signed data including the first authentication result information ciphertext and the identity information ciphertext of the REQ.

The first verification portion is configured to verify the third digital signature by using a public key of the first AS.

The acquisition portion is configured to, when the verification of the third digital signature is successful, decrypt the identity information ciphertext of the REQ using the private key corresponding to the encryption certificate, so as to obtain the digital certificate of the REQ and a first protection nonce.

The second verification portion is configured to perform legality verification on the digital certificate of the REQ, so as to obtain a second verification result.

The generation portion is configured to generate second authentication result information according to information including the second verification result, generate the second authentication result information ciphertext by using the first protection nonce to encrypt the information including the second authentication result information, perform calculation on the to-be-signed data including the first authentication result information ciphertext to generate the first digital signature, and perform calculation on the to-be-signed data including the second authentication result information ciphertext to generate a fourth digital signature.

The sending portion is configured to send a second authentication response message to the first AS. The second authentication response message includes the first authentication result information ciphertext, the first digital signature, the second authentication result information ciphertext, and the fourth digital signature.

According to a sixth aspect, an embodiment of the present disclosure provides an AAC. The AAC includes a processor and a memory. The memory is configured to store a computer program; and the processor is configured to call and run the computer program stored in the memory, so as to perform steps performed by the AAC in the identity authentication method as described in the first aspect.

According to a seventh aspect, an embodiment of the present disclosure provides an REQ. The REQ includes a processor and a memory. The memory is configured to store a computer program; and the processor is configured to call and run the computer program stored in the memory, so as to perform steps performed by the REQ in the identity authentication method as described in the first aspect.

According to an eighth aspect, an embodiment of the present disclosure provides a first AS. The first AS is an AS trusted by an AAC, and includes a processor and a memory. The memory is configured to store a computer program; and the processor is configured to call and run the computer program stored in the memory, so as to perform steps performed by the first AS in the identity authentication method as described in the first aspect.

According to a ninth aspect, an embodiment of the present disclosure provides a second AS. The second AS is an AS trusted by an REQ. If a first AS trusted by an AAC and the second AS trusted by the REQ are two different ASs, the second AS includes a processor and a memory. The memory is configured to store a computer program; and the processor is configured to call and run the computer program stored in the memory, so as to perform steps performed by the second AS in the identity authentication method as described in the first aspect.

According to a tenth aspect, an embodiment of the present disclosure provides a chip. The chip includes: a processor, configured to call and run a computer program from a memory, to enable an AAC having the chip mounted to perform steps performed by the AAC in the identity authentication method as described in the first aspect.

Or an REQ having the chip mounted is enabled to perform steps performed by the REQ in the identity authentication method as described in the first aspect.

Or a first AS having the chip mounted is enabled to perform steps performed by the first AS in the identity authentication method as described in the first aspect.

Or a second AS having the chip mounted is enabled to perform steps performed by the second AS in the identity authentication method as described in the first aspect.

According to an eleventh aspect, an embodiment of the present disclosure provides a computer storage medium. The computer storage medium is configured to store a computer program. The computer program enables an AAC to perform steps performed by the AAC in the identity authentication method as described in the first aspect.

Or, the computer program enables an REQ having the chip mounted to perform steps performed by the REQ in the identity authentication method as described in the first aspect.

Or, the computer program enables a first AS having the chip mounted to perform steps performed by the AS-AAC in the identity authentication method as described in the first aspect.

Or, the computer program enables a second AS having the chip mounted to perform steps performed by the second AS in the identity authentication method as described in the first aspect.

According to a twelfth aspect, an embodiment of the present disclosure provides a computer program. The computer program enables an AAC to perform steps performed by the AAC in the identity authentication method as described in the first aspect.

Or, the computer program enables an REQ having the chip mounted to perform steps performed by the REQ in the identity authentication method as described in the first aspect.

Or, the computer program enables a first AS having the chip mounted to perform steps performed by the first AS in the identity authentication method as described in the first aspect.

Or, the computer program enables a second AS having the chip mounted to perform steps performed by the second AS in the identity authentication method as described in the first aspect.

From the above technical solutions, it can be learned that, by means of performing confidential processing on identify information of the REQ and the AAC, the identify information of the REQ and the AAC may be prevented from being exposed during a transmission process. In addition, when the first verification result of the digital certificate of the AAC and the second verification result of the digital certificate of the REQ are transmitted between the first AS and the AAC, and between the AAC and the REQ, the first verification result and the second verification result may be prevented from being exposed during transmission by performing confidential processing on the first verification result and the second verification result. Therefore, during the process that the REQ accesses a network through the AAC, it is ensured that the attacker cannot obtain private and sensitive information. Moreover, by means of involving an AS, real-time MIA between the REQ and the AAC is achieved while the confidentiality of entity identity related information is guaranteed, such that the foundation that only a legitimate user can communicate with a legitimate network is laid.

In order to make the above purposes, features and advantages of the present disclosure more obvious and easier to understand, detailed descriptions of preferred embodiments are made below with reference to the drawings.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings in the following descriptions are merely some embodiments of the present disclosure. Other drawings can be obtained from those skilled in the art according to these drawings without any creative work.

DETAILED DESCRIPTION

Figure 1:
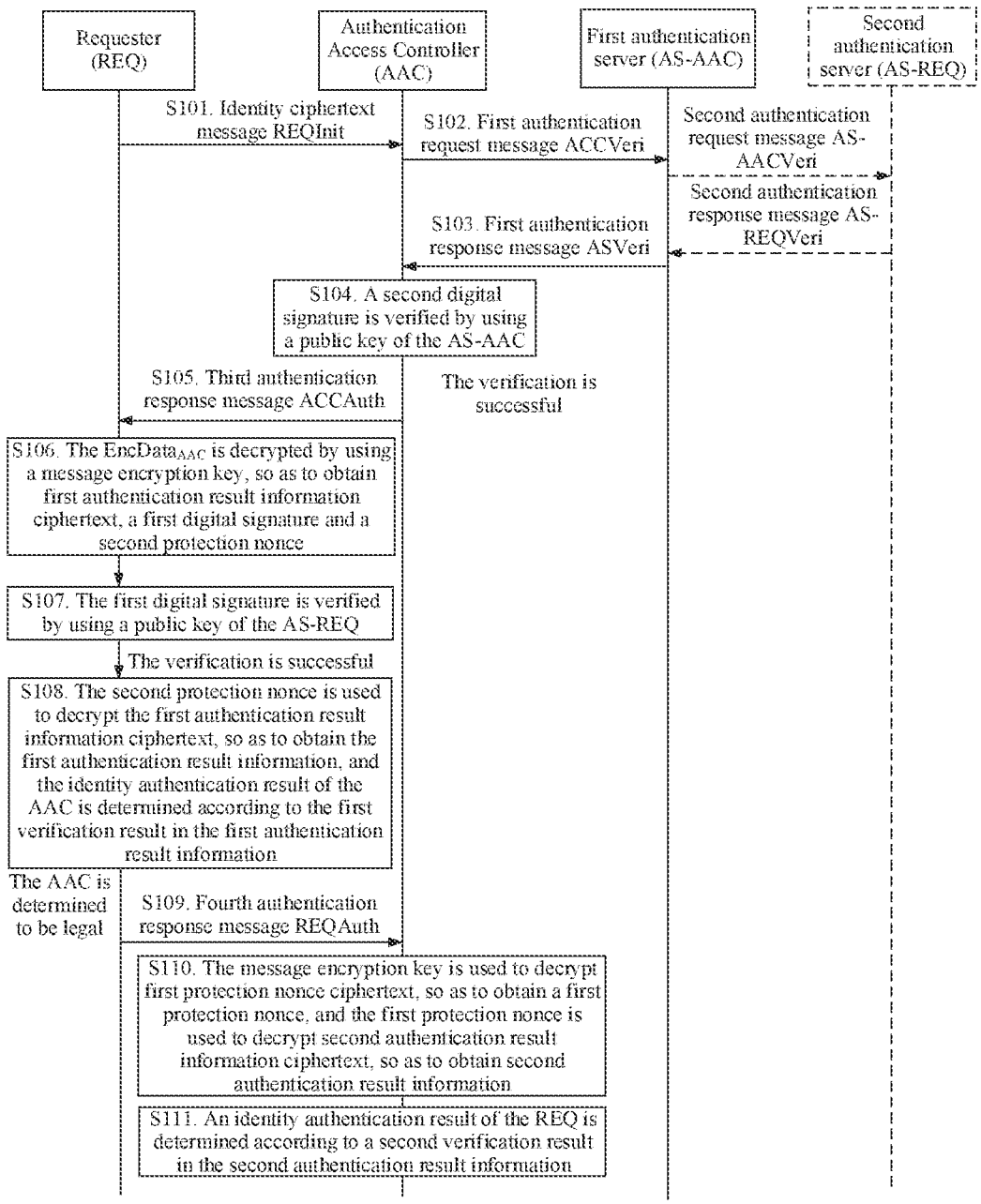
FIG. 1 is a schematic diagram of an identity authentication method according to an embodiment of the present disclosure.

The technical solutions in the embodiments of the present disclosure will be described below with reference to the drawings in the embodiments of the present disclosure. It is apparent that the described embodiments are only part of the embodiments of the present disclosure, not all the embodiments. All other embodiments obtained by those of ordinary skill in the art on the basis of the embodiments in the present disclosure without creative work all fall within the scope of protection of the present disclosure.

The technical solutions described in the embodiments of the present disclosure may be arbitrarily combined without conflict.

In a communication network, an REQ may access a network through an AAC. In order to ensure that the REQ accessing the network belongs to a legitimate user, the AAC needs to perform identity authentication on the REQ. Likewise, in order to ensure that the network which is accessed by the REQ belongs to a legitimate network, the REQ also needs to perform identity authentication on the AAC.

By using a current wireless communication and mobile communication scenario as an example, in a scenario that the REQ accesses a wireless network through the AAC, the REQ may be a terminal device such as a mobile phone, a Personal Digital Assistant (PDA) and a tablet computer; and the AAC may be a network-side device such as a wireless access point and a wireless router. In a scenario that the REQ accesses a wired network through the AAC, the REQ may be the terminal device such as a desktop computer and a notebook computer, and the AAC may be the network-side device such as a switch and a router. In a scenario that the REQ accesses a 4th/5th Generation mobile communication technology (4G/5G) network through the AAC, the REQ may be the terminal device such as the mobile phone and the tablet computer, and the AAC may be the network-side device such as a base station. Definitely, the present disclosure is also suitable for various data communication scenarios such as other wired networks and short-range communication networks.

However, the identity information of the REQ and the AAC may generally be included in a physical digital certificate, and usually carries private and sensitive information. If, during MIA of the REQ and the AAC, the identity information of the REQ and the AAC is intercepted by an attacker for illegal use, a great security risk is caused to the AAC, the REQ and the network.

In order to solve the above technical problems, an embodiment of the present disclosure provides an identity authentication method. An AAC acquires an identity ciphertext message sent by an REQ. The identity ciphertext message includes identity information ciphertext of the REQ, and the identity information ciphertext of the REQ is generated by using a public key of an encryption certificate to encrypt to-be-encrypted data including a digital certificate of the REQ and a first protection nonce. Therefore, the security of the transmission of the identity information of the REQ between the REQ and the AAC is guaranteed. Then, the AAC sends a first authentication request message to a first Authentication Server (AS) trusted by the AAC. The first authentication request message includes identity information ciphertext of the REQ and identity information ciphertext of the AAC, and the identity information ciphertext of the AAC is generated by using the public key of the encryption certificate to encrypt to-be-encrypted data including a digital certificate of the AAC and a second protection nonce. Therefore, the security of the transmission of the identity information of the REQ and the identity information of the AAC between the AAC and the first AS is guaranteed. The AAC receives a first authentication response message sent by the first AS. The first authentication response message includes first authentication result information ciphertext, a first digital signature, second authentication result information ciphertext and a second digital signature, the first authentication result information ciphertext is generated by using the second protection nonce to encrypt information including first authentication result information, the first authentication result information includes a first verification result for the digital certificate of the AAC, the first digital signature is a digital signature generated by performing, by a second AS trusted by the REQ, calculation on to-be-signed data including the first authentication result information ciphertext, the second authentication result information ciphertext is generated by using the first protection nonce to encrypt information including second authentication result information, the second authentication result information includes a second verification result for the digital certificate of the REQ, and the second digital signature is a digital signature generated by performing, by the first AS, calculation on to-be-signed data including the second authentication result information ciphertext. Therefore, the security of the transmission of the verification results of the respective digital certificates of the AAC and the REQ is guaranteed. After receiving a first authentication response message, the AAC verifies a second digital signature by using the public key of the first AS, and after the verification is successful, sends a third authentication response message to the REQ; and the third authentication response message includes authentication result information ciphertext; the authentication result information ciphertext is generated by using a message encryption key to encrypt to-be-encrypted data including first authentication result information ciphertext, a first digital signature and a second protection nonce. The REQ decrypts the authentication result information ciphertext by using the message encryption key, so as to obtain the first authentication result information ciphertext, the first digital signature and the second protection nonce, verifies the first digital signature by using the public key of the second AS, after the verification is successful, decrypts the first authentication result information ciphertext by using the second protection nonce, so as to obtain the first authentication result information, and determines an identity authentication result of the AAC according to the first verification result in the first authentication result information. The REQ sends a fourth authentication response message to the AAC; the fourth authentication response message includes first protection nonce ciphertext; and the first protection nonce ciphertext is obtained by using the message encryption key to encrypt information including the first protection nonce. The AAC decrypts the first protection nonce ciphertext by using a message encryption key, so as to obtain the first protection nonce, decrypts the second authentication result information ciphertext by using the first protection nonce, so as to obtain the second authentication result information, and determines the identity authentication result of the REQ according to the second verification result in the second authentication result information.

The first authentication result information mentioned in this embodiment of the present disclosure is obtained by performing, by the AS-AAC trusted by the AAC, legality verification on the digital certificate of the AAC; the second authentication result information is obtained by performing, by the AS-REQ trusted by the REQ, legality verification on the digital certificate of the REQ. The AS-AAC and the AS-REQ may be two independent servers for identity authentication, or the same server for identity authentication. The above are only examples of the REQ, the AAC and AS, and shall not be understood as limitations to the REQ, the AAC and the AS. In other possible implementations of the embodiments of the present disclosure, the REQ, the AAC and the AS may be other devices.

The identity authentication method provided in the embodiments of the present disclosure is to implement MIA between the REQ and the AAC.

For ease of introduction, in the embodiments of the present disclosure, the identity authentication method of the present disclosure is introduced by using the REQ, the AAC and the AS as examples.

The AS trusted by the AAC is called the AS-AAC, and the AS trusted by the REQ is called the AS-REQ. The AS-AAC has the capability of verifying the legality of the digital certificate of the AAC; and the AS-AAC holds the digital certificate complying with regulations of ISO/IEC 9594-8/ITU X.509, other standards or other technical systems, and a private key corresponding to the digital certificate. The AS-REQ has the capability of verifying the legality of the digital certificate of the REQ; and the AS-REQ holds the digital certificate complying with regulations of ISO/IEC 9594-8/ITU X.509, other standards or other technical systems, and a private key corresponding to the digital certificate. The AS-AAC and the AS-REQ have the capability of transmitting the digital certificate to other ASs for verification, and also have the capability of transmitting verification result information of the digital certificate to other ASs. When the AS-AAC is different from the AS-REQ, the AS-AAC and the AS-REQ are trusted with each other, and know each other's digital certificate or the public key in the digital certificate. A Certificate Sever-Decrypt (CS-DEC) holds an encryption certificate complying with regulations of ISO/IEC 9594-8/ITU X.509, other standards or other technical systems, and a private key corresponding to the encryption certificate. There may be one or more encryption certificates. The CS-DEC may be an independent server, or may reside in the AS-AAC.

The REQ may be an endpoint involved in the identity authentication process, establishes a connection with the AAC, so as to provide services, and accesses the AS through the AAC. The REQ holds the digital certificate complying with regulations of ISO/IEC 9594-8/ITU X.509, other standards or other technical systems, and a private key corresponding to the digital certificate, knows the digital certificate of the AS-REQ or the public key in the digital certificate, and knows the encryption certificate of the CS-DEC or the public key in the encryption certificate. The AAC may be the other endpoint involved in the identity authentication process, establishes a connection with the REQ, so as to provide services, communicates with the REQ, and may directly access the AS-AAC. The AAC holds the digital certificate complying with regulations of ISO/IEC 9594-8/ITU X.509, other standards or other technical systems, and a private key corresponding to the digital certificate, knows the digital certificate of the AS-AAC or the public key in the digital certificate, and knows the encryption certificate of the CS-DEC or the public key in the encryption certificate.

In combination with FIG. 1, the identity authentication method provided in the embodiments of the present disclosure is described below. The method includes the following steps.

At S101, the AAC acquires the REQInit sent by the REQ.

The REQInit includes identity information ciphertext $EncPub_{AS\_REQ}$ of the REQ. The $EncPub_{AS\_REQ}$ is generated by using, by the REQ, a public key of an encryption certificate to encrypt to-be-encrypted data including the digital certificate $Cert_{REQ}$ of the REQ and a first protection nonce. Therefore, during the transmission of the identity information between the REQ and the AAC, the identity information of the REQ is subjected to confidential processing, so as to prevent the identity information of the REQ from being exposed during network accessing. In the present disclosure, an object to be encrypted is called the to-be-encrypted data.

At S102, the AAC sends an AACVeri to an AS-AAC.

The AACVeri includes the $EncPub_{AS\_REQ}$ and identity information ciphertext $EncPub_{AS\_AAC}$ of the AAC. The $EncPub_{AS\_AAC}$ is generated by using, by the AAC, the public key of the encryption certificate to encrypt to-be-encrypted data including the digital certificate $Cert_{AAC}$ of the AAC and a second protection nonce. Therefore, during the transmission of the identity information between the AAC and the AS-AAC, the respective identity information of the REQ and the AAC is subjected to confidential processing, so as to prevent the respective identity information of the REQ and the AAC from being exposed during transmission.

It is to be noted that, if the AS-REQ trusted by the REQ and the AS-AAC trusted by the AAC are the same AS, that is, the REQ and the AAC commonly trust the same AS, in this case, the AS commonly trusted by the REQ and the AAC may be represented by the AS-AAC (or definitely the AS-REQ). In this case, the AS-AAC (or may represented as the AS-REQ) may send the $EncPub_{AS\_REQ}$ and the $EncPub_{AS\_AAC}$ to the CS-DEC having an interaction and trust relationship with the AS-AAC for decryption, and acquire the $Cert_{REQ}$, the first protection nonce, the $Cert_{AAC}$ and the second protection nonce obtained by means of decryption. Alternatively, the CS-DEC may reside in the AS-AAC (or may represented as the AS-REQ), and the AS-AAC (or may represented as the AS-REQ) uses the private key corresponding to the encryption certificate of the CS-DEC to respectively decrypt the $EncPub_{AS\_REQ}$ and the $EncPub_{AS\_AAC}$, so as to obtain the $Cert_{REQ}$, the first protection nonce, the $Cert_{AAC}$ and the second protection nonce. The AS-AAC (or may represented as the AS-REQ) verifies the legality of the $Cert_{AAC}$, so as to obtain the first verification result, verifies the legality of the $Cert_{REQ}$, so as to obtain the second verification result, generate the first authentication result information according to the information including the first verification result, generate the second authentication result information according to the information including the second verification result, encrypt the information including the first authentication result information by using the second protection nonce, so as to generate the first authentication result information ciphertext, encrypt the information including the second authentication result information by using the first protection nonce so as to generate the second authentication result information ciphertext, perform calculation on the to-be-signed data including the first authentication result information ciphertext to generate the first digital signature $Sig_{AS\_AAC1}$ (or may represented as $Sig_{AS\_REQ1}$), perform calculation on the to-be-signed data including the second authentication result information ciphertext to generate the second digital signature $Sig_{AS\_AAC2}$ (or may represented as $Sig_{AS\_REQ2}$), and generate the first authentication response message ASVeri according to the information including the first authentication result information ciphertext, the $Sig_{AS\_AAC1}$ (or may represented as $Sig_{AS\_REQ1}$), the second authentication result information ciphertext, and the $Sig_{AS\_AAC2}$ (or may represented as $Sig_{AS\_REQ2}$).

If the AS-REQ trusted by the REQ and the AS-AAC trusted by the AAC are two different Ass, the AS-AAC may send the $EncPub_{AS\_AAC}$ to the CS-DEC having an interaction and trust relationship with the AS-AAC for decryption, and acquire the $Cert_{AAC}$ and the second protection nonce obtained by means of decryption. Alternatively, the AS-AAC first obtains the $Cert_{AAC}$ and the second protection nonce by using the private key corresponding to the encryption certificate of the CS-DEC resided in the AS-AAC to decrypt the $EncPub_{AS\_AAC}$. The AS-AAC verifies the legality of the $Cert_{AAC}$, so as to obtain the first verification result, generate the first authentication result information according to the information including the first verification result, and encrypt the information including the first authentication result information by using the second protection nonce, so as to generate the first authentication result information ciphertext. Then the AS-AAC sends the AS-AACVeri to the AS-REQ. The AS-AACVeri includes the first authentication result information ciphertext, the $EncPub_{AS\_REQ}$ and the $Sig_{AS\_AAC3}$. The $Sig_{AS\_AAC3}$ is generated by performing, by the AS-AAC, calculation on the to-be-signed data including the first authentication result information ciphertext and the $EncPub_{AS\_REQ}$. After receiving the AS-AACVeri, the AS-REQ verifies the $Sig_{AS\_AAC3}$ by using the public key of the AS-AAC. After the verification is successful, the AS-REQ may send $EncPub_{AS\_REQ}$ to the CS-DEC having an interaction and trust relationship with the AS-REQ for decryption, and acquire the $Cert_{REQ}$ and the first protection nonce obtained by means of decryption. Alternatively, the AS-REQ obtains the $Cert_{REQ}$ and the first protection nonce by using the private key corresponding to the encryption certificate of the CS-DEC resided in the AS-REQ to decrypt the $EncPub_{AS\_REQ}$. The AS-REQ verifies the legality of the $Cert_{REQ}$, so as to obtain the second verification result, generate the second authentication result information according to the information including the second verification result, encrypt the information including the second authentication result information by using the first protection nonce, so as to generate the second authentication result information ciphertext, perform calculation on the to-be-signed data including the second authentication result information ciphertext to generate the $Sig_{AS\_REQ4}$, and perform calculation on the to-be-signed data including the first authentication result information ciphertext to generate the $Sig_{AS\_REQ1}$. The AS-REQ sends a second authentication response message AS-REQVeri to the AS-AAC. The AS-REQVeri includes the first authentication result information ciphertext, the $Sig_{AS\_REQ1}$, the second authentication result information ciphertext and the $Sig_{AS\_REQ4}$. The AS-AAC verifies the $Sig_{AS\_REQ4}$ by using the public key of the AS-REQ, after the verification is successful, perform calculation on the to-be-signed data including the second authentication result information ciphertext to generate the $Sig_{AS\_AAC2}$, and generate the ASVeri according to the information including the first authentication result information ciphertext, the $Sig_{AS\_REQ1}$, the second authentication result information ciphertext, and the $Sig_{AS\_AAC2}$.

At S103, the AAC receives a first authentication response message ASVeri sent by the AS-AAC.

The ASVeri includes first authentication result information ciphertext, a first digital signature, second authentication result information ciphertext and a second digital signature.

At S104, the AAC verifies the second digital signature by using the public key of the AS-AAC.

If the verification is successful, follow-up operations are then performed.

At S105, the AAC sends a third authentication response message AACAuth to the REQ.

The AACAuth includes authentication result information ciphertext $EncData_{AAC}$. The $EncData_{AAC}$ is generated by using, by the AAC, the message encryption key by using a symmetric encryption algorithm to encrypt to-be-encrypted data including the first authentication result information ciphertext, the first digital signature and the second protection nonce. The message encryption key may be obtained by means of negotiation between the REQ and the AAC, or may be shared by the REQ and the AAC in advance. The implementation of negotiating the message encryption key between the REQ and the AAC is involved later.

At S106, the REQ decrypts the $EncData_{AAC}$ by using the message encryption key, so as to obtain the first authentication result information ciphertext, the first digital signature and the second protection nonce.

Since the $EncData_{AAC}$ is obtained by the AAC using the message encryption key to calculate by using the symmetric encryption algorithm, after receiving the $EncData_{AAC}$, the REQ may decrypt the $EncData_{AAC}$ through the symmetric encryption algorithm by using the message encryption key, so as to obtain the first authentication result information ciphertext, the first digital signature and the second protection nonce.

At S107, the REQ verifies the first digital signature by using the public key of the AS-REQ.

At S108, the REQ decrypts the first authentication result information ciphertext by using the second protection nonce, so as to obtain the first authentication result information, and determines the identity authentication result of the AAC according to the first verification result in the first authentication result information.

At S109, the REQ sends a fourth authentication response message REQAuth to the AAC.

The REQAuth includes first protection nonce ciphertext. The first protection nonce ciphertext is obtained by using, by the REQ, the message encryption key to encrypt the information including the first protection nonce.

It is to be noted that, the order of performing S107 to S109 does not affect the implementation of the present disclosure, and in practical applications, the order of performing S107 to S109 may be set according to requirements. Preferably, it is recommended that S107 is performed first, and when the REQ fails to verify the first digital signature, the AACAuth is discarded; when the REQ has verified the first digital signature, S108 is then performed; when the REQ determines that the AAC is legal, S109 is then performed; and when the REQ determines that the AAC is illegal, the REQ selects, according to a local policy, whether to perform S109. Considering the efficiency, the preferred solution is not to perform and finish this authentication process.

At S110, the AAC decrypts the first protection nonce ciphertext by using the message encryption key, so as to obtain the first protection nonce, and decrypts the second authentication result information ciphertext by using the first protection nonce, so as to obtain the second authentication result information.

At S111, the AAC determines an identity authentication result of the REQ according to the second verification result in the second authentication result information.

From the above technical solutions, it can be learned that, when the identify information is transmitted between the REQ and the AAC, and the AAC and AS, confidential processing is performed on the identify information of both the REQ and the AAC, such that the respective identify information of the REQ and the AAC may be prevented from being exposed during a transmission process. In addition, when the first verification result of the digital certificate of the AAC and the second verification result of the digital certificate of the REQ are transmitted between the AS and the AAC, and between the AAC and the REQ, the first verification result and the second verification result may be prevented from being exposed during transmission by performing confidential processing on the first verification result and the second verification result. Therefore, during the accessing of the REQ to the network, it is ensured that the attacker cannot obtain private and sensitive information. Moreover, by means of involving an AS, real-time MIA between the REQ and the AAC is achieved while the confidentiality of entity identity related information is guaranteed, such that the foundation that only a legitimate user can communicate with a legitimate network is laid.

In some embodiments, the REQInit of S101 may further include a digital signature $Sig_{REQ}$ of the REQ; and the to-be-signed data of the $Sig_{REQ}$ includes other fields before the $Sig_{REQ}$ in the REQInit. Before S111, the AAC further needs to determine whether the verification of the $Sig_{REQ}$ is successful, and S111 can only be performed when the verification is successful. It is to be noted that, if the AS-REQ and the AS-AAC are the same AS, the $Sig_{REQ}$ may be verified by the AS-AAC (which may also be represented as the AS-REQ), or may be verified by the AAC; and if the AS-REQ and the AS-AAC are two different ASs, the $Sig_{REQ}$ may be verified by the AS-REQ, or may be verified by the AAC. The AAC determines, by means of the following manners, whether the verification of the $Sig_{REQ}$ is successful.

As an embodiment of verifying the $Sig_{REQ}$ by the AS, insofar as the AS-REQ and the AS-AAC are the same AS (non-roaming), when the AS-AAC (which may also be represented as the AS-REQ) verifies the $Sig_{REQ}$, the $Sig_{REQ}$ may be transmitted to the AS-AAC (which may also be represented as the AS-REQ) by being carried in the AACVeri of S102, and the AS-AAC (which may also be represented as the AS-REQ) verifies the $Sig_{REQ}$ by using the $Cert_{REQ}$ obtained by decrypting the $EncPub_{AS\_REQ}$; if the verification is successful, the follow-up operations are continued to be performed, so as to perform steps of generating and sending the first authentication response message; and if the verification fails, the follow-up operations are not performed, such that the steps of generating and sending the first authentication response message are not performed. Therefore, the AAC may determine, according to whether the first authentication response message can be received, whether the verification of the $Sig_{REQ}$ is successful. If the AAC can receive the first authentication response message, the AAC may determine that the verification of the $Sig_{REQ}$ is successful.

As another embodiment of verifying the $Sig_{REQ}$ by the AS, insofar as the AS-REQ and the AS-AAC are two different ASs (roaming), when the AS-REQ verifies the $Sig_{REQ}$, the $Sig_{REQ}$ may be transmitted to the AS-REQ by being carried in the AACVeri of S102 and the AS-AACVeri sent to the AS-REQ by the AS-AAC, and the AS-REQ verifies the $Sig_{REQ}$ by using the $Cert_{REQ}$ obtained by decrypting the $EncPub_{AS\_REQ}$; if the verification is successful, the follow-up operations are continued to be performed, so as to perform steps of generating and sending the second authentication response message and the subsequent first authentication response message; and if the verification fails, the follow-up operations are not performed, such that the steps of generating and sending the second authentication response message and the subsequent first authentication response message are not performed. Therefore, the AAC may determine, according to whether the first authentication response message can be received, whether the verification of the $Sig_{REQ}$ is successful. If the AAC can receive the first authentication response message, the AAC may determine that the verification of the $Sig_{REQ}$ is successful.

As an embodiment of verifying the $Sig_{REQ}$ by the AAC, when the AAC verifies the $Sig_{REQ}$, the second authentication result information generated by the AS further includes the $Cert_{REQ}$. After receiving the REQAuth of S109, the AAC may verify the $Sig_{REQ}$ by using the $Cert_{REQ}$ in the second authentication result information that is obtained by decrypting the second authentication result information ciphertext, so as to determine whether the verification of the $Sig_{REQ}$ is successful.

In some other embodiments, the REQAuth of S109 may further include the $Sig_{REQ}$ of the REQ; and the to-be-signed data of the $Sig_{REQ}$ includes other fields before the $Sig_{REQ}$ in the REQAuth. In this case, the second authentication result information generated by the AS further includes the $Cert_{REQ}$. Before S111, the AAC further needs to verify the $Sig_{REQ}$ by using the $Cert_{REQ}$ in the second authentication result information, and determine whether the verification of the $Sig_{REQ}$ is successful; and S11 can only be performed when the verification is successful.

In some embodiments, the AACVeri of S102 may further include a digital signature $Sig_{AAC}$ of the AAC; and the to-be-signed data of the $Sig_{AAC}$ includes other fields before the $Sig_{AAC}$ in the AACVeri. Before S108, the REQ further needs to determine whether the verification of the $Sig_{AAC}$ is successful, and S108 can only be performed when the verification is successful. The REQ determines, by means of the following manners, whether the verification of the $Sig_{AAC}$ is successful. The AS-AAC trusted by the AAC verifies the $Sig_{AAC}$ by using the $Cert_{AAC}$ obtained by decrypting the $EncPub_{AS\_AAC}$ in the AACVeri, and subsequent processes are performed after the verification is successful, such that if the REQ can receive the AACAuth of S105, the REQ determines that the verification of the $Sig_{AAC}$ has been successful.

In some other embodiments, the AACAuth of S105 may further include the $Sig_{AAC}$ of the AAC; and the to-be-signed data of the $Sig_{AAC}$ includes other fields before the $Sig_{AAC}$ in the AACAuth. Correspondingly, the first authentication result information generated by the AS further includes the $Cert_{AAC}$. Before the REQ determines the identity authentication result of the AAC in S108, the REQ further needs to determine whether the verification of the $Sig_{AAC}$ is successful, and the identity authentication result of the AAC can only be determined according to the first verification result when the verification is successful. The REQ determines, by means of the following manners, whether the verification of the $Sig_{AAC}$ is successful. The REQ verifies the $Sig_{AAC}$ by using the $Cert_{AAC}$ in the first authentication result information that is obtained by decrypting the first authentication result information ciphertext, and whether the verification of the $Sig_{AAC}$ is successful is determined according to a verification result Referring to FIG. 1, messages transmitted among the REQ, the AAC and the AS may further include parameter information such as nonces generated by the AAC and/or the REQ, and respective identity identifiers. Normally, during identity authentication, these nonces and/or identity identifiers should remain unchanged during the process of being transmitted by means of the messages, but in the event of network jitter or attacks, etc., this may result in the loss or tampering of the parameter information such as the nonces and/or identity identifiers in messages. Therefore, the consistency between the identity identifiers and/or the nonces in the messages may further be verified during identity authentication, so as to guarantee the reliability and freshness of authentication results.

For example, in the REQInit of S101, the to-be-encrypted data of the $EncPub_{AS\_REQ}$ may further include the $ID_{REQ}$ of the REQ and a third protection nonce $Nonce_{REQID}$; and the $Nonce_{REQ}$, is used for encrypting the $ID_{REQ}$. Correspondingly, the ASVeri of S103 may further include identity identifier ciphertext of the REQ. For example, the identity identifier ciphertext of the REQ may be $ID_{REQ} \oplus Nonce_{REQID}$, which is the result of the exclusive or operation (XOR) of $ID_{REQ}$ and $Nonce_{REQID}$. In the AACAuth of S105, to-be-encrypted data of the $EncData_{AAC}$ further includes the identity identifier ciphertext of the REQ. The REQ also obtains the identity identifier ciphertext of the REQ by decrypting the $EncData_{AAC}$. The REQ further needs to verify, according to the self $ID_{REQ}$ and the $Nonce_{REQID}$, the identity identifier ciphertext of the REQ that is obtained by decrypting the $EncData_{AAC}$. For example, the verification may include the following. The REQ encrypts the information including the self $ID_{REQ}$ of the REQ by using the $Nonce_{REQID}$, so as to generate the identity identifier ciphertext of the REQ, and perform consistency verification on the generated identity identifier ciphertext of the REQ and the identity identifier ciphertext of the REQ that is obtained by decrypting the $EncData_{AAC}$. Alternatively, the REQ decrypts the identity identifier ciphertext of the REQ by using the $Nonce_{REQID}$, so as to obtain the $ID_{REQ}$, and performs consistency verification on same and the self $ID_{REQ}$ of the REQ; and if the verification is successful, the REQ then performs the step of determining the identity authentication result of the AAC in S108.

Likewise, in the AACVeri of S102, the to-be-encrypted data of $EncPub_{AS\_AAC}$ may further include the $ID_{AAC}$ of the AAC and a fourth protection nonce $Nonce_{AACID}$, and the $Nonce_{AACID}$ is used for encrypting the $ID_{AAC}$. Correspondingly, the ASVeri of S103 may further include identity identifier ciphertext of the AAC. For example, the identity identifier ciphertext of the AAC may be $ID_{AAC} \oplus Nonce_{AACID}$, which is the result of the XOR of $ID_{AAC}$ and $Nonce_{AACID}$. Before determining the identity authentication result of the REQ, the AAC further needs to verify the identity identifier ciphertext of the AAC according to the self $ID_{AAC}$ and the $Nonce_{AACID}$. For example, verification includes the following. The AAC encrypts the information including the self $ID_{AAC}$ of the AAC by using the $Nonce_{AACID}$, so as to generate the identity identifier ciphertext of the AAC, and performs consistency verification on the generated identity identifier ciphertext of the AAC and the received identity identifier ciphertext of the AAC in the ASVeri of S103; or the AAC may decrypt the identity identifier ciphertext of the AAC by using the $Nonce_{AACID}$, so as to obtain the $ID_{AAC}$, and performs consistency verification on the same and the self $ID_{AAC}$ of the AAC. The AAC then performs the step of determining the identity authentication result of the REQ in S111 if the verification is successful.

In some embodiments, if the REQInit of S101 further includes the $Nonce_{REQ}$ generated by the REQ, the AACVeri of S102 further includes the $Nonce_{AAC}$ generated by the AAC and the $Nonce_{REQ}$. Correspondingly, the ASVeri of S103 may further include the Nonces and the $Nonce_{AAC}$; and in the AACAuth of S105, the to-be-encrypted data of the $EncData_{AAC}$ further includes the $Nonce_{REQ}$. After receiving the ASVeri of S103, the AAC further needs to verify consistency between the $Nonce_{AAC}$ in the ASVeri and the $Nonce_{AAC}$ (which is the $Nonce_{AAC}$ sent by the AAC through the AACVeri) generated by the AAC; and if the verification is successful, the AAC then performs the step of determining the identity authentication result of the REQ in S111. After receiving the AACAuth of S105, the REQ further needs to verify the consistency between the $Nonce_{REQ}$ obtained by decrypting the $EncData_{AAC}$ and the $Nonce_{REQ}$ (which is the Nonce); sent by the REQ through the REQInit) generated by the REQ; and if the verification is successful, the REQ then performs the step of determining the identity authentication result of the AAC in S108.

In some embodiments, in order to guarantee the reliability of the authentication results, the AAC may generate a message integrity check code. For example, the AACAuth of S105 may further include a first message integrity check code $MacTag_{AAC}$. The $MacTag_{AAC}$ is generated by using, by the AAC, a message integrity check key to perform calculation on fields in the AACAuth other than the $MacTag_{AAC}$. The REQ further needs to verify the $MacTag_{AAC}$; and after the verification is successful, the step of determining the identity authentication result of the AAC in S108 is then performed. When verifying the $MacTag_{AAC}$, the REQ should use the message integrity check key to perform calculation on the fields in the AACAuth other than the $MacTag_{AAC}$, so as to generate the $MacTag_{AAC}$, and compare the calculated $MacTag_{AAC}$ with the received $MacTag_{AAC}$ in the AACAuth; if the $MacTag_{AAC}$s are consistent, the verification is successful; and if the $MacTag_{AAC}$s are not consistent, the verification fails.

Likewise, the REQ may also generate the message integrity check code. For example, the REQAuth of S109 may further include a second message integrity check code $MacTag_{REQ}$. The $MacTag_{REQ}$ is generated by using, by the REQ, the message integrity check key to perform calculation on fields in the REQAuth other than the $MacTag_{REQ}$. The AAC further needs to verify the $MacTag_{REQ}$; and after the verification is successful, the step of determining the identity authentication result of the REQ in S111 is then performed. When verifying the $MacTag_{REQ}$, the AAC should use the message integrity check key to perform calculation on the fields in the REQAuth other than the $MacTag_{REQ}$, so as to generate the $MacTag_{REQ}$, and compare the calculated $MacTag_{REQ}$ with the received $MacTag_{REQ}$ in the REQAuth; if the MacTag$_{REQ}$s are consistent, the verification is successful; and if the MacTag$_{AAC}$s are not consistent, the verification fails. The manner of generating the message integrity check key used by the REQ and the AAC is described in the next embodiment.

Figure 2:
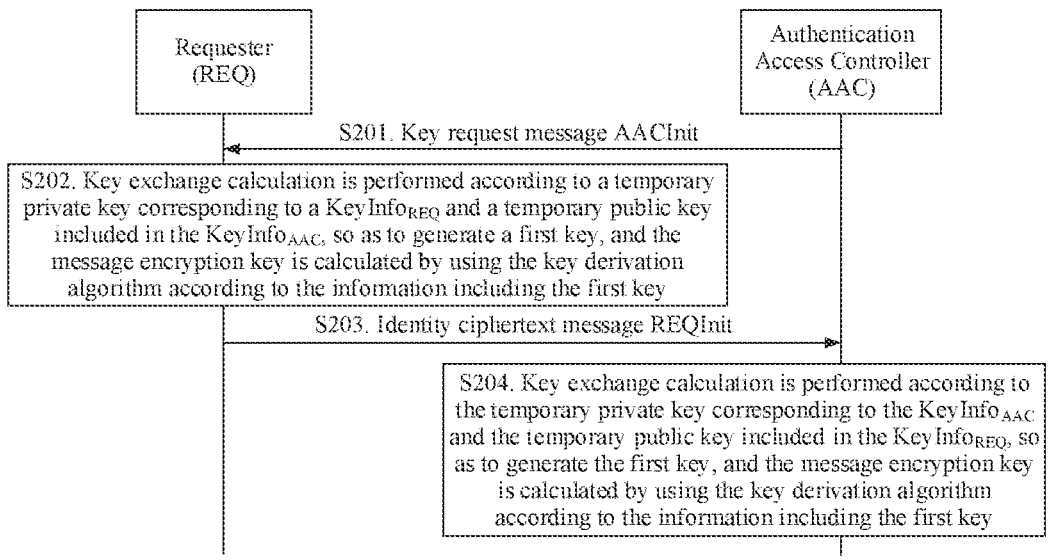
FIG. 2 is a schematic diagram of a method for negotiating a message encryption key between a Requester (REQ) and an Authentication Access Controller (AAC) according to an embodiment of the present disclosure.

The message encryption key in the above embodiments may be obtained by means of negotiation between the REQ and the AAC. Therefore, this embodiment further provides a method for negotiating the message encryption key between the REQ and the AAC. Referring to FIG. 2, the method includes the following steps.

At S201, the AAC sends the AACInit to the REQ.

The AACInit includes a key exchange parameter KeyInfo$_{AAC}$ of the AAC, and the KeyInfo$_{AAC}$ includes a temporary public key of the AAC. Key exchange refers to a key exchange algorithm such as Diffie-Hellman (DH). The AACInit may further include the Nonce$_{AAC}$ generated by the AAC.

The AACInit may further include Security capabilities$_{AAC}$; and the Security capabilities$_{AAC}$ represents security capability parameter information supported by the AAC, including an identity authentication suite (which includes one or more identity authentication methods) supported by the AAC, one or more symmetric encryption algorithms, one or more integrity check algorithms and/or one or more key derivation algorithms, so as to allow the REQ to select a specific security policy for use. Therefore, the REQ may select, according to the Security capabilities$_{AAC}$, the the specific security policy (Security capabilities$_{REQ}$) used by the REQ. The Security capabilities$_{REQ}$ indicates an identity authentication method, a symmetric encryption algorithm, an integrity check algorithm and/or a key derivation algorithm that are correspondingly determined to be used by the REQ.

At S202, the REQ performs key exchange calculation according to a temporary private key corresponding to a key exchange parameter KeyInfo$_{REQ}$ of the REQ and a temporary public key included in the KeyInfo$_{AAC}$, so as to generate a first key, and calculates the message encryption key by using the key derivation algorithm according to the information including the first key.

If the AACInit in S201 further includes the Nonce$_{AAC}$ generated by the AAC, the REQ may perform key exchange calculation according to the temporary private key corresponding to the KeyInfo$_{REQ}$ and the temporary public key included in the KeyInfo$_{AAC}$, so as to generate the first key K1; the K1 is combined with the information including the Nonce$_{AAC}$ and the Nonce$_{REQ}$ generated by the REQ; and the message encryption key is calculated by using the negotiated or preset key derivation algorithm. The negotiated key derivation algorithm may be a key derivation algorithm that the REQ selects to use according to the Security capabilities$_{AAC}$ sent by the AAC. The KeyInfo$_{REQ}$ is a key exchange parameter generated by the REQ, including the temporary public key of the REQ. The temporary private key corresponding to the KeyInfo$_{REQ}$ is a temporary private key that is generated by the REQ and corresponds to the temporary public key of the REQ, that is, the temporary public key and the temporary private key are a temporary public-private key pair.

At S203, the REQ sends the REQInit to the AAC.

The REQInit includes the KeyInfo$_{REQ}$, such that the AAC obtains the message encryption key by means of calculation according to information including the temporary private key corresponding to the KeyInfo$_{AAC}$ and the temporary public key included in the KeyInfo$_{REQ}$. The temporary private key corresponding to the KeyInfo$_{AAC}$ is a temporary private key that is generated by the AAC and corresponds to the temporary public key of the AAC, that is, the temporary public key and the temporary private key are a temporary public-private key pair.

The REQInit may further include the Security capabilities$_{REQ}$. The REQInit may further include the Nonce$_{REQ}$, such that the AAC obtains the message encryption key by means of calculation according to information including the temporary private key corresponding to the KeyInfo$_{AAC}$, the temporary public key included in the KeyInfo$_{REQ}$, the Nonce$_{AAC}$ and the Nonce$_{REQ}$.

The REQInit may further include the Nonce$_{AAC}$, such that before calculating the message encryption key, the AAC may verify the consistency between the Nonce$_{AAC}$ in the REQInit and the Nonce$_{AAC}$ generated by the AAC, so as to ensure that the REQInit received by the AAC is a response message for the AACInit.

At S204, the AAC performs key exchange calculation according to the temporary private key corresponding to the KeyInfo$_{AAC}$ and the temporary public key included in the KeyInfo$_{RE}$, so as to generate the first key, and calculates the message encryption key by using the key derivation algorithm according to the information including the first key.

If the REQInit further includes the Nonce$_{REQ}$, the AAC may perform key exchange calculation according to the temporary private key corresponding to the KeyInfo$_{AAC}$ and the temporary public key included in the KeyInfo$_{REQ}$, so as to generate the first key K1; the K1 is combined with the information including the Nonce$_{AAC}$ and the Nonce$_{REQ}$; and the message encryption key is calculated by means of the negotiated or preset key derivation algorithm. The negotiated key derivation algorithm may be a key derivation algorithm that the AAC selects to use according to the Security capabilities$_{REQ}$ sent by the REQ.

It is to be noted that, in the embodiment of FIG. 2, the REQ and the AAC may also generate the message integrity check key. The implementations of the REQ and the AAC to respectively generate the message integrity check key are the same as the implementations of the REQ and the AAC to respectively generate the message encryption key in the embodiment of FIG. 2. For example, the AAC may derive a string of key data by using the key derivation algorithm in the manner of the embodiment of FIG. 2. The key data may be used as the message encryption key and may also be the message integrity check key. Alternatively, one portion of the key data is used as the message encryption key, and the other portion of the key data is used as the message integrity check key. The AAC may also derive two same or different strings of key data separately by using the key derivation algorithm in the manner of the embodiment of FIG. 2, one string is used as the message encryption key, and one string is used as the message integrity check key. The REQ may derive a string of key data by using the key derivation algorithm in the manner of the embodiment of FIG. 2. The key data may be used as the message encryption key and may also be the message integrity check key. Alternatively, one portion of the key data is used as the message encryption key, and the other portion of the key data is used as the message integrity check key. The REQ may also derive two same or different strings of key data separately by using the key derivation algorithm in the manner of the embodiment of FIG. 2, one string is used as the message encryption key, and one string is used as the message integrity check key.

An embodiment of the present disclosure further provides a method for determining the AS-AAC and/or the AS-REQ used during the current authentication process by using an information interaction between the AAC and the REQ.

Referring to FIG. 2, the AAC adds, in the AACInit of S201, the $ID_{AS\_AAC}$ of at least one AS trusted by the AAC; and the REQ determines, according to the $ID_{AS\_AAC}$, the $ID_{AS\_REQ}$ of at least one AS trusted by the REQ. During implementation, the REQ selects, from the $ID_{AS\_AAC}$, the identity identifier of at least one AS that is trusted by the REQ as the $ID_{AS\_REQ}$; and if selection fails, the REQ uses the identity identifier of at least one AS that is trusted by the REQ as the $ID_{AS\_REQ}$ (successful selection corresponding to a non-roaming case, and failed selection corresponding to a roaming case), and the $ID_{AS\_REQ}$ is added into the REQInit of S203 and sent to the AAC. Therefore, the AAC may determine the first AS according to the $ID_{AS\_AAC}$ and the $ID_{AS\_REQ}$. For example, the AAC may determine whether there is at least one same AS in the $ID_{AS\_REQ}$ and the $ID_{AS\_AAC}$; if so, that is, in the non-roaming case, the AAC determines the AS-AAC involved in identity authentication from the identity identifier of the AS that is commonly trusted by at least one REQ and the AAC; and if no, that is the roaming case, the AAC needs to determine, according to the $ID_{AS\_AAC}$, the AS-AAC involved in identity authentication, and sends the $ID_{AS\_REQ}$ to the AS-AAC, such that the AS-AAC determines the AS-REQ according to the $ID_{AS\_REQ}$.

As another implementation, the AAC may not have to send the $ID_{AS\_AAC}$ to the REQ, and the REQ adds, in the REQInit of S203, the $ID_{AS\_REQ}$ of at least one AS that is trusted by the REQ. The determination of the AS-AAC and/or the AS-REQ involved in the identity authentication process according to the $ID_{AS\_REQ}$ and the $ID_{AS\_AAC}$ of the AS trusted by the AAC is implemented as in the previous implementation.

For ease of description, in the following embodiments, the first verification result obtained by verifying the legality of the $Cert_{AAC}$ is represented as the $Res_{AAC}$; the first authentication result information is represented as the $Pub_{AAC}$; the second verification result obtained by verifying the legality of the $Cert_{REQ}$ is represented as the $Res_{REQ}$; the second authentication result information is represented as the $Pub_{REQ}$.

Since the ASs trusted by the REQ and the AAC may be the same or different, when the ASs trusted by the REQ and the AAC are the same, it is the non-roaming case, and when the ASs trusted by the REQ and the AAC are different, it is the roaming case.

In the non-roaming case, the AS-AAC (or the AS-REQ) may be used to represent the AS commonly trusted by the REQ and the AAC, and may also verify the $Sig_{REQ}$ of the REQ and the $Sig_{AAC}$ of the AAC during identity authentication. For example, the AS-AAC (or the AS-REQ) may be used to verify the $Sig_{REQ}$ and the $Sig_{AAC}$; or the AAC may be used to verify the $Sig_{REQ}$, and the REQ verifies the $Sig_{AAC}$.

Figure 3:
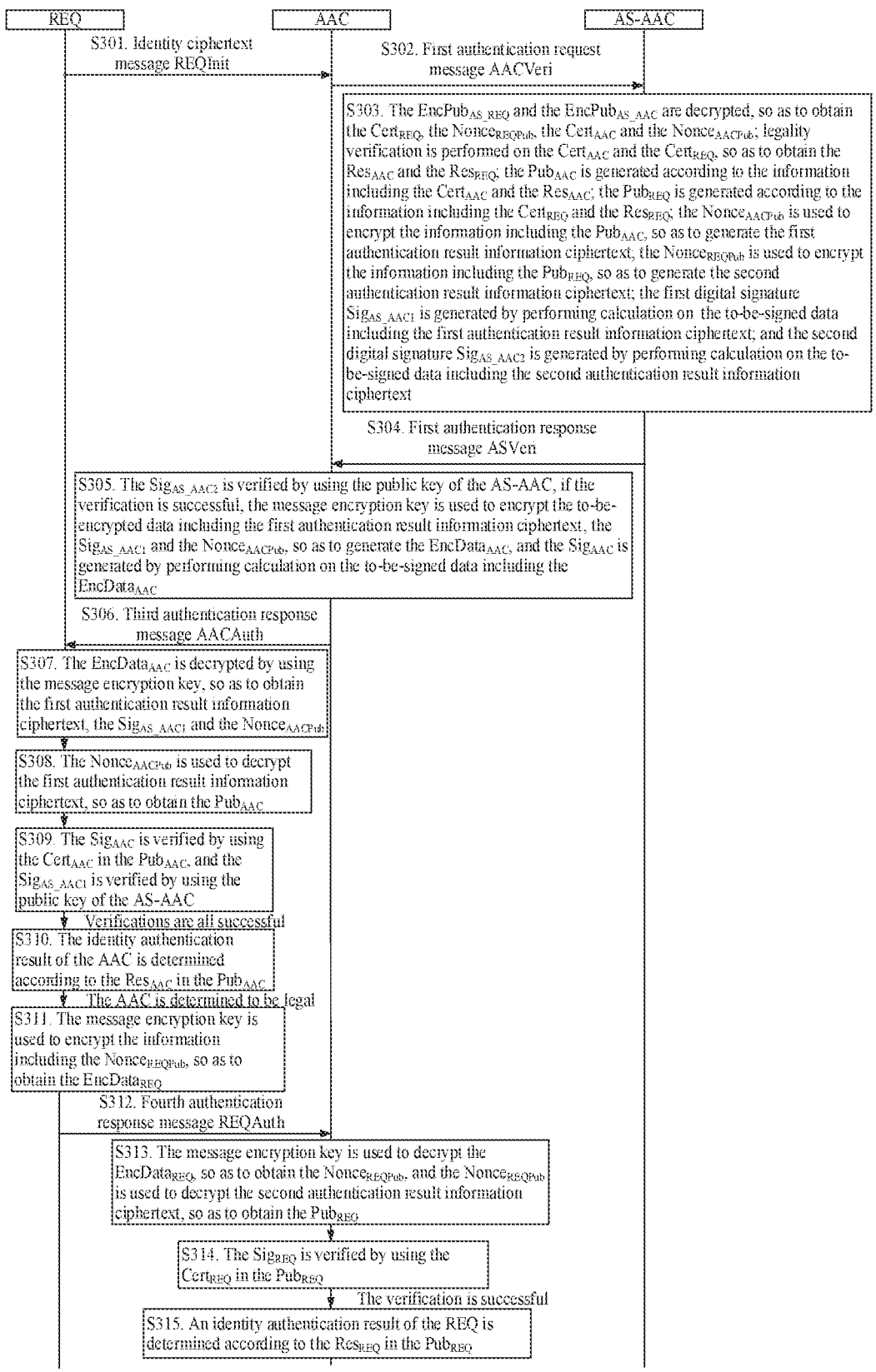
FIG. 3 is a schematic diagram of an identity authentication method in a non-roaming case according to an embodiment of the present disclosure.

FIG. 3 is an embodiment of the identity authentication method of the AAC verifying the $Sig_{REQ}$ and the REQ verifying the $Sig_{AAC}$ in the non-roaming case. Before this embodiment is performed, the REQ and the AAC both have held the message encryption key, and the message encryption key may be shared in advance by both parties, or may be obtained by means of negotiation by the method shown in FIG. 2. The identity authentication method includes the following steps. The identity authentication method includes the following steps.

At S301, the AAC acquires the REQInit sent by the REQ.

The REQInit includes the $EncPub_{AS\_REQ}$ of the REQ and the $Sig_{REQ}$ of the REQ.

At S302, the AAC sends the AACVeri to the AS-AAC.

The AACVeri includes the $EncPub_{AS\_REQ}$ and identity information ciphertext $EncPub_{AS\_AAC}$ of the AAC.

At S303, the AS-AAC decrypts the $EncPub_{AS\_REQ}$ and the $EncPub_{AS\_AAC}$ by using the private key corresponding to the encryption certificate, so as to obtain the $Cert_{REQ}$, the $Nonce_{REQPub}$, the $Cert_{AAC}$ and the $Nonce_{AACPub}$, respectively performs legality verification on the $Cert_{AAC}$ and the $Cert_{REQ}$, so as to obtain the $Res_{AAC}$ and the $Res_{REQ}$, generates the $Pub_{AAC}$ according to the information including the $Cert_{AAC}$ and the $Res_{AAC}$, generates the $Pub_{REQ}$ according to the information including the $Cert_{REQ}$ and the $Res_{REQ}$, encrypts the information including the $Pub_{AAC}$ by using the $Nonce_{AACPub}$, so as to generate the first authentication result information ciphertext, encrypts the information including the $Pub_{REQ}$ by using the $Nonce_{REQPub}$, so as to generate the second authentication result information ciphertext, generates the $Sig_{AS\_AAC1}$ by performing calculation on the to-be-signed data including the first authentication result information ciphertext, and generates the $Sig_{AS\_AAC2}$ by performing calculation on the to-be-signed data including the second authentication result information ciphertext.

At S304, the AAC receives a first authentication response message ASVeri sent by the AS-AAC.

The ASVeri includes the first authentication result information ciphertext, the $Sig_{AS\_AAC1}$, the second authentication result information ciphertext and the $Sig_{AS\_AAC2}$.

At S305, the AAC verifies the $Sig_{AS\_AAC2}$ by using the public key of the AS-AAC, if the verification is successful, encrypts the to-be-encrypted data including the first authentication result information ciphertext, the $Sig_{AS\_AAC1}$ and the $Nonce_{AACPub}$ by using the message encryption key, so as to generate the $EncData_{AAC}$, and generates the $Sig_{AAC}$ by performing calculation on the to-be-signed data including the $EncData_{AAC}$.

At S306, the AAC sends a third authentication response message AACAuth to the REQ.

The AACAuth includes the $EncData_{AAC}$ and the $Sig_{AAC}$.

At S307, the REQ decrypts the $EncData_{AAC}$ by using the message encryption key, so as to obtain the first authentication result information ciphertext, the $Sig_{AS\_AAC1}$ and the $Nonce_{AACPub}$.

At S308, the REQ decrypts the first authentication result information ciphertext by using the $Nonce_{AACPub}$, so as to obtain the $Pub_{AAC}$.

At S309, the REQ verifies the $Sig_{AAC}$ by using the $Cert_{AAC}$ in the $Pub_{AAC}$, and verifies the $Sig_{AS\_AAC1}$ is verified by using the public key of the AS-AAC.

If the verifications are all successful. S310 is then performed.

At S310, the REQ determines the identity authentication result of the AAC according to the $Res_{AAC}$ in the $Pub_{AAC}$.

When the REQ determines that the AAC is legal, S311 is performed; and when the REQ determines that the AAC is illegal, the current authentication process is finished.

At S311, the REQ encrypts the information including the $Nonce_{REQPub}$ by using the message encryption key, so as to obtain the $EncData_{REQ}$.

At S312, the REQ sends a fourth authentication response message REQAuth to the AAC.

The REQAuth includes the $EncData_{REQ}$.

At S313, the AAC decrypts the $EncData_{REQ}$ by using the message encryption key, so as to obtain the $Nonce_{REQPub}$, and decrypts the second authentication result information ciphertext by using the $Nonce_{REQPub}$, so as to obtain the $Pub_{REQ}$.

At S314, the AAC verifies the $Sig_{REQ}$ by using the $Cert_{REQ}$ in the $Pub_{REQ}$.

If the verification is successful. S315 is performed.

At S315, the AAC determines an identity authentication result of the REQ according to the $Res_{REQ}$ in the $Pub_{REQ}$.

It is to be noted that, the REQInit of S301 may not include the $Sig_{REQ}$, while the $Sig_{REQ}$ is added in the REQAuth of S312. That is to say, in S312, the REQ first generates the $Sig_{REQ}$ by performing calculation on the to-be-signed data including the $EncData_{REQ}$ in the REQAuth. In this case, the $Sig_{REQ}$ verified by the AAC in S314 is the $Sig_{REQ}$ in the REQAuth of S312.

Figure 4:
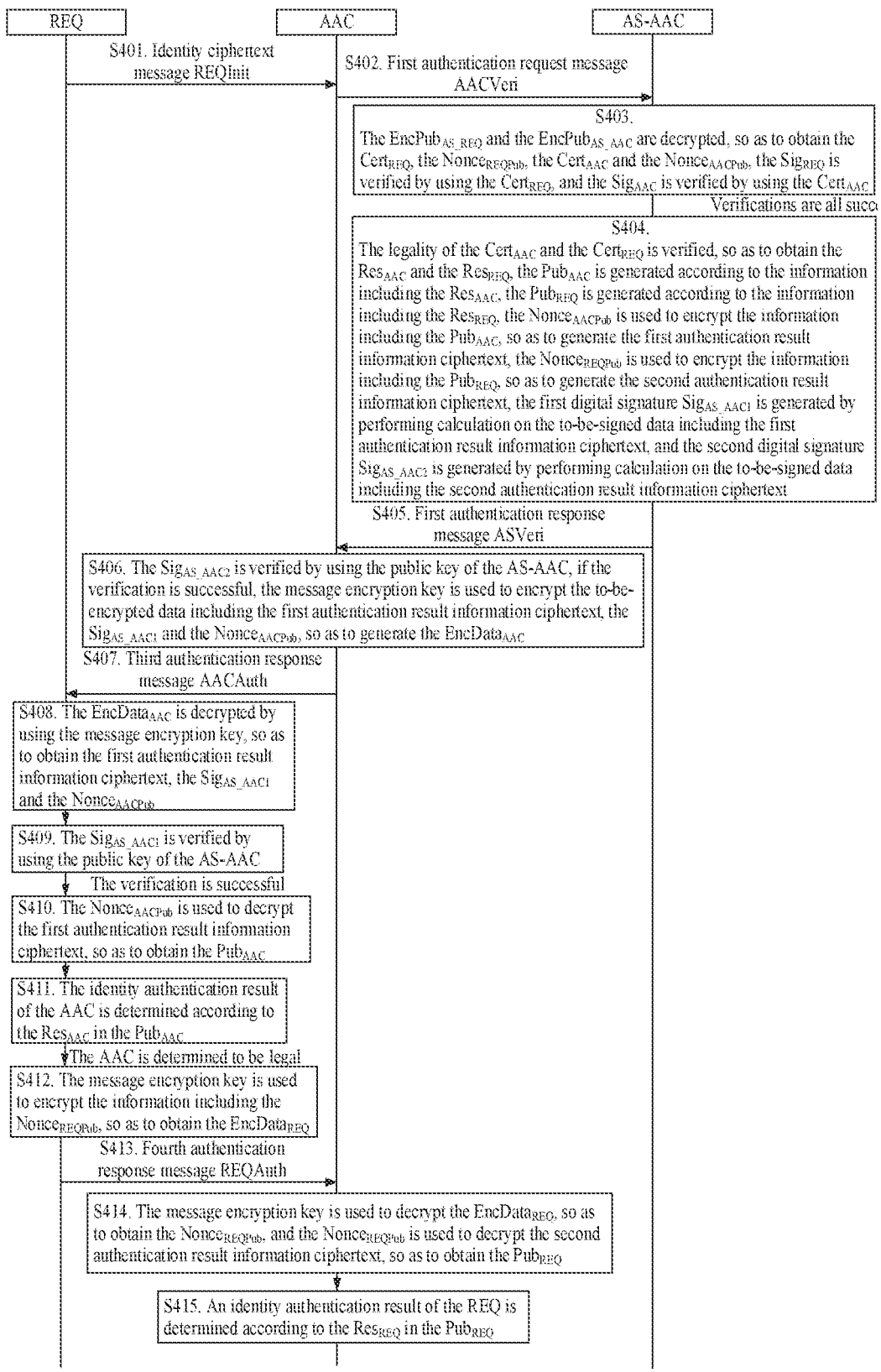
FIG. 4 is a schematic diagram of another identity authentication method in a non-roaming case according to an embodiment of the present disclosure.

FIG. 4 is another embodiment of the identity authentication method of the AS-AAC verifying the $Sig_{REQ}$ and the $Sig_{AAC}$ in the non-roaming case. Before this embodiment is performed, the REQ and the AAC both have held the message encryption key, and the message encryption key may be shared in advance by both parties, or may be obtained by means of negotiation by the method shown in FIG. 2. The identity authentication method includes the following steps. The identity authentication method includes the following steps.

At S401, the AAC acquires the REQInit sent by the REQ.

The REQInit includes the $EncPub_{AS\_REQ}$ of the REQ and the $Sig_{REQ}$ of the REQ.

At S402, the AAC sends the AACVeri to the AS-AAC.

The AACVeri includes the REQInit, the $EncPub_{AS\_AAC}$ of the AAC, and the $Sig_{AAC}$ of the AAC. The $Sig_{AAC}$ is generated by performing calculation on other fields before the $Sig_{AAC}$ in the AACVeri.

At S403, the AS-AAC decrypts the $EncPub_{AS\_REQ}$ and the $EncPub_{AS\_AAC}$ by using the private key corresponding to the encryption certificate, so as to obtain the $Cert_{REQ}$, the $Nonce_{REQPub}$, the $Cert_{AAC}$ and the $Nonce_{AACPub}$, verifies the $Sig_{REQ}$ by using the $Cert_{REQ}$, and verifies the $Sig_{AAC}$ by using the $Cert_{AAC}$.

If the verifications are all successful, S404 is performed.

At S404, the AS-AAC verifies the legality of the $Cert_{AAC}$ and the $Cert_{REQ}$, so as to obtain the $Res_{AAC}$ and the $Res_{REQ}$, generates the $Pub_{AAC}$ according to the information including the $Res_{AAC}$, generates the $Pub_{REQ}$ according to the information including the $Res_{REQ}$, encrypts the information including the $Pub_{AAC}$ by using the $Nonce_{AACPub}$, so as to generate the first authentication result information ciphertext, encrypts the information including the $Pub_{REQ}$ by using the $Nonce_{REQPub}$, so as to generate the second authentication result information ciphertext, generates the $Sig_{AS\_AAC1}$ by performing calculation on the to-be-signed data including the first authentication result information ciphertext, and generates the $Sig_{AS\_AAC2}$ by performing calculation on the to-be-signed data including the second authentication result information ciphertext.

At S405, the AAC receives a first authentication response message ASVeri sent by the AS-AAC.

The ASVeri includes the first authentication result information ciphertext, the $Sig_{AS\_AAC1}$, the second authentication result information ciphertext and the $Sig_{AS\_AAC2}$.

At S406, the AAC verifies the $Sig_{AS\_AAC2}$ by using the public key of the AS-AAC, if the verification is successful, encrypts the to-be-encrypted data including the first authentication result information ciphertext, the $Sig_{AS\_AAC1}$ and the $Nonce_{AACPub}$ by using the message encryption key, so as to generate the $EncData_{AAC}$.

At S407, the AAC sends a third authentication response message AACAuth to the REQ.

The AACAuth includes the $EncData_{AAC}$.

At S408, the REQ decrypts the $EncData_{AAC}$ by using the message encryption key, so as to obtain the first authentication result information ciphertext, the $Sig_{AS\_AAC1}$ and the $Nonce_{AACPub}*$.

At S409, the REQ verifies the $Sig_{AS\_AAC1}$ by using the public key of the AS-AAC.

If the verification is successful, S410 is performed.

At S410, the REQ decrypts the first authentication result information ciphertext by using the $Nonce_{AACPub}$, so as to obtain the $Pub_{AAC}$.

At S411, the REQ determines the identity authentication result of the AAC according to the $Res_{AAC}$ in the $Pub_{AAC}$.

When the REQ determines that the AAC is legal. S412 is performed, and when the REQ determines that the AAC is illegal, the current authentication process is finished.

At S412, the REQ encrypts the information including the $Nonce_{REQ}$ by using the message encryption key, so as to obtain the $EncData_{REQ}$.

At S413, the REQ sends a fourth authentication response message REQAuth to the AAC.

The REQAuth includes the $EncData_{REQ}$.

At S414, the AAC decrypts the $EncData_{REQ}$ using the message encryption key, so as to obtain the $Nonce_{REQPub}$, and decrypts the second authentication result information ciphertext by using the $Nonce_{REQPub}$, so as to obtain the $Pub_{REQ}$.

At S415, the AAC determines an identity authentication result of the REQ according to the $Res_{REQ}$ in the $Pub_{REQ}$.

In the roaming case, the AS-AAC and the AS-REQ are trusted with each other, and know each other's digital certificate or the public key in the digital certificate. The $Sig_{REQ}$ of the REQ and the $Sig_{AAC}$ of the AAC may also be verified during identity authentication. For example, the AS-REQ may be used to verify the $Sig_{REQ}$, and the AS-AAC is used to verify the $Sig_{AAC}$; or the AAC may be used to verify the $Sig_{REQ}$, and the REQ verifies the $Sig_{AAC}$.

Figure 5:
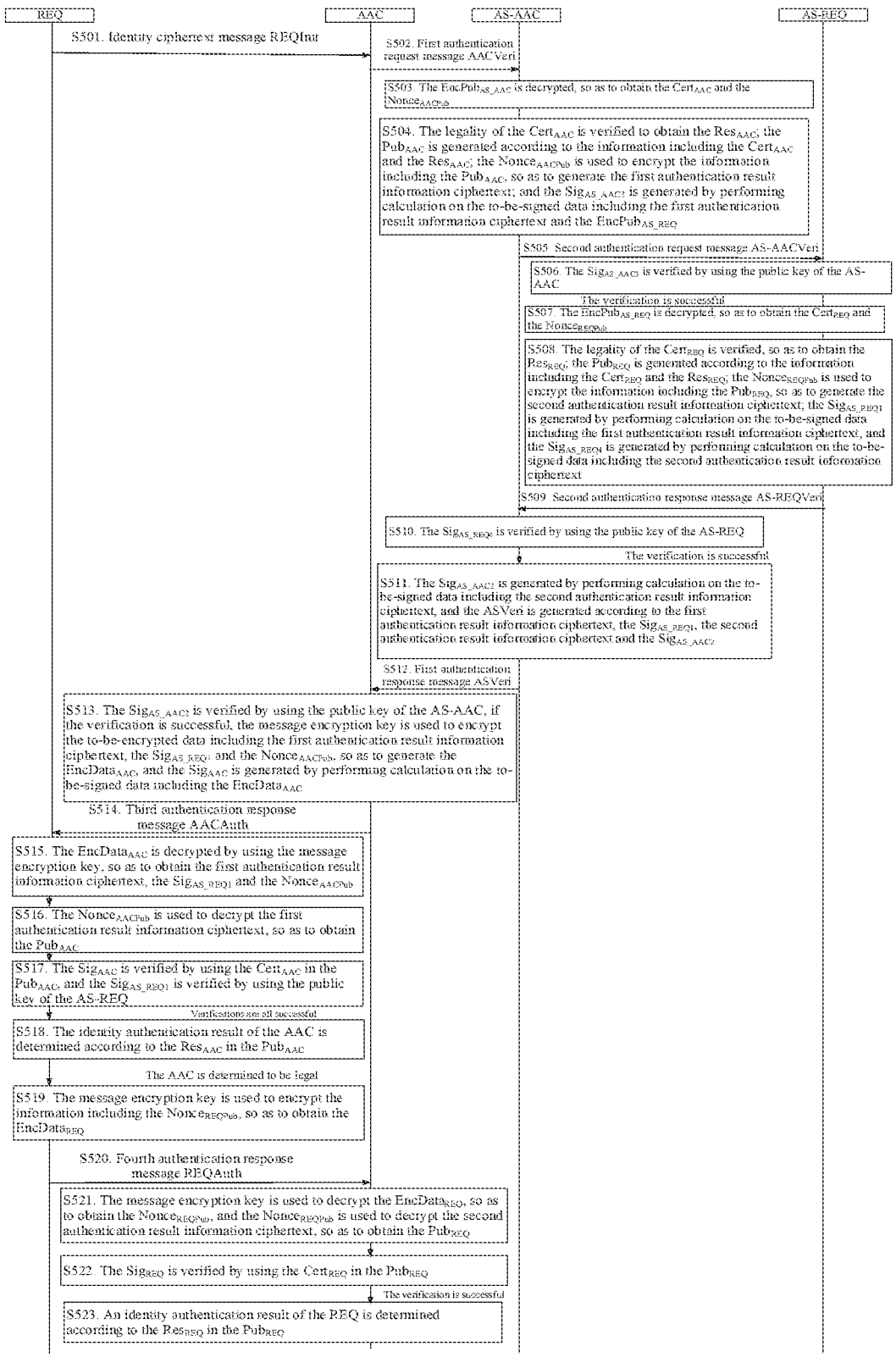
FIG. 5 is a schematic diagram of an identity authentication method in a roaming case according to an embodiment of the present disclosure.

FIG. 5 is an embodiment of the identity authentication method of the AAC verifying the $Sig_{REQ}$ and the REQ verifying the $Sig_{AAC}$ in the roaming case. Before this embodiment is performed, the REQ and the AAC both have held the message encryption key, and the message encryption key may be shared in advance by both parties, or may be obtained by means of negotiation by the method shown in FIG. 2. The identity authentication method includes the following steps. The identity authentication method includes the following steps.

At S501, the AAC acquires the REQInit sent by the REQ.

The REQInit includes the $EncPub_{AS\_REQ}$ of the REQ, the $ID_{AS\_REQ}$ of at least one AS trusted by the REQ, and the $Sig_{REQ}$ of the REQ.

At S502, the AAC sends the AACVeri to the AS-AAC.

The AACVeri includes the $EncPub_{AS\_REQ}$, the $ID_{AS\_REQ}$ and the $EncPub_{AS\_AAC}$ of the AAC.

At S503, the AS-AAC decrypts the $EncPub_{AS\_AAC}$, so as to obtain the $Cert_{AAC}$ and the $Nonce_{AACPub}$.

At S504, the AS-AAC verifies the legality of the $Cert_{AAC}$ to obtain the $Res_{AAC}$, generates the $Pub_{AAC}$ according to the information including the $Cert_{AAC}$ and the $Res_{AAC}$, encrypts the information including the $Pub_{AAC}$ by using the $Nonce_{AACPub}$, so as to generate the first authentication result information ciphertext, and generates the $Sig_{AS\_AAC3}$ by performing calculation on the to-be-signed data including the first authentication result information ciphertext and the $EncPub_{AS\_REQ}$.

At S505, the AS-AAC sends the AS-AACVeri to the AS-REQ.

The AS-AAC may determine, according to the $ID_{AS\_REQ}$, the AS-REQ used during the current authentication process, and send the AS-AACVeri to the AS-REQ. The AS-AACVeri includes the first authentication result information ciphertext, the $EncPub_{AS\_REQ}$ and the $Sig_{AS\_AAC3}$.

At S506, the AS-REQ verifies the $Sig_{AS\_AAC}$ by using the public key of the AS-AAC.

If the verification is successful, S507 is performed.

At S507, the AS-REQ decrypts the $EncPub_{AS\_REQ}$, so as to obtain the $Cert_{REQ}$ and the $Nonce_{REQPub}$.

At S508, the AS-REQ verifies the legality of the $Cert_{REQ}$, so as to obtain the $Res_{REQ}$, generates the $Pub_{REQ}$ according to the information including the $Cert_{REQ}$ and the $Res_{REQ}$, encrypts the information including the $Pub_{REQ}$ by using the $Nonce_{REQPub}$, so as to generate the second authentication result information ciphertext, generates the $Sig_{AS\_REQ1}$ by performing calculation on the to-be-signed data including the first authentication result information ciphertext, and generates the $Sig_{AS\_REQ4}$ by performing calculation on the to-be-signed data including the second authentication result information ciphertext.

At S509, the AS-REQ sends the AS-REQVeri to the AS-AAC.

The AS-REQVeri includes the first authentication result information ciphertext, the $Sig_{AS\_REQ1}$, the second authentication result information ciphertext and the $Sig_{AS\_REQ4}$.

At S510, the AS-AAC verifies the $Sig_{AS\_REQ4}$ by using the public key of the AS-REQ.

If the verification is successful, S511 is performed.

At S511, the AS-AAC generates the $Sig_{AS\_AAC2}$ by performing calculation on the to-be-signed data including the second authentication result information ciphertext, and generates the ASVeri according to the first authentication result information ciphertext, the $Sig_{AS\_REQ1}$, the second authentication result information ciphertext and the $Sig_{AS\_AAC2}$.

At S512, the AS-AAC sends the ASVeri to the AAC.

At S513, the AAC verifies the $Sig_{AS\_AAC2}$ by using the public key of the AS-AAC, if the verification is successful, encrypts the to-be-encrypted data including the first authentication result information ciphertext, the $Sig_{AS\_REQ1}$ and the $Nonce_{AACPub}$ by using the message encryption key, so as to generate the $EncData_{AAC}$, and generates the $Sig_{AAC}$ by performing calculation on the to-be-signed data including the $EncData_{AAC}$.

At S514, the AAC sends a third authentication response message AACAuth to the REQ.

The AACAuth includes the $EncData_{AAC}$ and the $Sig_{AAC}$.

At S515, the REQ decrypts the $EncData_{AAC}$ by using the message encryption key, so as to obtain the first authentication result information ciphertext, the $Sig_{AS\_REQ1}$ and the $Nonce_{AACPub}$.

At S516, the REQ decrypts the first authentication result information ciphertext by using the $Nonce_{AACPub}$, so as to obtain the $Pub_{AAC}$.

At S517, the REQ verifies the $Sig_{A}e$ by using the $Cert_{AAC}$ in the $Pub_{AAC}$, and verifies the $Sig_{AS\_REQ1}$ by using the public key of the AS-REQ.

If the verification is successful. S518 is then performed.

At S518, the REQ determines the identity authentication result of the AAC according to the $Res_{AAC}$ in the $Pub_{AAC}$.

When the REQ determines that the AAC is legal, S519 is performed; and when the REQ determines that the AAC is illegal, the current authentication process is finished.

At S519, the REQ encrypts the information including the $Nonce_{REQPub}$ by using the message encryption key, so as to obtain the $EncData_{REQ}$.

At S520, the REQ sends a fourth authentication response message REQAuth to the AAC.

The REQAuth includes the $EncData_{REQ}$.

At S521, the AAC decrypts the $EncData_{REQ}$ by using the message encryption key, so as to obtain the $Nonce_{REQPub}$, and decrypts the second authentication result information ciphertext by using the $Nonce_{REQPub}$, so as to obtain the $Pub_{REQ}$.

At S522, the AAC verifies the $Sig_{REQ}$ by using the $Cert_{REQ}$ in the $Pub_{REQ}$.

If the verification is successful. S523 is performed.

At S523, the AAC determines an identity authentication result of the REQ according to the $Res_{REQ}$ in the $Pub_{REQ}$.

It is to be noted that, the REQInit of S501 may not include the $Sig_{REQ}$, while the $Sig_{REQ}$ is added in the REQAuth of S520. That is to say, in S520, the REQ first generates the $Sig_{REQ}$ by performing calculation on the to-be-signed data including the $EncData_{REQ}$ in the REQAuth. In this case, the $Sig_{REQ}$ verified by the AAC in S522 is the $Sig_{REQ}$ in the REQAuth of S520.

Figure 6:
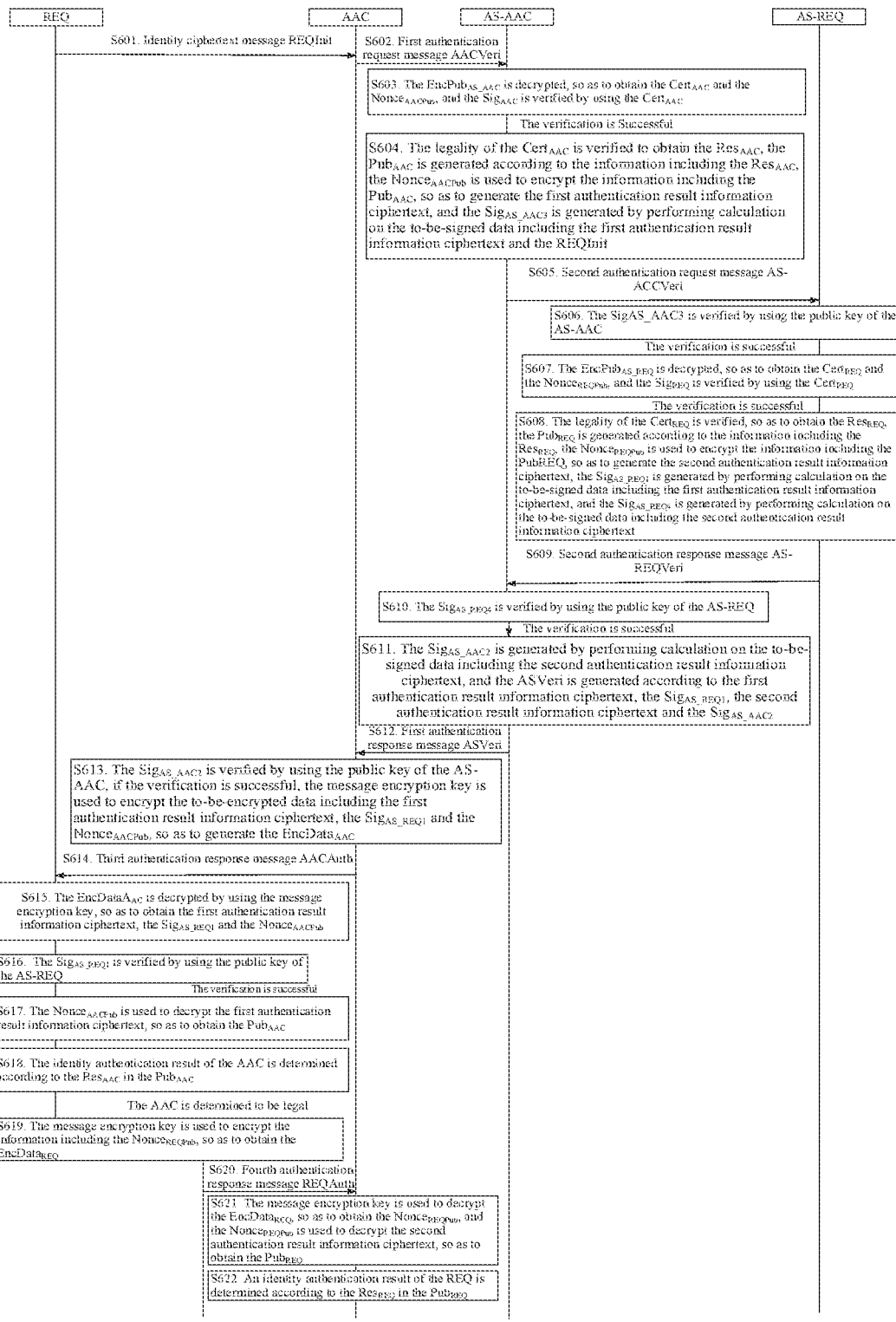
FIG. 6 is a schematic diagram of another identity authentication method in a roaming case according to an embodiment of the present disclosure.

FIG. 6 is another embodiment of the identity authentication method of the AS-AAC verifying the $Sig_{AAC}$ and AS-REQ verifying the $Sig_{REQ}$ in the roaming case. Before this embodiment is performed, the REQ and the AAC both have held the message encryption key, and the message encryption key may be shared in advance by both parties, or may be obtained by means of negotiation by the method shown in FIG. 2. The identity authentication method includes the following steps. The identity authentication method includes the following steps.

At S601, the AAC acquires the REQInit sent by the REQ.

The REQInit includes the $EncPub_{AS\_REQ}$ of the REQ, the $ID_{AS\_REQ}$ of at least one AS trusted by the REQ, and the $Sig_{REQ}$ of the REQ.

At S602, the AAC sends the AACVeri to the AS-AAC.

The AACVeri includes the REQInit, the $EncPub_{AS\_AAC}$ of the AAC, and the $Sig_{AAC}$ of the AAC. The $Sig_{AAC}$ is generated by performing calculation on other fields before the $Sig_{AAC}$ in the AACVeri.

At S603, the AS-AAC decrypts the $EncPub_{AS\_AAC}$, so as to obtain the $Cert_{AAC}$ and the $Nonce_{AACPub}$, and verifies the $Sig_{AAC}$ by using the $Cert_{AAC}$.

If the verification is successful, S604 is performed.

At S604, the AS-AAC verifies the legality of the $Cert_{AAC}$ to obtain the $Res_{AAC}$, generates the $Pub_{AAC}$ according to the information including the $Res_{AAC}$, encrypts the information including the $Pub_{AAC}$ by using the $Nonce_{AACPub}$, so as to generate the first authentication result information ciphertext, and generates the third digital signature $Sig_{AS\_AAC3}$ by performing calculation on the to-be-signed data including the first authentication result information ciphertext and the REQInit.

At S605, the AS-AAC sends the AS-AACVeri to the AS-REQ.

The AS-AAC may determine, according to the $ID_{AS\_REQ}$, the AS-REQ used during the current authentication process, and send the AS-AACVeri to the AS-REQ. The AS-AACVeri includes the REQInit, the first authentication result information ciphertext and the $Sig_{AS\_AAC3}$.

At S606, the AS-REQ verifies the $Sig_{AS\_AAC3}$ by using the public key of the AS-AAC.

If the verification is successful. S607 is then performed.

At S607, the AS-REQ decrypts the $EncPub_{AS\_REQ}$ in the REQInit, so as to obtain the $Cert_{REQ}$ and the $Nonce_{REQPub}$, and verifies the $Sig_{REQ}$ by using the $Cert_{REQ}$.

If the verification is successful, S608 is performed.

At S608, the AS-REQ verifies the legality of the $Cert_{REQ}$, so as to obtain the $Res_{REQ}$, generates the $Pub_{REQ}$ according to the information including the $Res_{REQ}$ encrypt the information including the $Pub_{REQ}$ by using the $Nonce_{REQPub}$, so as to generate the second authentication result information ciphertext, generates the $Sig_{AS\_REQ1}$ by performing calculation on the to-be-signed data including the first authentication result information ciphertext, and generates the $Sig_{AS\_REQ4}$ by performing calculation on the to-be-signed data including the second authentication result information ciphertext.

At S609, the AS-REQ sends the AS-REQVeri to the AS-AAC.

The AS-REQVeri includes the first authentication result information ciphertext, the $Sig_{AS\_REQ1}$, the second authentication result information ciphertext and the $Sig_{AS\_REQ4}$.

At S610, the AS-AAC verifies the $Sig_{AS\_REQ4}$ by using the public key of the AS-REQ.

If the verification is successful, S611 is performed.

At S611, the AS-AAC generates the $Sig_{AS\_AAC2}$ by performing calculation on the to-be-signed data including the second authentication result information ciphertext, and generates the ASVeri according to the first authentication result information ciphertext, the $Sig_{AS\_REQ1}$, the second authentication result information ciphertext and the $Sig_{AS\_AAC2}$.

At S612, the AS-AAC sends the ASVeri to the AAC.

At S613, the AAC verifies the $Sig_{AS\_AAC2}$ by using the public key of the AS-AAC, if the verification is successful, encrypts the to-be-encrypted data including the first authentication result information ciphertext, the $Sig_{AS\_REQ1}$ and the $Nonce_{AACPub}$ by using the message encryption key, so as to generate the $EncData_{AAC}$.

At S614, the AAC sends a third authentication response message AACAuth to the REQ.

The AACAuth includes the $EncData_{AAC}$.

At S615, the REQ decrypts the $EncData_{AAC}$ by using the message encryption key, so as to obtain the first authentication result information ciphertext, the $Sig_{AS\_REQ1}$ and the $Nonce_{AACPub}$.

At S616, the REQ verifies the $Sig_{AS\_REQ1}$ by using the public key of the AS-REQ.

If the verification is successful, S617 is then performed.

At S617, the REQ decrypts the first authentication result information ciphertext by using the $Nonce_{AACPub}$, so as to obtain the $Pub_{AAC}$.

At S618, the REQ determines the identity authentication result of the AAC according to the $Res_{AAC}$ in the $Pub_{AAC}$.

When the REQ determines that the AAC is legal, S619 is performed; and when the REQ determines that the AAC is illegal, the current authentication process is finished.

At S619, the REQ encrypts the information including the $Nonce_{REQPub}$ by using the message encryption key, so as to obtain the $EncData_{REQ}$.

At S620, the REQ sends a fourth authentication response message REQAuth to the AAC.

The REQAuth includes the $EncData_{REQ}$.

At S621, the AAC decrypts the $EncData_{REQ}$ by using the message encryption key, so as to obtain the $Nonce_{REQPub}$, and decrypts the second authentication result information ciphertext by using the $Nonce_{REQPub}$, so as to obtain the $Pub_{REQ}$.

At S622, the AAC determines an identity authentication result of the REQ according to the $Res_{REQ}$ in the $Pub_{REQ}$.

Figure 7:
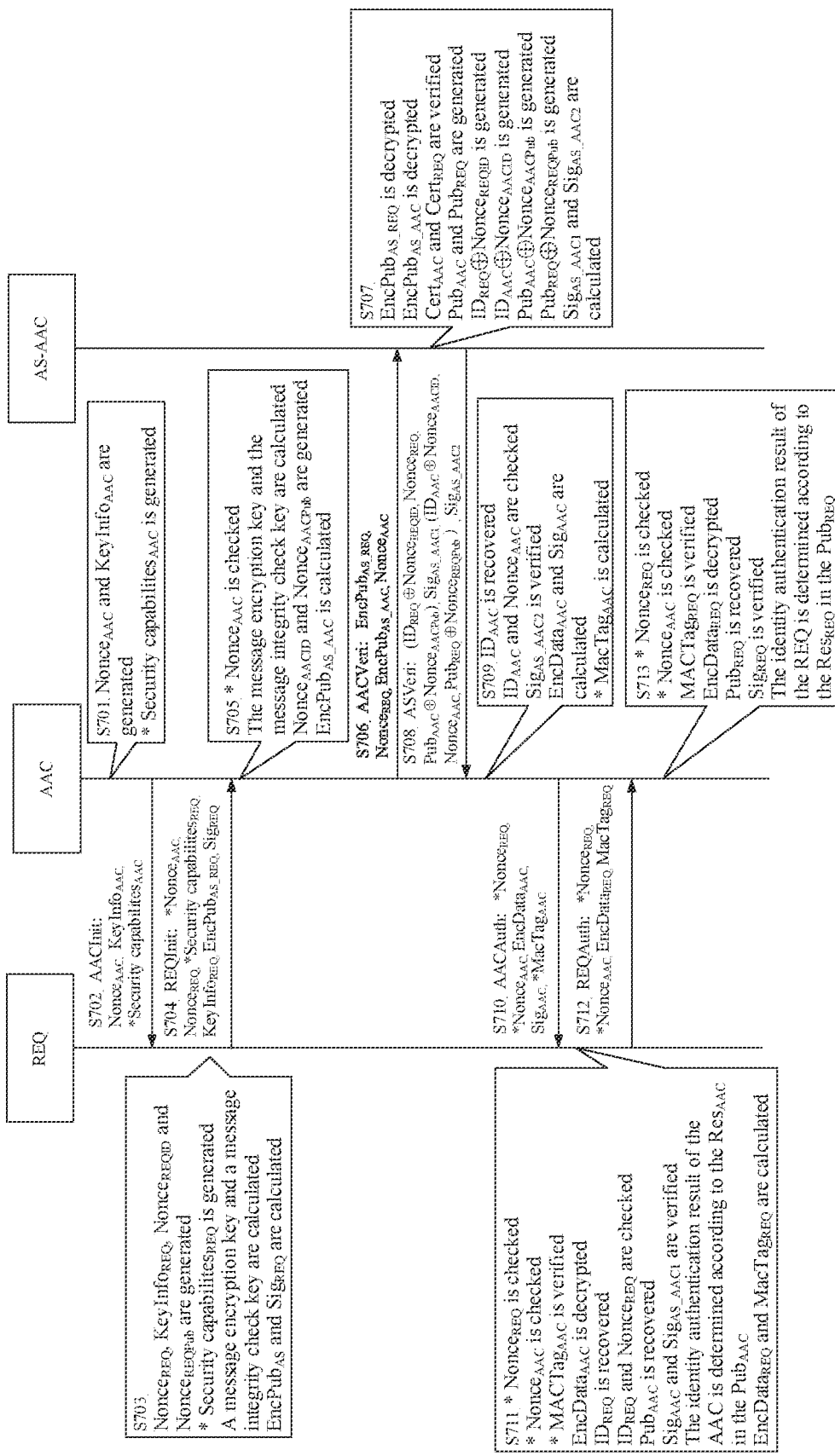
FIG. 7 is a schematic diagram of still another identity authentication method in a non-roaming case according to an embodiment of the present disclosure, wherein "*" represents an optional field or an optional operation.

FIG. 7 is yet another embodiment of the identity authentication method in the non-roaming case. The AS-AAC (or the AS-REQ) may be used to represent the AS commonly trusted by the REQ and the AAC. In this embodiment, the process of negotiating the message encryption key between the REQ and the AAC is fused in the identity authentication process in parallel, better facilitating project Implementation. The $Sig_{REQ}$ is verified by the AAC, and the $Sig_{AAC}$ is verified by the REQ. The method includes the following steps.

At S701, the AAC generates the $Nonce_{AAC}$ and the $KeyInfo_{AAC}$, and generates the Security capabilities$_{AAC}$ according to requirements.

At S702, the AAC sends the AACInit to the REQ.

The AACInit includes the $Nonce_{AAC}$, the $KeyInfo_{AAC}$ and the Security capabilities$_{AAC}$. The Security capabilities$_{AAC}$ is an optional field, represents the security capability parameter information supported by the AAC, and includes an identity authentication suite supported by the AAC, one or more symmetric encryption algorithms, one or more integrity check algorithms and/or one or more key derivation algorithms (which also applies throughout the entire text).

At S703, the REQ generates the $Nonce_{REQ}$, the $KeyInfo_{REQ}$, the $Nonce_{REQID}$ and the $Nonce_{REQPub}$, generates the Security capabilities$_{REQ}$ according to requirements, and performs key exchange calculation according to the temporary private key corresponding to the $KeyInfo_{REQ}$ and the temporary public key included in the $KeyInfo_{AAC}$, so as to generate the first key K1: the K1 is combined with the $Nonce_{AAC}$, the $Nonce_{REQ}$ and other information (other information used by the REQ and the AAC being the same and optional, for example, a specific string), so as to calculate the message encryption key and the message integrity check key by using the negotiated or preset key derivation algorithm, definitely, this step may also be performed when the message integrity check key and/or the message integrity check key needs to be used later, the public key of the encryption certificate is used to calculate the $EncPub_{AS\_REQ}$ of the REQ, and the $Sig_{REQ}$ is calculated.

The Security capabilities$_{REQ}$ is an optional field, and indicates the selection of the specific security policy made by the REQ according to the Security capabilities$_{AAC}$, that is, an identity authentication method, a symmetric encryption algorithm, an integrity check algorithm and/or a key derivation algorithm (which also applies throughout the entire text) that are determined to be used by the REQ. Whether the REQ generates the Security capabilities$_{REQ}$ relays on whether the Security capabilities$_{AAC}$ is carried in the AACInit sent to the REQ by the AAC.

At S704, the REQ sends the REQInit to the AAC.

The REQInit includes the $Nonce_{AAC}$, the $Nonce_{REQ}$, the Security capabilities$_{REQ}$, the $KeyInfo_{REQ}$, the $EncPub_{AS\_REQ}$, and the $Sig_{REQ}$. The $Nonce_{AAC}$ and the Security capabilities$_{REQ}$ are optional fields; and the $Nonce_{AAC}$ shall be equal to a corresponding field in the AACInit. The to-be-encrypted data of the $EncPub_{AS\_REQ}$ includes the $ID_{REQ}$, the $Cert_{REQ}$, the $Nonce_{REQID}$, and the $Nonce_{REQPub}$. The to-be-signed data of the $Sig_{REQ}$ includes other fields before the $Sig_{REQ}$ in the REQInit. For example, when the REQInit successively includes the $Nonce_{AAC}$, the $Nonce_{REQ}$, the Security capabilities$_{REQ}$, the $KeyInfo_{REQ}$, the $EncPub_{AS\_REQ}$ and the $Sig_{REQ}$, the to-be-signed data of the $Sig_{REQ}$ includes the $Nonce_{AAC}$, the $Nonce_{REQ}$, the Security capabilities$_{REQ}$, the $KeyInfo_{REQ}$, and the $EncPub_{AS\_REQ}$; in addition, when the REQInit does not include an $Nonce_{AAC}$ field, the to-be-signed data of the $Sig_{REQ}$ further includes the $Nonce_{AAC}$ field in the AACInit. In the present disclosure, an object to be signed is called the to-be-signed data.

At S705, after receiving the REQInit, the AAC performs the following operations (if there is no special explanation or logical relationship, actions numbered with (1), (2) . . . in this specification do not necessarily have a sequential order due to their numbering, which also applies throughout the entire text).

(1) If there is the $Nonce_{AAC}$ in the REQInit, whether the $Nonce_{AAC}$ is the same as the $Nonce_{AAC}$ generated by the AAC is checked; and if the $Nonce_{AAC}$ is different from the $Nonce_{AAC}$ generated by the AAC, the REQInit is discarded.

(2) Key exchange calculation is performed according to the temporary private key corresponding to the $KeyInfo_{AAC}$ and the temporary public key included in the $KeyInfo_{REQ}$, so as to generate the first key K1; the K1 is combined with the $Nonce_{AAC}$, the $Nonce_{REQ}$ and other information (other information used by the AAC and the REQ being the same and optional, for example, a specific string), so as to calculate the message encryption key and the message integrity check key by using the negotiated or preset key derivation algorithm. Definitely, this step may be performed when the message integrity check key and/or the message integrity check key needs to be used by the AAC.

(3) The $Nonce_{AACID}$ and the $Nonce_{AACPub}$ are generated.

(4) The public key of the encryption certificate is used to calculate the $EncPub_{AS\_AAC}$.

At S706, the AAC sends the AACVeri to the AS-AAC.

The AACVeri includes the $EncPub_{AS\_REQ}$, the $Nonce_{REQ}$, the $EncPub_{AS\_AAC}$, and the $Nonce_{AAC}$. The to-be-encrypted data of the $EncPub_{AS\_AAC}$ includes the $ID_{AAC}$, the $Cert_{AAC}$, the $Nonce_{AACID}$, and the $Nonce_{AACPub}$; and the $EncPub_{AS\_REQ}$ and the $Nonce_{REQ}$ shall respectively be equal to corresponding fields in the REQInit.

At S707, after receiving the AACVeri, the AS-AAC performs the following operations.

(1) The private key corresponding to the encryption certificate is used to respectively decrypt the $EncPub_{AS\_REQ}$ and the $EncPub_{AS\_AAC}$, so as to obtain the $ID_{REQ}$, the $Cert_{REQ}$, the $Nonce_{REQID}$, the $Nonce_{REQPub}*$, the $ID_{AAC}$, the $Cert_{AAC}$, the $Nonce_{AACID}$, and the $Nonce_{AACPub}$.

(2) The legality of the $Cert_{AAC}$ and the $Cert_{REQ}$ is respectively verified to obtain the $Res_{AAC}$ and the $Res_{REQ}$; the $Pub_{AAC}$ is generated according to the information including the $Cert_{AAC}$ and the $Res_{AAC}$; the $Pub_{REQ}$ is generated according to the information including the $Cert_{REQ}$ and the $Res_{REQ}$; an XOR is performed on the $ID_{REQ}$ and the $Nonce_{REQID}$, so as to generate the $ID_{REQ} \oplus Nonce_{REQID}$; the XOR is performed on the $Pub_{REQ}$ and the $Nonce_{REQPub}$, so as to generate the $Pub_{REQ} \oplus Nonce_{REQPub}$; the XOR is performed on the $ID_{AAC}$ and the $Nonce_{AACID}$, so as to generate the $ID_{AAC} \oplus Nonce_{AACID}$; and the XOR is performed on the $Pub_{AAC}$ and the $Nonce_{AACPub}$, so as to generate the $Pub_{AAC} \oplus Nonce_{AACPub}$.

(3) The $Sig_{AS\_AAC1}$ and the $Sig_{AS\_AAC2}$ are generated by means of calculation.

At S708, the AS-AAC sends the ASVeri to the AAC.

The ASVeri includes the $ID_{REQ} \oplus Nonce_{REQID}$, the $Nonce_{REQ}$, the $Pub_{AAC} \oplus Nonce_{AACPub}$, the $Sig_{AS\_AAC1}$, the $ID_{AAC} \oplus Nonce_{AACID}$, the $Nonce_{AAC}$, the $Pub_{REQ} \oplus Nonce_{REQPub}$, and the $Sig_{AS\_AAC2}$. The $ID_{REQ}$, the $Nonce_{REQID}$, the $Nonce_{REQ}$, the $Nonce_{AACPub}$, the $ID_{AAC}$, the $Nonce_{AACID}$, the $Nonce_{AAC}$, and the $Nonce_{REQPub}$ shall respectively be equal to corresponding fields in the AACVeri. The to-be-signed data of the $Sig_{AS\_AAC1}$ includes the $ID_{REQ} \oplus Nonce_{REQID}$, the $Nonce_{REQ}$, and the $Pub_{AAC} \oplus Nonce_{AACPub}$; and the to-be-signed data of the $Sig_{AS\_AAC2}$ includes the $ID_{AAC} \oplus Nonce_{AACID}$, the $Nonce_{AAC}$, and the $Pub_{REQ} \oplus Nonce_{REQPub}$.

At S709, after receiving the ASVeri, the AAC performs the following operations.

(1) The XOR is performed on the $Nonce_{AACID}$ and the $ID_{AAC} \oplus Nonce_{AACID}$, so as to recover the $ID_{AAC}$, and whether the $ID_{AAC}$ is the same as the self $ID_{AAC}$ of the AAC is checked.

(2) Whether the $Nonce_{AAC}$ is the same as the $Nonce_{AAC}$ generated by the AAC is checked.

(3) The $Sig_{AS\_AAC2}$ is verified by using the public key of the AS-AAC.

(4) If the check and the verification are all successful, the $EncData_{AAC}$ is calculated by using the message encryption key; and if any one of the steps of check and verification fails, the ASVeri is immediately discarded.

(5) The $Sig_{AAC}$ is calculated.

(6) The $MacTag_{AAC}$ is calculated according to requirements.

At S710, the AAC sends a third authentication response message AACAuth to the REQ.

The AACAuth includes the $Nonce_{REQ}$, the $Nonce_{AAC}$, the $EncData_{AAC}$, the $Sig_{AAC}$, and the $MacTag_{AAC}$. The $Nonce_{REQ}$, the $Nonce_{AAC}$, and the $MacTag_{AAC}$ are optional fields; and the $Nonce_{REQ}$ and the $Nonce_{AAC}$ shall respectively be equal to the $Nonce_{REQ}$ in the REQInit and the $Nonce_{AAC}$ generated by the AAC. The to-be-encrypted data of the $EncData_{AAC}$ includes the $ID_{REQ} \oplus Nonce_{REQID}$, the $Nonce_{REQ}$, the $Pub_{AAC} \oplus Nonce_{AACPub}$, the $Sig_{AS\_AAC1}$, and $Nonce_{AACPub}$; and the $ID_{REQ} \oplus Nonce_{REQID}$, the $Nonce_{REQ}$, the $Pub_{AAC} \oplus Nonce_{AACPub}$, and the $Sig_{AS\_AAC1}$ shall respectively be equal to corresponding fields in the ASVeri. The to-be-signed data of the $Sig_{AAC}$ includes other fields before the $Sig_{AAC}$ in the AACAuth. A calculation process of the $MacTag_{AAC}$ includes: using the message integrity check key to calculate the information including the fields in the AACAuth other than the $MacTag_{AAC}$ by using the integrity check algorithm, so as to generate the $MacTag_{AAC}$.

At S711, after receiving the AACAuth, the REQ performs the following operations.

(1) If there is the $Nonce_{REQ}$ and/or the $Nonce_{AAC}$ in the AACAuth, whether the $Nonce_{REQ}$ is the same as the $Nonce_{REQ}$ generated by the REQ is checked; and/or whether the $Nonce_{AAC}$ is the same as the received $Nonce_{AAC}$ in the AACInit is checked.

(2) If there is the $MacTag_{AAC}$ in the AACAuth, the $MacTag_{AAC}$ is verified.

A verification process includes: using the message integrity check key to locally calculate the information including the fields in the AACAuth other than the $MacTag_{AAC}$ by using the integrity check algorithm, so as to generate the $MacTag_{AAC}$ (the calculation manner is the same as the manner that the AAC calculates the $MacTag_{AAC}$), and the calculated $MacTag_{AAC}$ is compared with the received $MacTag_{AAC}$ in the AACAuth.

(3) The message encryption key is used to decrypt the $EncData_{AAC}$ by using the symmetric encryption algorithm, so as to obtain the $ID_{REQ} \oplus Nonce_{REQID}$, the $Nonce_{REQ}$, the $Pub_{AAC} \oplus Nonce_{AACPub}$, the $Sig_{AS\_AAC1}$, and the $Nonce_{AACPub}$.

(4) The XOR is performed on the $ID_{REQ} \oplus Nonce_{REQID}$ by using the $Nonce_{REQID}$, so as to recover the $ID_{REQ}$, and whether the $ID_{REQ}$ is the same as the self $ID_{REQ}$ of the REQ is checked.

(5) Whether the $Nonce_{REQ}$ is the same as the $Nonce_{REQ}$ generated by the REQ is checked.

(6) The XOR is performed on the $Nonce_{AACPub}$ and the $Pub_{AAC} \oplus Nonce_{AACPub}$ obtained by means of decryption, so as to recover the $Pub_{AAC}$.

(7) The $Sig_{AS\_AAC1}$ is verified by using the public key of the AS-AAC, and the $Sig_{AAC}$ is verified by using the $Cert_{AAC}$ in the $Pub_{AAC}$.

(8) If any one of the steps of check and verification fails, the AACAuth is immediately discarded; if check and verification are all successful, the identity authentication result of the REQ is determined according to the $Res_{AAC}$ in the $Pub_{AAC}$; and if it is determined that the AAC is illegal, the current authentication process is finished.

(9) The message encryption key is used to calculate the $EncData_{REQ}$.

(10) The $MacTag_{REQ}$ is calculated.

At S712, the REQ sends a fourth authentication response message REQAuth to the AAC.

The AACAuth includes the $Nonce_{REQ}$, the $Nonce_{AAC}$, the $EncData_{REQ}$, and the $MacTag_{REQ}$. The $Nonce_{REQ}$ and the $Nonce_{AAC}$ are optional fields, and shall respectively be equal to the $Nonce_{REQ}$ generated by the REQ and the $Nonce_{AAC}$ in the AACInit. The to-be-encrypted data of the $EncData_{REQ}$ includes the $Nonce_{REQ}$. The calculation process of the $MacTag_{REQ}$ includes: using the message integrity check key to calculate the information including the fields in the REQAuth other than the $MacTag_{REQ}$ by using the integrity check algorithm, so as to generate the $MacTag_{REQ}$.

At S713, after receiving the REQAuth, the AAC performs the following operations.

(1) If there is the $Nonce_{REQ}$ and/or the $Nonce_{AAC}$ in the REQAuth, whether the $Nonce_{REQ}$ is the same as the $Nonce_{REQ}$ in the REQInit is checked; and/or whether the $Nonce_{AAC}$ is the same as the $Nonce_{AAC}$ generated by the AAC is checked.

(2) The $MacTag_{REQ}$ is verified.

A verification process includes: using the message integrity check key to locally calculate the information including the fields in the REQAuth other than the $MacTag_{REQ}$ by using the integrity check algorithm, so as to generate the $MacTag_{REQ}$ (the calculation manner is the same as the manner that the REQ calculates the $MacTag_{REQ}$), and the calculated $MacTag_{REQ}$ is compared with the received $MacTag_{REQ}$ in the REQAuth.

(3) The message encryption key is used to decrypt the $EncData_{REQ}$ by using the symmetric encryption algorithm, so as to obtain the $Nonce_{REQPub}$.

(4) The XOR is performed on the $Nonce_{REQPub}$ and the $Pub_{REQ} \oplus Nonce_{REQPub}$, so as to recover the $Pub_{REQ}$.

(5) The $Sig_{REQ}$ in the REQInit is verified by using the $Cert_{REQ}$ in the $Pub_{REQ}$.

(6) If any one of the steps of check and verification fails, the REQAuth is immediately discarded; if check and verification are all successful, the identity authentication result of the REQ is determined according to the $Res_{REQ}$ in the $Pub_{REQ}$.

It is to be noted that, the REQInit of S704 may not include the $Sig_{REQ}$, while the $Sig_{REQ}$ is added in the REQAuth of S712. That is to say, in S712, the REQ first generates the $Sig_{REQ}$ by performing calculation on the to-be-signed data including the $Nonce_{REQ}$, the $Nonce_{AAC}$, and the $EncData_{REQ}$. In this case, the $Sig_{REQ}$ verified by the AAC in S713 is the $Sig_{REQ}$ in the REQAuth of S712.

Figure 8:
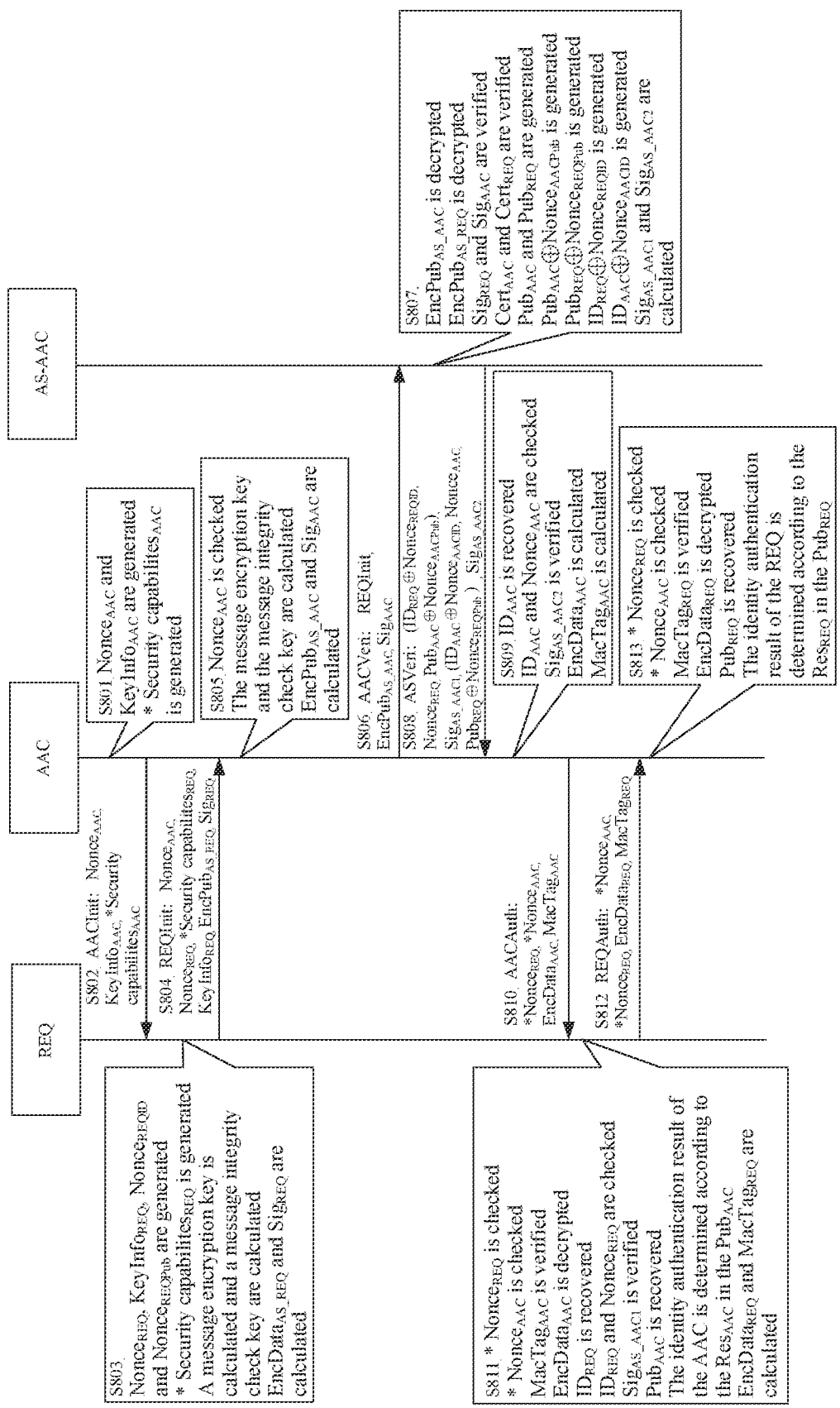
FIG. 8 is a schematic diagram of yet another identity authentication method in a non-roaming case according to an embodiment of the present disclosure, wherein "*" represents an optional field or an optional operation.

FIG. 8 is still another embodiment of the identity authentication method in the non-roaming case. The AS-AAC (or the AS-REQ) may be used to represent the AS commonly trusted by the REQ and the AAC. In this embodiment, the process of negotiating the message encryption key between the REQ and the AAC is fused in the identity authentication process in parallel, better facilitating project Implementation. The $Sig_{REQ}$ and the $Sig_{AAC}$ are verified by the AS-AAC. The method includes the following steps.

At S801, the AAC generates the $Nonce_{AAC}$ and the $KeyInfo_{AAC}$, and generates the Security $capabilities_{AAC}$ according to requirements.

At S802, the AAC sends the AACInit to the REQ.

The AACInit includes the $Nonce_{AAC}$, the $KeyInfo_{AAC}$ and the Security $capabilities_{AAC}$. The Security $capabilities_{AAC}$ is an optional field.

At S803, the REQ generates the $Nonce_{REQ}$, the $KeyInfo_{REQ}$, the $Nonce_{REQID}$ and the $Nonce_{REQPub}$, generates the Security $capabilities_{REQ}$ according to requirements, and performs key exchange calculation according to the temporary private key corresponding to the $KeyInfo_{REQ}$ and the temporary public key included in the $KeyInfo_{AAC}$, so as to generate the first key K1; the K1 is combined with the $Nonce_{AAC}$, the $Nonce_{REQ}$ and other information (other information used by the REQ and the AAC being the same and optional, for example, a specific string), so as to calculate the message encryption key and the message integrity check key by using the negotiated or preset key derivation algorithm, definitely, this step may also be performed when the message integrity check key and/or the message integrity check key needs to be used later; the public key of the encryption certificate is used to calculate the $EncPub_{AS\_REQ}$ of the REQ; and the $Sig_{REQ}$ is calculated.

At S804, the REQ sends the REQInit to the AAC.

The REQInit includes the $Nonce_{AAC}$, the $Nonce_{REQ}$, the Security $capabilities_{REQ}$, the $KeyInfo_{REQ}$, the $EncPub_{AS\_REQ}$, and the $Sig_{REQ}$. The Security $capabilities_{REQ}$ is an optional field; and the $Nonce_{AAC}$ shall be equal to a corresponding field in the AACInit. The to-be-encrypted data of the $EncPub_{AS\_REQ}$ includes the $ID_{REQ}$, the $Cert_{REQ}$, the $Nonce_{REQID}$, and the $Nonce_{REQPub}$. The to-be-signed data of the $Sig_{REQ}$ includes other fields before the $Sig_{REQ}$ in the REQInit.

At S805, after receiving the REQInit, the AAC performs the following operations.

(1) Whether the $Nonce_{AAC}$ in the REQInit is the same as the $Nonce_{AAC}$ generated by the AAC is checked, and if no, the REQInit is discarded.

(2) Key exchange calculation is performed according to the temporary private key corresponding to the $KeyInfo_{AAC}$ and the temporary public key included in the $KeyInfo_{REQ}$, so as to generate the first key K1; the K1 is combined with the $Nonce_{AAC}$, the $Nonce_{REQ}$ and other information (other information used by the AAC and the REQ being the same and optional, for example, a specific string), so as to calculate the message encryption key and the message integrity check key by using the negotiated or preset key derivation algorithm. Definitely, this step may be performed when the message integrity check key and/or the message integrity check key needs to be used by the AAC.

(3) The $Nonce_{AAC}$, and the $Nonce_{AACPub}$ are generated.

(4) The public key of the encryption certificate is used to calculate the $EncPub_{AS\_AAC}$.

(5) The $Sig_{AAC}$ is calculated.

At S806, the AAC sends the AACVeri to the AS-AAC.

The AACVeri includes the REQInit, the $EncPub_{AS\_AAC}$, and the $Sig_{AAC}$. The to-be-encrypted data of the $EncPub_{AS\_AAC}$ includes the $ID_{AAC}$, the $Cert_{AAC}$, the $Nonce_{AACID}$, and the $Nonce_{AACPub}$. The to-be-signed data of the $Sig_{AAC}$ includes other fields before the $Sig_{AAC}$ in the AACVeri.

At S807, after receiving the AACVeri, the AS-AAC performs the following operations.

(1) The private key corresponding to the encryption certificate is used to respectively decrypt the $EncPub_{AS\_AAC}$ and the EncPub$_{AS\_REQ}$ in the REQInit, so as to obtain the ID$_{AAC}$, the Cert$_{AAC}$, the Nonce$_{AACID}$, the Nonce$_{AACPub}$, the ID$_{REQ}$, the Cert$_{REQ}$, the Nonce$_{REQ}$, and the Nonce$_{REQPub}$.

(2) The Sig$_{REQ}$ in the REQInit is verified by using the Cert$_{REQ}$; and the Sig$_{AAC}$ is verified by using the Cert$_{AAC}$.

(3) If the verification is successful, the legality of the Cert$_{AAC}$ and the Cert$_{REQ}$ is respectively verified to obtain the Res$_{AAC}$ and the Res$_{REQ}$; the Pub$_{AAC}$ is generated according to the information including the Res$_{AAC}$; the Pub$_{REQ}$ is generated according to the information including the Res$_{REQ}$; an XOR is performed on the ID$_{REQ}$ and the Nonce$_{REQID}$, so as to generate the ID$_{REQ}\oplus$Nonce$_{REQID}$; the XOR is performed on the Pub$_{REQ}$ and the Nonce$_{REQID}$, so as to generate the Pub$_{REQ}\oplus$Nonce$_{REQPub}$; the XOR is performed on the ID$_{AAC}$ and the Nonce$_{AACID}$, so as to generate the ID$_{AAC}\oplus$Nonce$_{AACID}$; and the XOR is performed on the Pub$_{AAC}$ and the Nonce$_{AACPub}$, so as to generate the Pub$_{AAC}\oplus$Nonce$_{AACPub}$.

(4) The Sig$_{AS\_AAC1}$ and the Sig$_{AS\_AAC2}$ are generated by means of calculation.

At S808, the AS-AAC sends the ASVeri to the AAC.

The ASVeri includes the ID$_{REQ}\oplus$Nonce$_{REQID}$, the Nonce$_{REQ}$, the Pub$_{AAC}\oplus$Nonce$_{AACPub}$, the Sig$_{AS\_AAC1}$, the ID$_{AAC}\oplus$Nonce$_{AACID}$, the Nonce$_{AAC}$, the Pub$_{REQ}\oplus$Nonce$_{REQPub}$, and the Sig$_{AS\_AAC2}$. The ID$_{REQ}$, the Nonce$_{REQID}$, the Nonce$_{REQ}$, the Nonce$_{AACPub}$, the ID$_{AAC}$, the Nonce$_{AACID}$, the Nonce$_{AAC}$, and the Nonce$_{REQPub}$, shall respectively be equal to corresponding fields in the AACVeri. The to-be-signed data of the Sig$_{AS\_AAC1}$ includes the ID$_{REQ}\oplus$Nonce$_{REQID}$, the Nonce$_{REQ}$, and the Pub$_{AAC}\oplus$Nonce$_{AACPub}$; and the to-be-signed data of the Sig$_{AS\_AAC2}$ includes the ID$_{AAC}\oplus$Nonce$_{AACID}$, the Nonce$_{AAC}$, and the Pub$_{REQ}\oplus$Nonce$_{REQPub}$.

At S809, after receiving the ASVeri, the AAC performs the following operations.

(1) The XOR is performed on the Nonce$_{AACID}$ and the ID$_{AAC}\oplus$Nonce$_{AACID}$, so as to recover the ID$_{AAC}$, and whether the ID$_{AAC}$ is the same as the self ID$_{AAC}$ of the AAC is checked.

(2) Whether the Nonce$_{AAC}$ is the same as the Nonce$_{AAC}$ generated by the AAC is checked.

(3) The Sig$_{AS\_AAC2}$ is verified by using the public key of the AS-AAC.

(4) If the check and the verification are all successful, the EncData$_{AAC}$ is calculated by using the message encryption key; and if any one of the steps of check and verification fails, the ASVeri is immediately discarded.

(5) The MacTag$_{AAC}$ is calculated.

At S810, the AAC sends a third authentication response message AACAuth to the REQ.

The AACAuth includes the Nonce$_{REQ}$, the Nonce$_{AAC}$, the EncData$_{AAC}$, and the MacTag$_{AAC}$. The Nonce$_{REQ}$ and the Nonce$_{AAC}$ are optional fields, and shall respectively be equal to the Nonce$_{REQ}$ in the REQInit and the Nonce$_{AAC}$ generated by the AAC. The to-be-encrypted data of the EncData$_{AAC}$ includes the ID$_{REQ}\oplus$Nonce$_{REQID}$, the Nonce$_{REQ}$, the Pub$_{AAC}\oplus$Nonce$_{AACPub}$, the Sig$_{AS\_AAC1}$, and Nonce$_{AACPub}$; and the ID$_{REQ}\oplus$Nonce$_{REQID}$, the Nonce$_{REQ}$, the Pub$_{AAC}\oplus$Nonce$_{AACPub}$, and the Sig$_{AS\_AAC1}$ shall respectively be equal to corresponding fields in the ASVeri. The calculation process of the MacTag$_{AAC}$ is described in the embodiment of FIG. 7.

At S811, after receiving the AACAuth, the REQ performs the following operations.

(1) If there is the Nonce$_{REQ}$ and/or the Nonce$_{AAC}$ in the AACAuth, whether the Nonce$_{REQ}$ is the same as the Nonce$_{REQ}$ generated by the REQ is checked; and/or whether the Nonce$_{AAC}$ is the same as the received Nonce$_{AAC}$ in the AACInit is checked.

(2) The MacTag$_{AAC}$ is verified; and a verification process is described in the embodiment of FIG. 7.

(3) The message encryption key is used to decrypt the EncData$_{AAC}$ by using the symmetric encryption algorithm, so as to obtain the ID$_{REQ}\oplus$Nonce$_{REQID}$, the Nonce$_{REQ}$, the Pub$_{AAC}\oplus$Nonce$_{AACPub}$, the Sig$_{AS\_AAC1}$, and the Nonce$_{AACPub}$.

(4) The XOR is performed on the ID$_{REQ}\oplus$Nonce$_{REQID}$ by using the Nonce$_{REQID}$, so as to recover the ID$_{REQ}$, and whether the ID$_{REQ}$ is the same as the self ID$_{REQ}$ of the REQ is checked.

(5) Whether the Nonce$_{REQ}$ is the same as the Nonce$_{REQ}$ generated by the REQ is checked.

(6) The Sig$_{AS\_AAC1}$ is verified by using the public key of the AS-AAC.

(7) If any one of the steps of check and verification fails, the AACAuth is immediately discarded; if check and verification are all successful, the XOR is performed on the Nonce$_{AACPub}$, and the Pub$_{AAC}\oplus$Nonce$_{AACPub}$ obtained by means of decryption, so as to recover the Pub$_{AAC}$; the identity authentication result of the REQ is determined according to the Res$_{AAC}$ in the Pub$_{AAC}$; and if it is determined that the AAC is illegal, the current authentication process is finished.

(8) The message encryption key is used to calculate the EncData$_{REQ}$.

(9) The MacTag$_{REQ}$ is calculated.

At S812, the REQ sends a fourth authentication response message REQAuth to the AAC.

The REQAuth includes the Nonce$_{AAC}$, the Nonce$_{REQ}$, the EncData$_{REQ}$, and the MacTag$_{REQ}$. The Nonce$_{REQ}$ and the Nonce$_{AAC}$ are optional fields, and shall respectively be equal to the Nonce$_{REQ}$ generated by the REQ and the Nonce$_{AAC}$ in the AACInit. The to-be-encrypted data of the EncData$_{REQ}$ includes the Nonce$_{REQPub}$. The calculation process of the MacTag$_{REQ}$ is described in the embodiment of FIG. 7.

At S813, after receiving the REQAuth, the AAC performs the following operations.

(1) If there is the Nonce$_{REQ}$ and/or the Nonce$_{AAC}$ in the REQAuth, whether the Nonce$_{REQ}$ is the same as the Nonce$_{REQ}$ in the REQInit is checked; and/or whether the Nonce$_{AAC}$ is the same as the Nonce$_{AAC}$ generated by the AAC is checked.

(2) The MacTag$_{REQ}$ is verified; and a verification process is described in the embodiment of FIG. 7.

(3) If the check and the verification are all successful, the message encryption key is used to decrypt the EncData$_{REQ}$ by using the symmetric encryption algorithm, so as to obtain the Nonce$_{REQPub}$; and if any one of the steps of check and verification fails, the REQAuth is immediately discarded.

(4) The XOR is performed on the Nonce$_{REQPub}$ and the Pub$_{REQ}\oplus$Nonce$_{REQPub}$, so as to recover the Pub$_{REQ}$.

(5) An identity authentication result of the REQ is determined according to the Res$_{REQ}$ in the Pub$_{REQ}$.

Figure 9:
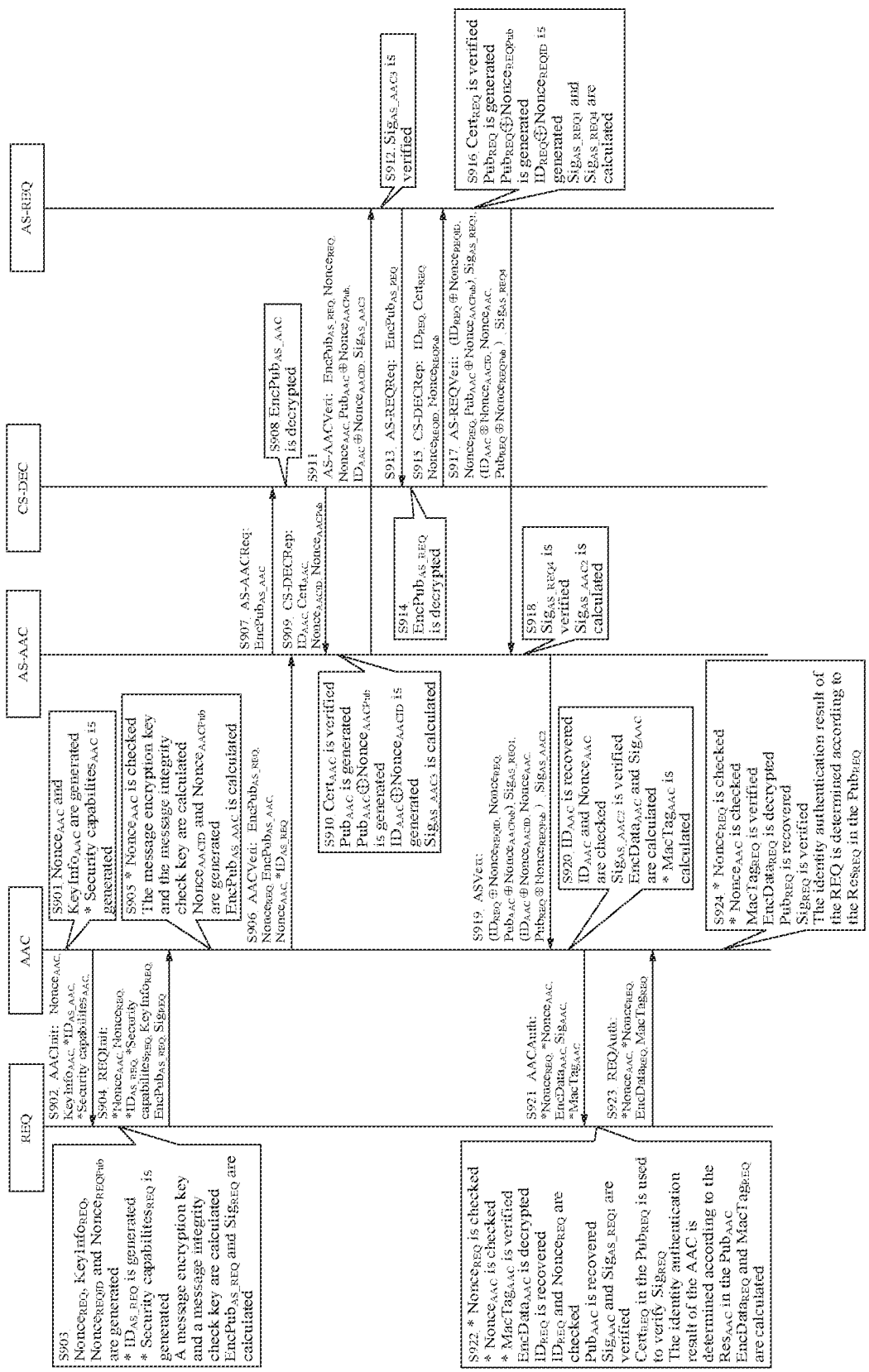
FIG. 9 is a schematic diagram of still another identity authentication method in a roaming case according to an embodiment of the present disclosure, wherein "*" represents an optional field or an optional operation.

FIG. 9 is another embodiment of the identity authentication method in the roaming case. In this embodiment, the process of negotiating the message encryption key between the REQ and the AAC is fused in the identity authentication process in parallel, better facilitating project Implementation. The Sig$_{REQ}$ is verified by the AAC, and the Sig$_{AAC}$ is verified by the REQ. The method includes the following steps.

At S901, the AAC generates the $Nonce_{AAC}$ and the KeyInfo$_{AAC}$, and generates the Security capabilities$_{AAC}$ according to requirements.

At S902, the AAC sends the AACInit to the REQ.

The AACInit includes the $Nonce_{AAC}$, the KeyInfo$_{AAC}$, the $ID_{AS\_AAC}$, and the Security capabilities$_{AAC}$. The Security capabilities$_{AAC}$ is an optional field; and the $ID_{AS\_AAC}$ is an optional field and represents the identity identifier of at least one AS trusted by the AAC, so as to make the REQ determine, according to the $ID_{AS\_AAC}$, whether there is a commonly trusted AS (which also applies throughout the entire text).

At S903, the REQ generates the $Nonce_{REQ}$, the KeyInfo$_{REQ}$, the $Nonce_{REQID}$ and the $Nonce_{REQPub}$, generates the $ID_{AS\_REQ}$ and the Security capabilities$_{REQ}$ according to requirements, and performs key exchange calculation according to the temporary private key corresponding to the KeyInfo$_{REQ}$ and the temporary public key included in the KeyInfo$_{AAC}$, so as to generate the first key K1; the K1 is combined with the $Nonce_{AAC}$, the $Nonce_{REQ}$ and other information (other information used by the REQ and the AAC being the same and optional, for example, a specific string), so as to calculate the message encryption key and the message integrity check key by using the negotiated or preset key derivation algorithm, definitely, this step may also be performed when the message integrity check key and/or the message integrity check key needs to be used later; the public key of the encryption certificate is used to calculate the $EncPub_{AS\_REQ}$ of the REQ; and the $Sig_{REQ}$ is calculated.

The $ID_{AS\_REQ}$ and the Security capabilities$_{AAC}$ are optional fields. The $ID_{AS\_REQ}$ represents the identity identifier of at least one AS trusted by the REQ, when there is the $ID_{AS\_AAC}$ in the AACInit, the REQ tries to select, from the trusted ASs, at least one AS same as that in the $ID_{AS\_AAC}$ as the $ID_{AS\_REQ}$; if the selection fails, the at least one trusted AS as the $ID_{AS\_REQ}$; and when there is no $ID_{AS\_AAC}$ in the AACInit, the REQ uses the at least one trusted AS as the $ID_{AS\_REQ}$ (which also applies hereinafter).

At S904, the REQ sends the REQInit to the AAC.

The REQInit includes the $Nonce_{AAC}$, the $Nonce_{REQ}$, the $ID_{AS\_REQ}$, the Security capabilities$_{REQ}$, the KeyInfo$_{REQ}$, the $EncPub_{AS\_REQ}$, and the $Sig_{REQ}$. The $Nonce_{AAC}$, the $ID_{AS\_REQ}$ and the Security capabilities$_{REQ}$ are optional fields; and the $Nonce_{AAC}$ shall be equal to a corresponding field in the AACInit. The to-be-encrypted data of the $EncPub_{AS\_REQ}$ includes the $ID_{REQ}$, the $Cert_{REQ}$, the $Nonce_{REQID}$, and the $Nonce_{REQPub}$. The to-be-signed data of the $Sig_{REQ}$ includes other fields before the $Sig_{REQ}$ in the REQInit. When the REQInit does not include the $Nonce_{AAC}$ field, the to-be-signed data of the $Sig_{REQ}$ further includes the $Nonce_{AAC}$ field in the AACInit.

At S905, after receiving the REQInit, the AAC performs the following operations.

(1) If there is the $Nonce_{AAC}$ in the REQInit, whether the $Nonce_{AAC}$ is the same as the $Nonce_{AAC}$ generated by the AAC is checked; and if the $Nonce_{AAC}$ is different from the $Nonce_{AAC}$ generated by the AAC, the REQInit is discarded.

(2) Key exchange calculation is performed according to the temporary private key corresponding to the KeyInfo$_{AAC}$ and the temporary public key included in the KeyInfo$_{REQ}$, so as to generate the first key K1; the K1 is combined with the $Nonce_{AAC}$, the $Nonce_{REQ}$ and other information (other information used by the AAC and the REQ being the same and optional, for example, a specific string), so as to calculate the message encryption key and the message integrity check key by using the negotiated or preset key derivation algorithm. Definitely, this step may be performed when the message integrity check key and/or the message integrity check key needs to be used by the AAC.

(3) The $Nonce_{AACID}$ and the $Nonce_{AACPub}$ are generated.

(4) The public key of the encryption certificate is used to calculate the $EncPub_{AS\_AAC}$.

(5) If the REQInit carries the $ID_{AS\_REQ}$, and the AACInit carries the $ID_{AS\_AAC}$, the AAC determines whether there is the identity identifier of at least one same AS in the $ID_{AS\_REQ}$ and the $ID_{AS\_AAC}$; if so, that is, in the non-roaming case, the AAC determines the AS-AAC involved in identity authentication from the identity identifier of the AS that is commonly trusted by at least one REQ and the AAC; and if no, that is, in the roaming case, the AAC needs to determine, according to the $ID_{AS\_AAC}$, the AS-AAC involved in identity authentication, and sends the $ID_{AS\_REQ}$ to the AS-AAC, such that the AS-AAC determines the AS-REQ according to the $ID_{AS\_REQ}$.

Alternatively, if the REQInit carries the $ID_{AS\_REQ}$, but the AACInit does not carry the $ID_{AS\_AAC}$, the AAC determines whether there is the identity identifier of at least one same AS in the ASs trusted by the $ID_{AS\_REQ}$ and the AAC; if so, that is, in the non-roaming case, the AAC determines the AS-AAC involved in identity authentication from the identity identifier of the AS that is commonly trusted by at least one REQ and the AAC; and if no, that is, in the roaming case, the AAC needs to determine, according to the AS trusted by the ACC, the AS-AAC involved in identity authentication, and sends the $ID_{AS\_REQ}$ to the AS-AAC, such that the AS-AAC determines the AS-REQ according to the $ID_{AS\_REQ}$.

It is to be noted that, in this embodiment, the result of the determination is the roaming case.

At S906, the AAC sends the AACVeri to the AS-AAC.

The AACVeri includes the $EncPub_{AS\_REQ}$, the $Nonce_{REQ}$, the $EncPub_{AS\_AAC}$, the $Nonce_{AAC}$, and the $ID_{AS\_REQ}$. The $ID_{AS\_REQ}$ is an optional field; and the $EncPub_{AS\_REQ}$, the $Nonce_{REQ}$, and the $ID_{AS\_REQ}$ shall respectively be equal to corresponding fields in the REQInit. The to-be-encrypted data of the $EncPub_{AS\_AAC}$ includes the $ID_{AAC}$, the $Cert_{AAC}$, the $Nonce_{AAC}$, and the $Nonce_{AACPub}$.

At S907, after receiving the AACVeri, the AS-AAC sends a first decryption request message AS-AACReq to a Certificate Sever-Decrypt (CS-DEC).

The AS-AACReq includes the $EncPub_{AS\_AAC}$.

At S908, after receiving the AS-AACReq, the CS-DEC decrypts the $EncPub_{AS\_AAC}$, so as to obtain the $ID_{AAC}$, the $Cert_{AAC}$, the $Nonce_{AACID}$, and the $Nonce_{AACPub}$.

At S909, the CS-DEC sends a first decryption response message CS-DECRep to the AS-AAC.

The CS-DECRep includes the $ID_{AAC}$, the $Cert_{AAC}$, the $Nonce_{AAC}$, and the $Nonce_{AAC}*$, which are obtained by means of decryption.

At S910, after receiving the CS-DECRep, the AS-AAC performs the following operations.

(1) The legality of the $Cert_{AAC}$ is verified to obtain the $Res_{AAC}$, and the $Pub_{AAC}$ is generated according to the information including the $Cert_{AAC}$ and the $Res_{AAC}$.

(2) The XOR is performed on the $Nonce_{AACPub}$ and the $Pub_{AAC}$, so as to generate the $Pub_{AAC} \oplus Nonce_{AACPub}$.

(3) The XOR is performed on the $Nonce_{AACID}$ and the $ID_{AAC}$, so as to generate the $ID_{AAC} \oplus Nonce_{AACID}$.

(4) If there is the $ID_{AS\_REQ}$ in the AACVeri, the AS-AAC determines the AS-REQ according to the $ID_{AS\_REQ}$; and if no, it indicates that the AS-REQ has been known by the AS-AAC.

(5) The $Sig_{AS\_AAC3}$ is calculated.

At S911, the AS-AAC sends the AS-AACVeri to the AS-REQ.

The AS-AACVeri includes the $EncPub_{AS\_REQ}$, the $Nonce_{REQ}$, the $Nonce_{AAC}$, the $Pub_{AAC} \oplus Nonce_{AACPub}$, the $ID_{AAC} \oplus Nonce_{AACID}$, and the $Sig_{AS\_AAC3}$. The to-be-signed data of the $Sig_{AS\_AAC3}$ includes other fields before the $Sig_{AS\_AAC3}$ in the AS-AACVeri; the $Nonce_{REQ}$, the $Nonce_{AAC}$, and the $EncPub_{AS\_REQ}$ shall be respectively equal to corresponding fields in the AACVeri; and the $Nonce_{REQ}$, the $Nonce_{AACPub}$, the $ID_{AAC}$, and the $Nonce_{AACID}$ shall be respectively equal to corresponding fields in the CS-DECRep.

At S912, after receiving the AS-AACVeri, the AS-REQ verifies the $Sig_{AS\_AAC3}$ by using the public key of the AS-AAC.

If the verification is successful, S913 is performed.

At S913, the AS-REQ sends a second decryption request message AS-REQReq to the CS-DEC.

The AS-REQReq includes the $EncPub_{AS\_REQ}$, and the $EncPub_{AS\_REQ}$ shall be equal to the corresponding field in the AS-AACVeri.

At S914, the CS-DEC decrypts the $EncPub_{AS\_REQ}$, so as to obtain the $Cert_{REQ}$, the $ID_{REQ}$, the $Nonce_{REQID}$, and the $Nonce_{REQPub}$.

At S915, the CS-DEC sends a second decryption response message CS-DECRep to the AS-REQ.

The CS-DECRep includes the $Cert_{REQ}$, the $ID_{REQ}$, the $Nonce_{REQID}$ and the $Nonce_{REQPub}$, which are obtained by means of decryption.

At S916, after receiving the CS-DECRep, the AS-REQ performs the following operations.

(1) The legality of the $Cert_{REQ}$ is verified to obtain the $Res_{REQ}$, and the $Pub_{REQ}$ is generated according to the information including the $Cert_{REQ}$ and the $Res_{REQ}$.

(2) The XOR is performed on the $Pub_{REQ}$ and the $Nonce_{REQPub}$, so as to generate the $Pub_{REQ} \oplus Nonce_{REQPub}$.

(3) The XOR is performed on the $ID_{REQ}$ and the $Nonce_{REQID}$, so as to generate the $ID_{REQ} \oplus Nonce_{REQID}$.

(4) The $Sig_{AS\_REQ1}$ and the $Sig_{AS\_REQ4}$, are calculated.

At S917, the AS-REQ sends the AS-REQVeri to the AS-AAC.

The AS-REQVeri includes the $ID_{REQ} \oplus Nonce_{REQID}$, the $Nonce_{REQ}$, the $Pub_{AAC} \oplus Nonce_{AACPub}$, the $Sig_{AS\_REQ1}$, the $ID_{AAC} \oplus Nonce_{AACID}$, the $Nonce_{AAC}$, the $Pub_{REQ} \oplus Nonce_{REQPub}$, and the $Sig_{AS\_REQ4}$. The $ID_{REQ}$, the $Nonce_{REQID}$ and the $Nonce_{REQPub}$ shall be respectively equal to corresponding fields in the CS-DECRep; and the $Nonce_{REQ}$, the $ID_{AAC} \oplus Nonce_{AACID}$, the $Nonce_{AAC}$, and the $Pub_{AAC} \oplus Nonce_{AACPub}$ shall be respectively equal to corresponding fields in the AS-AACVeri. The to-be-signed data of the $Sig_{AS\_REQ1}$ includes the $ID_{REQ} \oplus Nonce_{REQID}$, the $Nonce_{REQ}$, and the $Pub_{AAC} \oplus Nonce_{AACPub}$; and the to-be-signed data of the $Sig_{AS\_REQ4}$ includes the $ID_{AAC} \oplus Nonce_{AACID}$, the $Nonce_{AAC}$, and the $Pub_{REQ} \oplus Nonce_{REQPub}$.

At S918, after receiving the AS-REQVeri, the AS-AAC performs the following operations.

(1) The $Sig_{AS\_REQ4}$ is verified by using the public key of the AS-REQ; if the verification fails, the AS-REQVeri is discarded.

(2) The $Sig_{AS\_AAC2}$ is calculated.

At S919, the AS-AAC sends the ASVeri to the AAC.

The ASVeri includes the $ID_{REQ} \oplus Nonce_{REQID}$, the $Nonce_{REQ}$, the $Pub_{AAC} \oplus Nonce_{AACPub}$, the $Sig_{AS\_REQ1}$, the $ID_{AAC} \oplus Nonce_{AACID}$, the $Nonce_{AAC}$, the $Pub_{REQ} \oplus Nonce_{REQPub}$, and the $Sig_{AS\_AAC2}$. The $ID_{REQ} \oplus Nonce_{REQID}$, the $Nonce_{REQ}$, the $Pub_{AAC} \oplus Nonce_{AACPub}$, the $Sig_{AS\_REQ1}$, the $ID_{AAC} \oplus Nonce_{AACID}$, the $Nonce_{AAC}$, and the $Pub_{REQ} \oplus Nonce_{REQPub}$, shall be respectively equal to corresponding fields in the AS-REQVeri. The to-be-signed data of the $Sig_{AS\_AAC2}$ includes the $ID_{AAC} \oplus Nonce_{AACID}$, the $Nonce_{AAC}$, and the $Pub_{REQ} \oplus Nonce_{REQPub}$.

At S920, after receiving the ASVeri, the AAC performs the following operations.

(1) The XOR is performed on the $Nonce_{AACID}$ and the $ID_{AAC} \oplus Nonce_{AACID}$, so as to recover the $ID_{AAC}$, and whether the $ID_{AAC}$ is the same as the self $ID_{AAC}$ of the AAC is checked.

(2) Whether the $Nonce_{AAC}$ is the same as the $Nonce_{AAC}$ generated by the AAC is checked.

(3) The $Sig_{AS\_AAC2}$ is verified by using the public key of the AS-AAC.

(4) If the check and the verification are all successful, the $EncData_{AAC}$ is calculated by using the message encryption key; and if any one of the steps of check and verification fails, the ASVeri is immediately discarded.

(5) The $Sig_{AAC}$ is calculated.

(6) The $MacTag_{AAC}$ is calculated according to requirements.

At S921, the AAC sends a third authentication response message AACAuth to the REQ.

The AACAuth includes the $Nonce_{REQ}$, the $Nonce_{AAC}$, the $EncData_{AAC}$, the $Sig_{AAC}$, and the $MacTag_{AAC}$. The $Nonce_{REQ}$, the $Nonce_{AAC}$, and the $MacTag_{AAC}$ are optional fields; and the $Nonce_{REQ}$ and the $Nonce_{AAC}$ shall respectively be equal to the $Nonce_{REQ}$ in the REQInit and the $Nonce_{AAC}$ generated by the AAC. The to-be-encrypted data of the $EncData_{AAC}$ includes the $ID_{REQ} \oplus Nonce_{REQID}$, the $Nonce_{REQ}$, the $Pub_{AAC} \oplus Nonce_{AACPub}$, the $Sig_{AS\_REQ1}$, and $Nonce_{AACPub}$; and the $ID_{REQ} \oplus Nonce_{REQID}$, the $Nonce_{REQ}$, the $Pub_{AAC} \oplus Nonce_{AACPub}$, and the $Sig_{AS\_REQ1}$ shall respectively be equal to corresponding fields in the ASVeri. The to-be-signed data of the $Sig_{AAC}$ includes other fields before the $Sig_{AAC}$ in the AACAuth; and the calculation process of the $MacTag_{AAC}$ is described in the embodiment of FIG. 7.

At S922, after receiving the AACAuth, the REQ performs the following operations.

(1) If there is the $Nonce_{REQ}$ and/or the $Nonce_{AAC}$ in the AACAuth, whether the $Nonce_{REQ}$ is the same as the $Nonce_{REQ}$ generated by the REQ is checked; and/or whether the $Nonce_{AAC}$ is the same as the received $Nonce_{AAC}$ in the AACInit is checked.

(2) If there is the $MacTag_{AAC}$ in the AACAuth, the $MacTag_{AAC}$ is verified; and a verification process is described in the embodiment of FIG. 7.

(3) The message encryption key is used to decrypt the $EncData_{AAC}$ by using the symmetric encryption algorithm, so as to obtain the $ID_{REQ} \oplus Nonce_{REQID}$, the $Nonce_{REQ}$, the $Pub_{AAC} \oplus Nonce_{AACPub}$, the $Sig_{AS\_REQ1}$, and the $Nonce_{AACPub}$.

4) The XOR is performed on the $ID_{REQ} \oplus Nonce_{REQID}$ by using the $Nonce_{REQID}$, so as to recover the $ID_{REQ}$, and whether the $ID_{REQ}$ is the same as the self $ID_{REQ}$ of the REQ is checked.

(5) Whether the $Nonce_{REQ}$ is the same as the $Nonce_{REQ}$ generated by the REQ is checked.

(6) The XOR is performed on the $Nonce_{AACPub}$ and the $Pub_{AAC} \oplus Nonce_{AACPub}$ obtained by means of decryption, so as to recover the $Pub_{AAC}$.

(7) The $Sig_{AS\_REQ1}$ is verified by using the public key of the AS-REQ, and the $Sig_{AAC}$ is verified by using the $Cert_{AAC}$ in the $Pub_{AAC}$.

(8) If any one of the steps of check and verification fails, the AACAuth is immediately discarded; if check and verification are all successful, the identity authentication result of the AAC is determined according to the $Res_{AAC}$ in the $Pub_{AAC}$; and if it is determined that the AAC is illegal, the current authentication process is finished.

(9) The message encryption key is used to calculate the $EncData_{REQ}$.

(10) The $MacTag_{REQ}$ is calculated.

At S923, the REQ sends a fourth authentication response message REQAuth to the AAC.

The AACAuth includes the $Nonce_{AAC}$, the $Nonce_{REQ}$, the $EncData_{REQ}$, and the $MacTag_{REQ}$. The $Nonce_{REQ}$ and the $Nonce_{AAC}$ are optional fields, and shall respectively be equal to the $Nonce_{REQ}$ generated by the REQ and the $Nonce_{AAC}$ in the AACInit. The to-be-encrypted data of the $EncData_{REQ}$ includes the $Nonce_{REQPub}$. The calculation process of the $MacTag_{REQ}$ is described in the embodiment of FIG. 7.

At S924, after receiving the REQAuth, the AAC performs the following operations.

(1) If there is the $Nonce_{REQ}$ and/or the $Nonce_{AAC}$ in the REQAuth, whether the $Nonce_{REQ}$ is the same as the $Nonce_{REQ}$ in the REQInit is checked; and/or whether the $Nonce_{AAC}$ is the same as the $Nonce_{AAC}$ generated by the AAC is checked.

(2) The $MacTag_{REQ}$ is verified; and a verification process is described in the embodiment of FIG. 7.

(3) The message encryption key is used to decrypt the $EncData_{REQ}$ by using the symmetric encryption algorithm, so as to obtain the $Nonce_{REQPub}$.

(4) The XOR is performed on the $Nonce_{REQPub}$ and the $Pub_{REQ} \oplus Nonce_{REQPub}$, so as to recover the $Pub_{REQ}$.

(5) The $Sig_{REQ}$ in the REQInit is verified by using the $Cert_{REQ}$ in the $Pub_{REQ}$.

(6) After the check and the verification are all successful, the identity authentication result of the REQ is determined according to the $Res_{REQ}$ in the $Pub_{REQ}$; and if any one of the steps of check and verification fails, the REQAuth is immediately discarded.

It is to be noted that, the REQInit of S904 may not include the $Sig_{REQ}$, while the $Sig_{REQ}$ is added in the REQAuth of S923. That is to say, in S923, the REQ first generates the $Sig_{REQ}$ by performing calculation on the to-be-signed data including the $Nonce_{AAC}$, the $Nonce_{REQ}$, and the $EncData_{REQ}$. In this case, the $Sig_{REQ}$ verified by the AAC in S924 is the $Sig_{REQ}$ in the REQAuth of S923.

Figure 10:
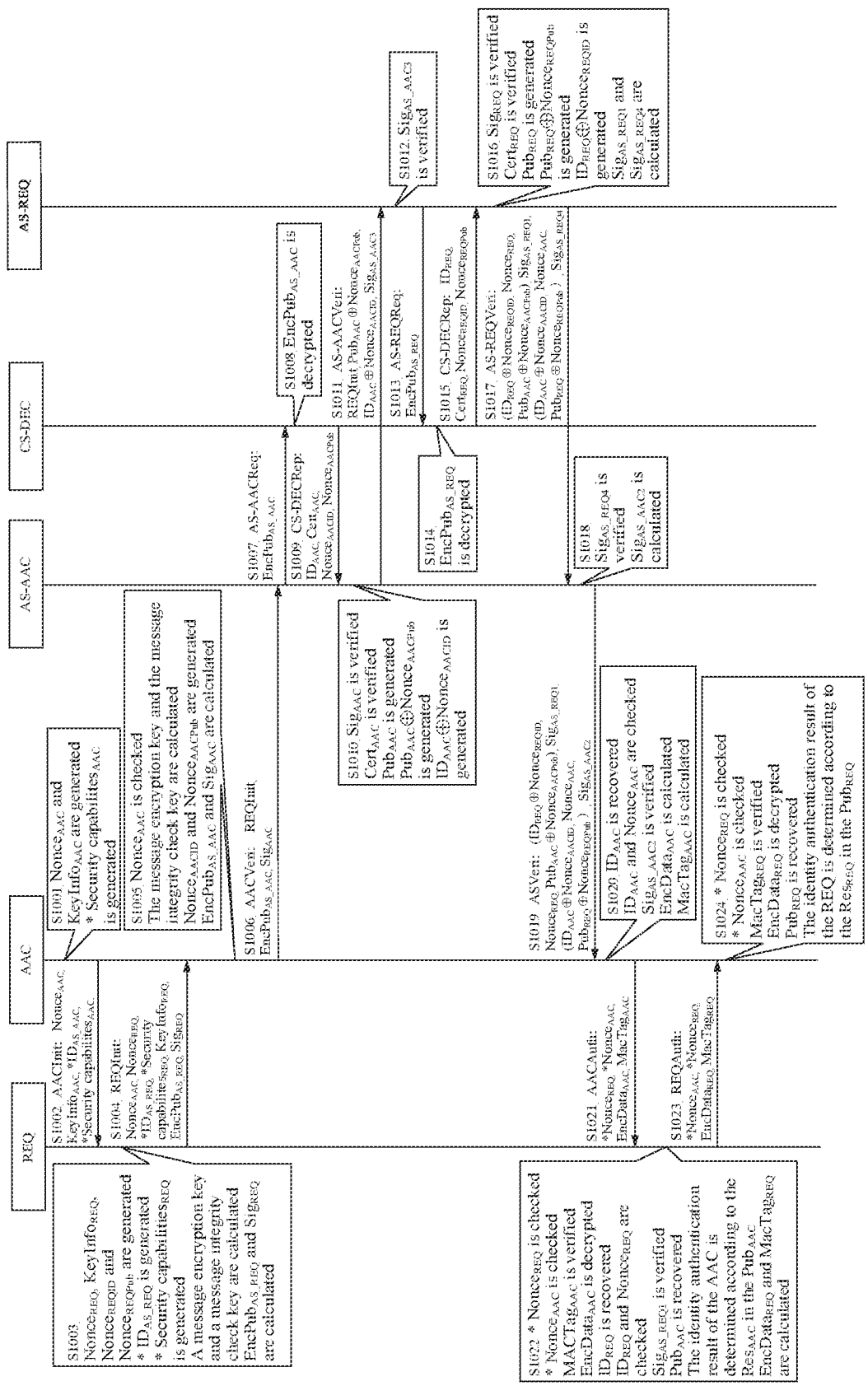
FIG. 10 is a schematic diagram of yet another identity authentication method in a roaming case according to an embodiment of the present disclosure, wherein "*" represents an optional field or an optional operation.

FIG. 10 is yet another embodiment of the identity authentication method in the roaming case. In this embodiment, the process of negotiating the message encryption key between the REQ and the AAC is fused in the identity authentication process in parallel, better facilitating project Implementation. The $Sig_{REQ}$ is verified by the AS-REQ, and the $Sig_{AAC}$ is verified by the AS-AAC. The method includes the following steps.

At S1001, the AAC generates the $Nonce_{AAC}$ and the $KeyInfo_{AAC}$, and generates the Security capabilities$_{AAC}$ according to requirements.

At S1002, the AAC sends the AACInit to the REQ.

The AACInit includes the $Nonce_{AAC}$, the $KeyInfo_{AAC}$, the $ID_{AS\_AAC}$, and the Security capabilities$_{AAC}$. The Security capabilities$_{AAC}$ and the $ID_{AS\_AAC}$ are optional fields.

At S1003, the REQ generates the $Nonce_{REQ}$, the $KeyInfo_{REQ}$, the $Nonce_{REQID}$ and the $Nonce_{REQPub}$, generates the $ID_{AS\_REQ}$ and the Security capabilities$_{REQ}$ according to requirements, and performs key exchange calculation according to the temporary private key corresponding to the $KeyInfo_{REQ}$ and the temporary public key included in the $KeyInfo_{AAC}$, so as to generate the first key K1; the K1 is combined with the $Nonce_{AAC}$, the $Nonce_{REQ}$ and other information (other information used by the REQ and the AAC being the same and optional, for example, a specific string), so as to calculate the message encryption key and the message integrity check key by using the negotiated or preset key derivation algorithm, definitely, this step may also be performed when the message integrity check key and/or the message integrity check key needs to be used later; the public key of the encryption certificate is used to calculate the $EncPub_{AS\_REQ}$ of the REQ; and the $Sig_{REQ}$ is calculated.

At S1004, the REQ sends the REQInit to the AAC.

The REQInit includes the $Nonce_{AAC}$, the $Nonce_{REQ}$, the $ID_{AS\_REQ}$, the Security capabilities$_{REQ}$, the $KeyInfo_{REQ}$, the $EncPub_{AS\_REQ}$, and the $Sig_{REQ}$. The $ID_{AS\_REQ}$ and the Security capabilities$_{REQ}$ are optional fields; the $Nonce_{AAC}$ shall be equal to a corresponding field in the AACInit; and the to-be-encrypted data of the $EncPub_{AS\_REQ}$ includes the $ID_{REQ}$, the $Cert_{REQ}$, the $Nonce_{REQID}$ and the $Nonce_{REQPub}$. The to-be-signed data of the $Sig_{REQ}$ includes other fields before the $Sig_{REQ}$ in the REQInit.

At S1005, after receiving the REQInit, the AAC performs the following operations.

(1) Whether the $Nonce_{AAC}$ in the REQInit is the same as the $Nonce_{AAC}$ generated by the AAC is checked, and if no, the REQInit is discarded.

(2) Key exchange calculation is performed according to the temporary private key corresponding to the $KeyInfo_{AAC}$ and the temporary public key included in the $KeyInfo_{REQ}$, so as to generate the first key K1; the K1 is combined with the $Nonce_{AAC}$, the $Nonce_{REQ}$ and other information (other information used by the AAC and the REQ being the same and optional, for example, a specific string), so as to calculate the message encryption key and the message integrity check key by using the negotiated or preset key derivation algorithm. Definitely, this step may be performed when the message integrity check key and/or the message integrity check key needs to be used by the AAC.

(3) The $Nonce_{AACID}$ and the $Nonce_{AACPub}$ are generated.

(4) The public key of the encryption certificate is used to calculate the $EncPub_{AS\_AAC}$.

(5) The method for the AAC to determine the AS-AAC is described in the embodiment of FIG. 9.

(6) The $Sig_{AAC}$ is calculated.

At S1006, the AAC sends the AACVeri to the AS-AAC.

The AACVeri includes the REQInit, the $EncPub_{AS\_AAC}$, and the $Sig_{AAC}$. The to-be-encrypted data of the $EncPub_{AS\_AAC}$ includes the $ID_{AAC}$, the $Cert_{AAC}$, the $Nonce_{AACID}$, and the $Nonce_{AACPub}$. The to-be-signed data of the $Sig_{AAC}$ includes other fields before the $Sig_{AAC}$ in the AACVeri.

At S1007, after receiving the AACVeri, the AS-AAC sends the AS-AACReq to the CS-DEC.

The AS-AACReq includes the $EncPub_{AS\_AAC}$; and the $EncPub_{AS\_AAC}$ shall be equal to the corresponding field in the AACVeri.

At S1008, after receiving the AS-AACReq, the CS-DEC decrypts the $EncPub_{AS\_AAC}$, so as to obtain the $ID_{AAC}$, the $Cert_{AAC}$, the $Nonce_{AACID}$, and the $Nonce_{AACPub}$.

At S1009, the CS-DEC sends a first decryption response message CS-DECRep to the AS-AAC.

The CS-DECRep includes the $ID_{AAC}$, the $Cert_{AAC}$, the $Nonce_{AAC}$, and the $Nonce_{AACPub}$, which are obtained by means of decryption.

At S1010, after receiving the CS-DECRep, the AS-AAC performs the following operations.

(1) The $Sig_{AAC}$ is verified by using the $Cert_{AAC}$; and if the verification fails, the CS-DECRep is discarded.

(2) The legality of the $Cert_{AAC}$ is verified to obtain the $Res_{AAC}$, and the $Pub_{AAC}$ is generated according to the information including the $Res_{AAC}$.

(3) The XOR is performed on the $Nonce_{AACPub}$ and the $Pub_{AAC}$, so as to obtain the $Pub_{AAC} \oplus Nonce_{AACPub}$.

(4) The XOR is performed on the $Nonce_{AACPub}$ and the $ID_{AAC}$, so as to obtain the $ID_{AAC} \oplus Nonce_{AAC}$.

(5) The method for the AS-AAC to determine the AS-REQ is described in the embodiment of FIG. 9.

(6) The $Sig_{AS\_AAC3}$ is calculated.

At S1011, the AS-AAC sends the AS-AACVeri to the AS-REQ.

The AS-AACVeri includes the REQInit, the $Pub_{AAC} \oplus Nonce_{AACPub}$, the $ID_{AAC} \oplus Nonce_{AACID}$, and the $Sig_{AS\_AAC3}$. The $Nonce_{AACPub}$, the $ID_{AAC}$, and the $Nonce_{AACID}$ shall respectively be equal to corresponding fields in the CS-DECRep. The to-be-signed data of the $Sig_{AS\_AAC3}$ includes other fields before the $Sig_{AS\_AAC3}$ in the AS-AACVeri.

At S1012, after receiving the AS-AACVeri, the AS-REQ verifies the $Sig_{AS\_AAC3}$ by using the public key of the AS-AAC.

If the verification is successful. S1013 is performed.

At S1013, the AS-REQ sends a second decryption request message AS-REQReq to the CS-DEC.

The AS-REQReq includes the $EncPub_{AS\_REQ}$; and the $EncPub_{AS\_REQ}$ shall be equal to the corresponding field in the AS-AACVeri.

At S1014, the CS-DEC decrypts the $EncPub_{AS\_REQ}$, so as to obtain the $Cert_{REQ}$, the $ID_{REQ}$, the $Nonce_{REQID}$, and the $Nonce_{REQPub}$.

At S1015, the CS-DEC sends a second decryption response message CS-DECRep to the AS-REQ.

The CS-DECRep includes the $Cert_{REQ}$, the $ID_{REQ}$, the $Nonce_{REQID}$ and the $Nonce_{REQPub}$, which are obtained by means of decryption.

At S1016, after receiving the CS-DECRep, the AS-REQ performs the following operations.

(1) The $Sig_{REQ}$ in the REQInit is verified by using the $Cert_{REQ}$; and if the verification fails, the CS-DECRep is discarded.

(2) The legality of the $Cert_{REQ}$ is verified to obtain the $Res_{REQ}$ and the $Pub_{REQ}$ is generated according to the information including the $Res_{REQ}$.

(3) The XOR is performed on the $Nonce_{REQPub}$ and the $Pub_{REQ}$, so as to obtain the $Pub_{REQ} \oplus Nonce_{REQPub}$.

(4) The XOR is performed on the $Nonce_{REQID}$ and the $ID_{REQ}$, so as to obtain the $ID_{REQ} \oplus Nonce_{REQID}$.

(5) The $Sig_{AS\_REQ}$, and the $Sig_{AS\_REQ}$ are calculated.

At S1017, the AS-REQ sends the AS-REQVeri to the AS-AAC.

The AS-REQVeri includes the $ID_{REQ} \oplus Nonce_{REQID}$, the $Nonce_{REQ}$, the $Pub_{AAC} \oplus Nonce_{AACPub}$, the $Sig_{AS\_REQ1}$, the $ID_{AAC} \oplus Nonce_{AACID}$, the $Nonce_{AAC}$, the $Pub_{REQ} \oplus Nonce_{REQPub}$, and the $Sig_{AS\_REQ4}$. The $ID_{REQ}$, the $Nonce_{REQID}$ and the $Nonce_{REQPub}$ shall be respectively equal to corresponding fields in the CS-DECRep; and the $Nonce_{REQ}$, the $ID_{AAC} \oplus Nonce_{AACID}$, the $Nonce_{AAC}$, and the $Pub_{AAC} \oplus Nonce_{AACPub}$ shall be respectively equal to corresponding fields in the AS-AACVeri. The to-be-signed data of the $Sig_{AS\_REQ1}$ includes the $ID_{REQ} \oplus Nonce_{REQID}$, the $Nonce_{REQ}$, and the $Pub_{AAC} \oplus Nonce_{AACPub}$; and the to-be-signed data of the $Sig_{AS\_REQ4}$ includes the $ID_{AAC} \oplus Nonce_{AACID}$, the $Nonce_{AAC}$, and the $Pub_{REQ} \oplus Nonce_{REQPub}$.

At S1018, after receiving the AS-REQVeri, the AS-AAC performs the following operations.

(1) The $Sig_{AS\_REQ4}$ is verified by using the public key of the AS-REQ; if the verification fails, the AS-REQVeri is discarded.

(2) The $Sig_{AS\_AAC2}$ is calculated.

At S1019, the AS-AAC sends the ASVeri to the AAC.

The ASVeri includes the $ID_{REQ} \oplus Nonce_{REQID}$, the $Nonce_{REQ}$, the $Pub_{AAC} \oplus Nonce_{AACPub}$, the $Sig_{AS\_REQ1}$, the $ID_{AAC} \oplus Nonce_{AACID}$, the $Nonce_{AAC}$, the $Pub_{REQ} \oplus Nonce_{REQPub}$, and the $Sig_{AS\_AAC2}$. The to-be-signed data of the $Sig_{AS\_AAC2}$ includes the $ID_{AAC} \oplus Nonce_{AACID}$, the $Nonce_{AAC}$, and the $Pub_{REQ} \oplus Nonce_{REQPub}$.

At S1020, after receiving the ASVeri, the AAC performs the following operations.

(1) The XOR is performed on the $Nonce_{AACID}$, and the $ID_{AAC} \oplus Nonce_{AACID}$, so as to recover the $ID_{AAC}$, and whether the $ID_{AAC}$ is the same as the self $ID_{AAC}$ of the AAC is checked.

(2) Whether the $Nonce_{AAC}$ is the same as the $Nonce_{AAC}$ generated by the AAC is checked.

(3) The $Sig_{AS\_AAC2}$ is verified by using the public key of the AS-AAC.

(4) If the check and the verification are all successful, the $EncData_{AAC}$ is calculated by using the message encryption key; and if any one of the steps of check and verification fails, the ASVeri is immediately discarded.

(5) The $MacTag_{AAC}$ is calculated.

At S1021, the AAC sends a third authentication response message AACAuth to the REQ.

The AACAuth includes the $Nonce_{REQ}$, the $Nonce_{AAC}$, the $EncData_{AAC}$, and the $MacTag_{AAC}$. The $Nonce_{REQ}$ and the $Nonce_{AAC}$ are optional fields, and shall respectively be equal to the $Nonce_{REQ}$ in the REQInit and the $Nonce_{AAC}$ generated by the AAC. The to-be-encrypted data of the $EncData_{AAC}$ includes the $ID_{REQ} \oplus Nonce_{REQID}$, the $Nonce_{REQ}$, the $Pub_{AAC} \oplus Nonce_{AACPub}$, the $Sig_{AS\_REQ1}$, and $Nonce_{AACPub}$; and the $ID_{REQ} \oplus Nonce_{REQID}$, the $Nonce_{REQ}$, the $Pub_{AAC} \oplus Nonce_{AACPub}$, and the $Sig_{AS\_REQ1}$ shall respectively be equal to corresponding fields in the ASVeri. The calculation process of the $MacTag_{AAC}$ is described in the embodiment of FIG. 7.

At S1022, after receiving the AACAuth, the REQ performs the following operations.

(1) If there is the $Nonce_{REQ}$ and/or the $Nonce_{AAC}$ in the AACAuth, whether the $Nonce_{REQ}$ is the same as the $Nonce_{REQ}$ generated by the REQ is checked; and/or whether the $Nonce_{AAC}$ is the same as the received $Nonce_{AAC}$ in the AACInit is checked.

(2) The $MacTag_{AAC}$ is verified; and a verification process is described in the embodiment of FIG. 7.

(3) The message encryption key is used to decrypt the $EncData_{AAC}$ by using the symmetric encryption algorithm, so as to obtain the $ID_{REQ} \oplus Nonce_{REQID}$, the $Nonce_{REQ}$, the $Pub_{AAC} \oplus Nonce_{AACPub}$, the $Sig_{AS\_REQ1}$, and the $Nonce_{AACPub}$.

(4) The XOR is performed on the $ID_{REQ} \oplus Nonce_{REQID}$ by using the $Nonce_{REQID}$, so as to recover the $ID_{REQ}$, and whether the $ID_{REQ}$ is the same as the self $ID_{REQ}$ of the REQ is checked.

(5) Whether the $Nonce_{REQ}$ is the same as the $Nonce_{REQ}$ generated by the REQ is checked.

(6) The $Sig_{AS\_REQ1}$ is verified by using the public key of the AS-REQ.

(7) If any one of the steps of check and verification fails, the AACAuth is immediately discarded, if check and verification are all successful, the XOR is performed on the $Nonce_{AACPub}$ and the $Pub_{AAC} \oplus Nonce_{AACPub}$ obtained by means of decryption, so as to recover the $Pub_{AAC}$; the identity authentication result of the AAC is determined according to the $Res_{AAC}$ in the $Pub_{AAC}$; and if it is determined that the AAC is illegal, the current authentication process is finished.

(8) The message encryption key is used to calculate the EncData$_{REQ}$.

(9) The MacTag$_{REQ}$ is calculated.

At S1023, the REQ sends a fourth authentication response message REQAuth to the AAC.

The REQAuth includes the Nonce$_{AAC}$, the Nonce$_{REQ}$, the EncData$_{REQ}$, and the MacTag$_{REQ}$. The Nonce$_{REQ}$ and the Nonce$_{AAC}$ are optional fields, and shall respectively be equal to the Nonce$_{REQ}$ generated by the REQ and the Nonce$_{AAC}$ in the AACInit. The to-be-encrypted data of the EncData$_{REQ}$ includes the Nonce$_{REQID}$. The calculation process of the MacTag$_{REQ}$ is described in the embodiment of FIG. 7.

At S1024, after receiving the REQAuth, the AAC performs the following operations.

(1) If there is the Nonce$_{REQ}$ and/or the Nonce$_{AAC}$ in the REQAuth, whether the Nonce$_{REQ}$ is the same as the Nonce$_{REQ}$ in the REQInit is checked; and/or whether the Nonce$_{AAC}$ is the same as the Nonce$_{AAC}$ generated by the AAC is checked.

(2) The MacTag$_R$W is verified; and a verification process is described in the embodiment of FIG. 7.

(3) The message encryption key is used to decrypt the EncData$_{REQ}$ by using the symmetric encryption algorithm, so as to obtain the Nonce$_{REQPub}$.

(4) The XOR is performed on the Nonce$_{REQPub}$ and the Pub$_{REQ}$⊕Nonce$_{REQPub}$, so as to recover the Pub$_{REQ}$.

(5) After the check and the verification are all successful, the identity authentication result of the REQ is determined according to the Res$_{REQ}$ in the Pub$_{REQ}$; and if any one of the steps of check and verification fails, the REQAuth is immediately discarded.

In the above embodiments, each message may further carry a hash value HASH$_{X\_Y}$; and the hash value HASH$_{X\_Y}$ is obtained by using, by a sender entity X of the message, a hash algorithm to calculate the received latest preceding message sent by an opposite-end entity Y. and is used for the opposite-end entity Y to verify whether the entity X receives the whole latest preceding message. The HASH$_{REQ\_AAC}$ represents a hash value that is calculated by the REQ for the received latest preceding message sent by the AAC; the HASH$_{AAC\_REQ}$ represents a hash value that is calculated by the AAC for the received latest preceding message sent by the REQ, the HASH$_{AAC\_AS-AAC}$ represents a hash value that is calculated by the AAC for the received latest preceding message sent by the AS-AAC; the HASH$_{AS-AAC\_AAC}$ represents a hash value that is calculated by the AS-AAC for the received latest preceding message sent by the AAC; the HASH$_{AS-AAC\_AS-REQ}$ represents a hash value that is calculated by the AS-AAC for the received latest preceding message sent by the AS-REQ; and the HASH$_{AS-REQ\_AS-AAC}$ represents a hash value that is calculated by the AS-REQ for the received latest preceding message sent by the AS-AAC. If the message currently sent by the sender entity X is the first message of the interaction between the entity X and the entity Y, which means that the entity X has not received the preceding message sent by the opposite-end entity Y, and the HASH$_{X\_Y}$ in the message may be non-existent or meaningless.

Correspondingly, after the opposite-end entity Y receives the message sent by the entity X, if the message includes the HASH$_{X\_Y}$, the entity Y ignores the HASH$_{X\_Y}$ when the entity Y has not sent the preceding message to the entity X; when the entity Y has sent the preceding message to the entity X, the entity Y uses the hash algorithm to locally calculate the hash value for the latest preceding message sent to the entity X, and compares the hash value with the received HASH$_{X\_Y}$ carried in the message; and if the hash value is consistent with the HASH$_{X\_Y}$, the follow-up steps are performed, otherwise discarding is performed or the current authentication process is finished.

In the present invention, for the entity X, the preceding message sent to the entity X by the opposite-end entity Y refers to the received message, which is sent to the entity X by the opposite-end entity Y before the entity X sends the message M to the opposite-end entity Y; and the latest preceding message sent to the entity X by the opposite-end entity Y refers to the received latest message, which is sent to the entity X by the opposite-end entity Y before the entity X sends the message M to the opposite-end entity Y. If the message M sent by the entity X to the opposite-end entity Y is the first message of the interaction between the entity X and the entity Y; and before the entity X sends the message M to the opposite-end entity Y, the preceding message sent by the opposite-end entity Y to the entity X does not exist.

The optional fields and the optional operations in the corresponding embodiments in FIG. 7. FIG. 8. FIG. 9 and FIG. 10 are represented by "*" in FIG. 7, FIG. 8, FIG. 9 and FIG. 10 of the drawings of the specification. The sequence of the content included in the messages involved in all of the above embodiments is not limited. In addition, the sequence of operations of the relevant messages after a message receiver receives the message, and the sequence in which the content included in the messages are processed are not limited unless otherwise specified.

Figure 11:
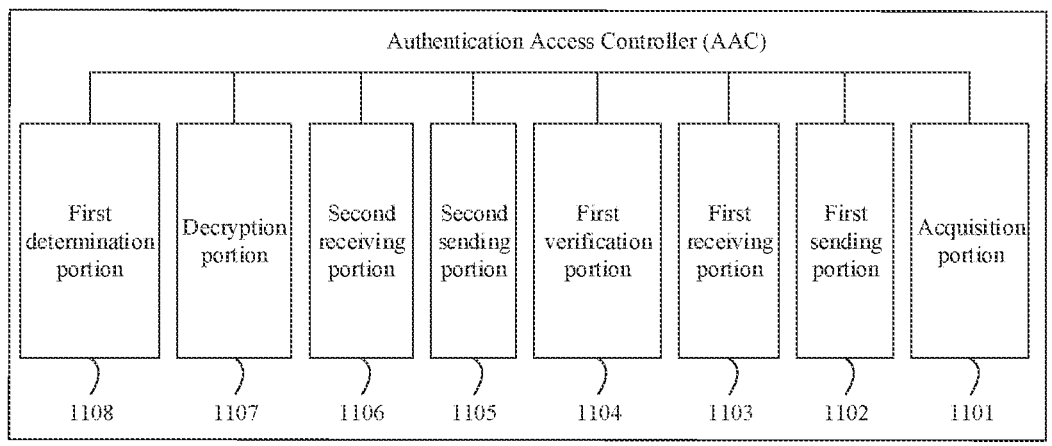
FIG. 11 is a structural block diagram of an AAC according to an embodiment of the present disclosure.

On the basis of the method embodiments corresponding to FIG. 1 to FIG. 10, referring to FIG. 11, an embodiment of the present disclosure provides an AAC. The AAC includes an acquisition portion, a first sending portion, a first receiving portion, a first verification portion, a second sending portion, a second receiving portion, a decryption portion, and a first determination portion.

The acquisition portion 1101 is configured to acquire an identity ciphertext message sent by an REQ. The identity ciphertext message includes identity information ciphertext of the REQ, and the identity information ciphertext of the REQ is generated by using a public key of an encryption certificate to encrypt to-be-encrypted data including a digital certificate of the REQ and a first protection nonce.

The first sending portion 1102 is configured to send a first authentication request message to a first AS trusted by the AAC. The first authentication request message includes identity information ciphertext of the REQ and identity information ciphertext of the AAC, and the identity information ciphertext of the AAC is generated by using the public key of the encryption certificate to encrypt to-be-encrypted data including a digital certificate of the AAC and a second protection nonce.

The first receiving portion 1103 is configured to receive a first authentication response message sent by the first AS. The first authentication response message includes first authentication result information ciphertext, a first digital signature, second authentication result information ciphertext and a second digital signature, the first authentication result information ciphertext is generated by using the second protection nonce to encrypt information including first authentication result information, the first authentication result information includes a first verification result for the digital certificate of the AAC, the first digital signature is generated by performing, by a second AS, calculation on to-be-signed data including the first authentication result information ciphertext, the second authentication result information ciphertext is generated by using the first protection nonce to encrypt information including second authentication result information, the second authentication result information includes a second verification result for the digital certificate of the REQ, and the second digital signature is generated by performing, by the first AS, calculation on to-be-signed data including the second authentication result information ciphertext.

The first verification portion 1104 is configured to verify the second digital signature by using a public key of a first AS.

The second sending portion 1105 is configured to, when the verification of the second digital signature is successful, send a third authentication response message to the REQ. The third authentication response message includes authentication result information ciphertext, and the authentication result information ciphertext is generated by using a message encryption key to encrypt to-be-encrypted data including the first authentication result information ciphertext, the first digital signature and the second protection nonce.

The second receiving portion 1106 is configured to receive a fourth authentication response message sent by the REQ. The fourth authentication response message includes first protection nonce ciphertext, and the first protection nonce ciphertext is obtained by using the message encryption key to encrypt information including the first protection nonce.

The decryption portion 1107 is configured to decrypt the first protection nonce ciphertext by using the message encryption key, so as to obtain the first protection nonce, and decrypt the second authentication result information ciphertext by using the first protection nonce, so as to obtain the second authentication result information.

The first determination portion 1108 is configured to determine an identity authentication result of the REQ according to the second verification result in the second authentication result information.

In some embodiments, the AAC further includes a third sending portion and a calculation portion.

The third sending portion is configured to send a key request message to the REQ. The key request message includes a key exchange parameter of the AAC, and the identity ciphertext message acquired by the acquisition portion 1101 further includes a key exchange parameter of the REQ.

The calculation portion is configured to perform key exchange calculation according to the temporary private key corresponding to the key exchange parameter of the AAC and the temporary public key included in the key exchange parameter of the REQ, so as to generate the first key, and according to the information including the first key, calculate the message encryption key by using the key derivation algorithm.

In some embodiments, the key request message sent by the third sending portion further includes a first nonce generated by the AAC; correspondingly, the identity ciphertext message acquired by the acquisition portion 1101 further includes a second nonce generated by the REQ.

The calculation portion is further configured to calculate the message encryption key according to the information including the first key, the first nonce and the second nonce.

In some embodiments, the identity ciphertext message acquired by the acquisition portion 1101 further includes the first nonce. The AAC further includes a second verification portion.

The second verification portion is configured to verify consistency between the first nonce in the identity ciphertext message and the first nonce generated by the AAC.

In some embodiments, the key request message sent by the third sending portion further includes security capability parameter information supported by the AAC; the identity ciphertext message acquired by the acquisition portion 1101 further includes a specific security policy; and the specific security policy is determined by the REQ according to the security capability parameter information.

In some embodiments, the key request message sent by the third sending portion further includes the identity identifier of at least one AS trusted by the AAC; and the identity ciphertext message acquired by the acquisition portion 1101 further includes the identity identifier of at least one AS trusted by the REQ. The AAC further includes a second determination portion.

The second determination portion is configured to determine the first AS according to the identity identifier of at least one AS trusted by the REQ in the identity ciphertext message and the identity identifier of at least one AS trusted by the AAC in the key request message.

In some embodiments, the identity ciphertext message acquired by the acquisition portion 1101 further includes the identity identifier of at least one AS trusted by the REQ. The AAC further includes a third determination portion.

The third determination portion is configured to determine the first AS according to the identity identifier of at least one AS trusted by the REQ and the identity identifier of at least one AS trusted by the AAC.

In some embodiments, the to-be-encrypted data of the identity information ciphertext of the AAC further includes the identity identifier of the AAC and a fourth protection nonce.

Correspondingly, the first authentication response message received by the first receiving portion 1103 further includes identity identifier ciphertext of the AAC, and the identity identifier ciphertext of the AAC is generated by using the fourth protection nonce to encrypt information including the identity identifier of the AAC.

The AAC further includes a third verification portion.

The third verification portion is configured to verify the identity identifier ciphertext of the AAC according to the identity identifier of the AAC and the fourth protection nonce. After the verification is successful, the first determination portion 1108 then performs related steps.

In some embodiments, the identity ciphertext message acquired by the acquisition portion 1101 further includes the digital signature of the REQ; and before determining the identity authentication result of the REQ, the first determination portion 1108 is further configured to determine whether the verification of the digital signature of the REQ is successful, and if it is determined that the verification of the digital signature of the REQ is successful, then determine the identity authentication result of the REQ according to the second verification result.

In some implementations, the first determination portion 1108 is further configured to perform the following operations.

If the second authentication result information that is obtained by using, by the decryption portion 1107, the first protection nonce to decrypt the second authentication result information ciphertext further includes the digital certificate of the REQ, the first determination portion 1108 verifies the digital signature of the REQ by using the digital certificate of the REQ, and determines, according to a verification result, whether the verification of the digital signature of the REQ is successful.

Or, the second AS verifies the digital signature of the REQ by using the digital certificate of the REQ that is obtained by decrypting the identity information ciphertext of the REQ, and if the AAC receives the first authentication response message, it is determined that the verification of the digital signature of the REQ has been successful.

In some implementations, the fourth authentication response message received by the second receiving portion 1106 further includes the digital signature of the REQ; the second authentication result information that is obtained by using, by the decryption portion 1107, the first protection nonce to decrypt the second authentication result information ciphertext further includes the digital certificate of the REQ; and before determining the identity authentication result of the REQ, the first determination portion 1108 is further configured to verify the digital signature of the REQ by using the digital certificate of the REQ in the first authentication result information, and if it is determined that the verification of the digital signature of the REQ is successful, then determine the identity authentication result of the REQ according to the second verification result.

In some implementations, the fourth authentication response message received by the second receiving portion 1106 further includes a second message integrity check code, the second message integrity check code is generated by using, by the REQ, the message integrity check key to perform calculation on fields in the fourth authentication response message other than the second message integrity check code, and the AAC further includes a fourth verification portion.

The fourth verification portion is configured to verify the second message integrity check code, wherein if the verification is successful, the first determination portion 1108 then performs the step of determining the identity authentication result of the REQ.

In some implementations, the message sent to the REQ by the AAC further includes a hash value calculated by the AAC for the received latest preceding message sent by the REQ; and the message sent to the AS-AAC by the AAC further includes a hash value calculated by the AAC for the received latest preceding message sent by the AS-AAC.

Figure 12:
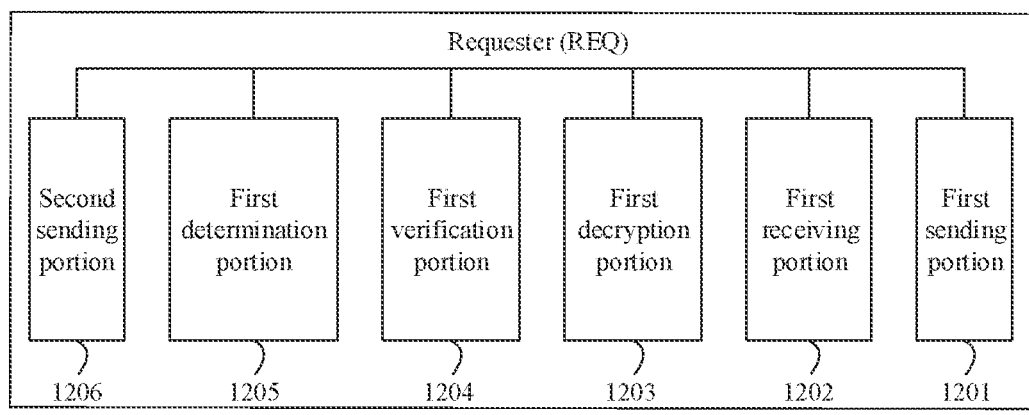
FIG. 12 is a structural block diagram of an REQ according to an embodiment of the present disclosure.

Referring to FIG. 12, an embodiment of the present disclosure provides an REQ. The REQ includes a first sending portion, a first receiving portion, a first decryption portion, and a first verification portion.

The first sending portion 1201 is configured to send an identity ciphertext message to an AAC. The identity ciphertext message includes identity information ciphertext of the REQ, and the identity information ciphertext of the REQ is generated by using a public key of an encryption certificate to encrypt to-be-encrypted data including a digital certificate of the REQ and a first protection nonce.

The first receiving portion 1202 is configured to receive a third authentication response message sent by the AAC. The third authentication response message includes authentication result information ciphertext; the authentication result information ciphertext is generated by using a message encryption key to encrypt to-be-encrypted data including first authentication result information ciphertext, a first digital signature and a second protection nonce; the first authentication result information ciphertext is generated by using the second protection nonce to encrypt information including first authentication result information, the first authentication result information includes a first verification result for a digital certificate of the AAC, and the first digital signature is a digital signature generated by performing, by a second AS trusted by the REQ, calculation on to-be-signed data including the first authentication result information ciphertext.

The first decryption portion 1203 is configured to decrypt the authentication result information ciphertext by using the message encryption key, so as to obtain the first authentication result information ciphertext, the first digital signature and the second protection nonce.

The first verification portion 1204 is configured to verify the first digital signature by using a public key of the second AS, wherein if the verification is successful, the first decryption portion 1203 decrypts the first authentication result information ciphertext by using the second protection nonce, so as to obtain the first authentication result information, a first determination portion 1205 determines an identity authentication result of the AAC according to the first verification result in the first authentication result information, and when the first determination portion 1205 determines that the identity authentication result of the AAC is legal, a second sending portion 1206 sends a fourth authentication response message to the AAC.

Or, the first verification portion 1204 is configured to verify the first digital signature by using the public key of the second AS. If the verification is successful, the second sending portion 1206 sends the fourth authentication response message to the AAC, the first decryption portion 1203 decrypts the first authentication result information ciphertext by using the second protection nonce, so as to obtain the first authentication result information, and the first determination portion 1205 determines the identity authentication result of the AAC according to the first verification result in the first authentication result information.

Or, the first verification portion 1204 is configured to verify the first digital signature by using the public key of the second AS. If the verification of the first digital signature is successful, the first decryption portion 1203 decrypts the first authentication result information ciphertext by using the second protection nonce, so as to obtain the first authentication result information, the first determination portion 1205 determines the identity authentication result of the AAC according to the first verification result in the first authentication result information, and the second sending portion 1206 sends the fourth authentication response message to the AAC.

The fourth authentication response message includes first protection nonce ciphertext, and the first protection nonce ciphertext is obtained by using the message encryption key to encrypt information including the first protection nonce.

In some embodiments, the REQ further includes a second receiving portion and a first calculation portion.

The second receiving portion is configured to receive a key request message sent by the AAC. The key request message includes a key exchange parameter of the AAC.

The first calculation portion is configured to perform key exchange calculation according to a temporary private key corresponding to a key exchange parameter of the REQ and a temporary public key included in the key exchange parameter of the AAC, so as to generate a first key, and calculate the message encryption key according to information including the first key by using a key derivation algorithm.

The identity ciphertext message sent by the first sending portion 1201 further includes a key exchange parameter of the REQ.

In some embodiments, the key request message received by the second receiving portion further includes a first nonce generated by the AAC.

The calculation portion is further configured to calculate the message encryption key according to information including the first key, the first nonce and a second nonce generated by the REQ.

The identity ciphertext message sent by the first sending portion 1201 further includes the second nonce.

In some embodiments, the identity ciphertext message sent by the first sending portion 1201 further includes the first nonce.

In some embodiments, the key request message received by the second receiving portion further includes security capability parameter information supported by the AAC. The REQ further includes a second determination portion.

The second determination portion is configured to determine, according to the security capability parameter information, a specific security policy used by the REQ.

The identity ciphertext message sent by the first sending portion 1201 further includes the specific security policy.

In some embodiments, the key request message received by the second receiving portion further includes the identity identifier of at least one AS trusted by the AAC. The REQ further includes a third determination portion.

The third determination portion is configured to determine, according to the identity identifier of at least one AS trusted by the AAC, an identity identifier of at least one AS trusted by the REQ.

The identity ciphertext message sent by the first sending portion 1201 further includes the identity identifier of at least one AS trusted by the REQ.

In some embodiments, the identity ciphertext message sent by the first sending portion 1201 further includes the identity identifier of at least one AS trusted by the REQ.

In some embodiments, the to-be-encrypted data of the identity information ciphertext of the REQ further includes the identity identifier of the REQ and a third protection nonce.

Correspondingly, the first authentication response message further includes identity identifier ciphertext of the REQ, and the identity identifier ciphertext of the REQ is generated by using the third protection nonce to encrypt information including the identity identifier of the REQ.

The to-be-encrypted data of the authentication result information ciphertext in the third authentication response message further includes the identity identifier ciphertext of the REQ.

The first decryption portion 1203 decrypts the authentication result information ciphertext, so as to obtain the identity identifier ciphertext of the REQ. The REQ further includes a second verification portion.

The second verification portion is configured to verify the identity identifier ciphertext of the REQ according to the identity identifier of the REQ and the third protection nonce. After the verification is successful, the first determination portion 1205 then performs the step of determining the identity authentication result of the AAC.

In some embodiments, before determining the identity authentication result of the AAC, the first determination portion 1205 is further configured to determine whether the verification of the digital signature of the AAC is successful, and if it is determined that the verification of the digital signature of the AAC is successful, then determine the identity authentication result of the AAC according to the first verification result.

In some implementations, the first determination portion 1205 is further configured to perform the following operations.

When the first authentication request message sent, by the AAC, to a first AS trusted by the AAC includes the digital signature of the AAC, the AS-AAC verifies the digital signature of the AAC by using the digital certificate of the AAC that is obtained by decrypting the identity information ciphertext of the AAC, if the first receiving portion 1202 receives the third authentication response message, the first determination portion determines that the verification of the digital signature of the AAC has been successful.

Or when the third authentication response message received by the first receiving portion 1202 further includes the digital signature of the AAC, if the first authentication result information obtained by decrypting, by the first decryption portion 1203, the first authentication result information ciphertext further includes the digital certificate of the AAC, the first determination portion 1205 verifies the digital signature of the AAC by using the digital certificate of the AAC, and determines, according to a verification result, whether the verification of the digital signature of the AAC has been successful.

In some implementations, the third authentication response message received by the first receiving portion 1202 further includes a first message integrity check code, and the first message integrity check code is generated by using, by the AAC, a message integrity check key to perform calculation on fields in the third authentication response message other than the first message integrity check code. The REQ further includes a third verification portion.

The third verification portion is configured to verify the first message integrity check code, wherein if the verification is successful, the first determination portion 1205 then performs the step of determining the identity authentication result of the AAC.

In some implementations, the message sent to the AAC by the REQ further includes a hash value calculated by the REQ for the received latest preceding message sent by the AAC.

Figure 13:
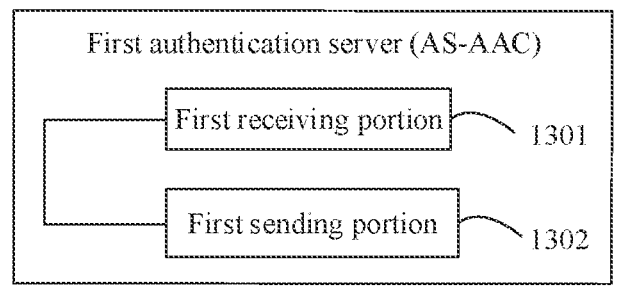
FIG. 13 is a structural block diagram of a first AS (AS-AAC) according to an embodiment of the present disclosure.

Referring to FIG. 13, an embodiment of the present disclosure further provides an AS-AAC. The AS-AAC is an AS trusted by an AAC, and includes a first receiving portion and a first sending portion.

The first receiving portion 1301 is configured to receive a first authentication request message sent by the AAC. The first authentication request message includes identity information ciphertext of the REQ and identity information ciphertext of the AAC, and the identity information ciphertext of the AAC is generated by using the public key of the encryption certificate to encrypt to-be-encrypted data including a digital certificate of the AAC and a second protection nonce, and the identity information ciphertext of the REQ is generated by using a public key of an encryption certificate to encrypt to-be-encrypted data including a digital certificate of the REQ and a first protection nonce.

The first sending portion 1302 is configured to send a first authentication response message to the AAC. The first authentication response message includes first authentication result information ciphertext, a first digital signature, second authentication result information ciphertext and a second digital signature, the first authentication result information ciphertext is generated by using the second protection nonce to encrypt information including first authentication result information, the first authentication result information includes a first verification result for the digital certificate of the AAC, the first digital signature is a digital signature generated by performing, by a second AS trusted by the REQ, calculation on to-be-signed data including the first authentication result information ciphertext, the second authentication result information ciphertext is generated by using the first protection nonce to encrypt information including second authentication result information, the second authentication result information includes a second verification result for the digital certificate of the REQ, and the second digital signature is a digital signature generated by performing, by the first AS, calculation on to-be-signed data including the second authentication result information ciphertext.

In some implementations, if the first authentication request message received by the first receiving portion 1301 further includes a digital signature of the AAC. The AS-AAC further includes a first verification portion.

The first verification portion is configured to verify the digital signature of the AAC by using the digital certificate of the AAC that is obtained by decrypting the identity information ciphertext of the AAC.

In some implementations, the first AS trusted by the AAC and the second AS trusted by the REQ are the same AS. The AS-AAC further includes a first decryption portion, a first verification portion, and a first generation portion.

The first acquisition portion is configured to acquire the digital certificate of the REQ, the first protection nonce, the digital certificate of the AAC and the second protection nonce that are obtained by using the private key corresponding to the encryption certificate to respectively decrypt the identity information ciphertext of the REQ and the identity information ciphertext of the AAC.

The second verification portion is configured to perform legality verification on the digital certificate of the AAC, so as to obtain the first verification result, and perform legality verification on the digital certificate of the REQ, so as to obtain the second verification result.

The first generation portion is configured to generate the first authentication result information according to information including the first verification result, generate the second authentication result information according to information including the second verification result, encrypt the information including the first authentication result information by using the second protection nonce, so as to generate the first authentication result information ciphertext, encrypt the information including the second authentication result information by using the first protection nonce, so as to generate the second authentication result information ciphertext, perform calculation on the to-be-signed data including the first authentication result information ciphertext to generate the first digital signature, perform calculation on the to-be-signed data including the second authentication result information ciphertext to generate the second digital signature, and generate the first authentication response message according to information including the first authentication result information ciphertext, the first digital signature, the second authentication result information ciphertext and the second digital signature.

In some implementations, the first AS trusted by the AAC and the second AS trusted by the REQ are two different ASs. The AS-AAC further includes a second acquisition portion, a third verification portion, a second generation portion, a second sending portion, a second receiving portion, a fourth verification portion, and a third generation portion.

The second acquisition portion is configured to acquire the digital certificate of the AAC and the second protection nonce that are obtained by using the private key corresponding to the encryption certificate to decrypt the identity information ciphertext of the AAC.

The third verification portion is configured to perform legality verification on the digital certificate of the AAC, so as to obtain the first verification result.

The second generation portion is configured to generate the first authentication result information according to the information including the first verification result, encrypt the information including the first authentication result information by using the second protection nonce, so as to generate the first authentication result information ciphertext, and generate a third digital signature by performing calculation on to-be-signed data including the first authentication result information ciphertext and the identity information ciphertext of the REQ.

The second sending portion is configured to send a second authentication request message to the second AS. The second authentication request message includes the first authentication result information ciphertext, the identity information ciphertext of the REQ and the third digital signature.

The second receiving portion is configured to receive a second authentication response message sent by the second AS. The second authentication response message includes the first authentication result information ciphertext, the first digital signature, the second authentication result information ciphertext and a fourth digital signature, and the fourth digital signature is a digital signature generated by performing, by the second AS, calculation on the to-be-signed data including the second authentication result information ciphertext.

The fourth verification portion is configured to verify the fourth digital signature by using a public key of the AS-REQ.

The third generation portion is configured to, when the verification of the fourth digital signature is successful, perform calculation on the to-be-signed data including the second authentication result information ciphertext to generate the second digital signature, and generate the first authentication response message according to the first authentication result information ciphertext, the first digital signature, the second authentication result information ciphertext and the second digital signature.

In some implementations, the message sent to the AAC by the AS-AAC further includes a hash value calculated by the AS-AAC for the received latest preceding message sent by the AAC; and the message sent to the AS-REQ by the AS-AAC further includes a hash value calculated by the AS-AAC for the received latest preceding message sent by the AS-REQ.

Figure 14:
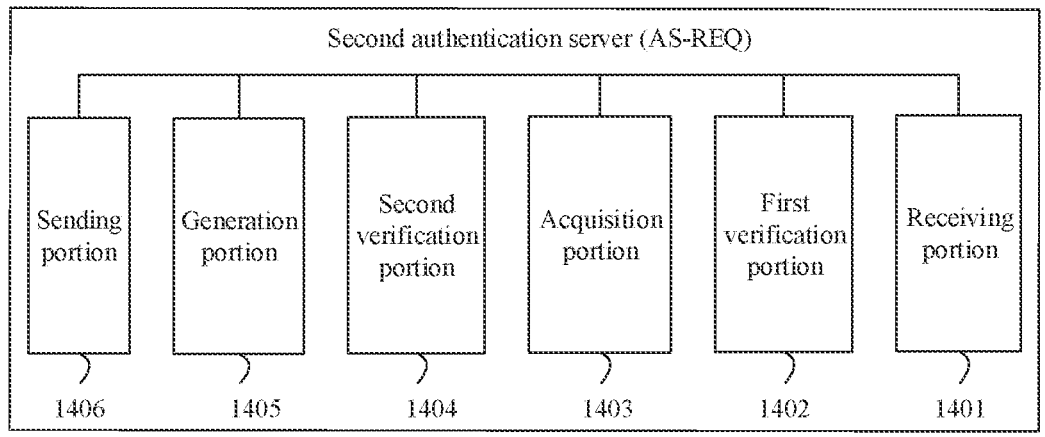
FIG. 14 is a structural block diagram of a second AS (AS-REQ) according to an embodiment of the present disclosure.

Referring to FIG. 14, an embodiment of the present disclosure further provides an AS-REQ. The AS-REQ is an AS trusted by an REQ. If a first AS trusted by an AAC and the second AS trusted by the REQ are two different ASs, the AS-REQ includes a receiving portion, a first verification portion, an acquisition portion, a second verification portion, a generation portion, and a sending portion.

The receiving portion 1401 is configured to receive a second authentication request message sent by the first AS. The second authentication request message includes first authentication result information ciphertext, identity information ciphertext of the REQ, and a third digital signature; and the third digital signature is a digital signature generated by performing, by the AS-AAC, calculation on to-be-signed data including the first authentication result information ciphertext and the identity information ciphertext of the REQ.

The first verification portion 1402 is configured to verify the third digital signature by using a public key of the first AS.

The acquisition portion 1403 is configured to, when the verification of the third digital signature is successful, acquire the digital certificate of the REQ and a first protection nonce that are obtained by using the private key corresponding to the encryption certificate to decrypt the identity information ciphertext of the REQ.

The second verification portion 1404 is configured to perform legality verification on the digital certificate of the REQ, so as to obtain a second verification result.

The generation portion 1405 is configured to generate second authentication result information according to information including the second verification result, generate the second authentication result information ciphertext by using the first protection nonce to encrypt the information including the second authentication result information, perform calculation on the to-be-signed data including the first authentication result information ciphertext to generate the first digital signature, and perform calculation on the to-be-signed data including the second authentication result information ciphertext to generate a fourth digital signature.

The sending portion 1406 is configured to send a second authentication response message to the first AS. The second authentication response message includes the first authentication result information ciphertext, the first digital signature, the second authentication result information ciphertext, and the fourth digital signature.

In some implementations, the message sent to the AS-AAC by the AS-REQ further includes a hash value calculated by the AS-REQ for the received latest preceding message sent by the AS-AAC.

Figure 15:
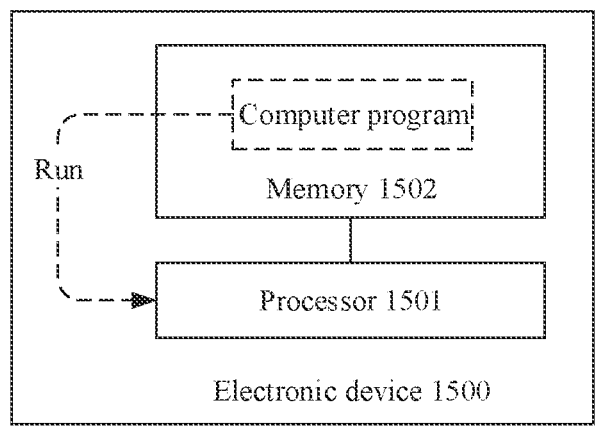
FIG. 15 is a schematic structural diagram of an electronic device according to an embodiment of the present disclosure.

FIG. 15 is a schematic structural diagram of an electronic device according to an embodiment of the present disclosure. As shown in FIG. 15, the electronic device 1500 may be the AAC, the REQ, the AS-AAC, or the AS-REQ. The electronic device 1500 includes a processor 1501 and a memory 1502. The memory 1502 is configured to store a computer program. The processor 1501 is configured to call and run the computer program stored in the memory 1502, so as to perform steps in any one of the above embodiments performed by the AAC, the REQ, the AS-AAC, or the AS-REQ. The processor 1501 and the memory 1502 of the electronic device 1500 may respectively be the processor 1501 and the memory 1502 of the AAC, the REQ, the AS-AAC, or the AS-REQ.

In combination with FIG. 15, the AAC, the REQ, the AS-AAC, or the AS-REQ is respectively exemplarily described below.

An embodiment of the present disclosure further provides an AAC. The AAC includes a processor and a memory. The memory is configured to store a computer program; and the processor is configured to call and run the computer program stored in the memory, so as to perform steps performed by the AAC in any one of the above embodiments.

It should be understood that, the AAC may implement corresponding flows implemented by the AAC in each method of the embodiments of the present disclosure. For simplicity, elaborations are omitted herein.

An embodiment of the present disclosure further provides an REQ. The REQ includes a processor and a memory. The memory is configured to store a computer program, and the processor is configured to call and run the computer program stored in the memory, so as to perform steps performed by the REQ in any one of the above embodiments.

It should be understood that, the REQ may implement corresponding flows implemented by the REQ in each method of the embodiments of the present disclosure. For simplicity, elaborations are omitted herein.

An embodiment of the present disclosure further provides an AS-AAC. The AS-AAC is an AS trusted by the AAC, and includes a processor and a memory. The memory is configured to store a computer program; and the processor is configured to call and run the computer program stored in the memory, so as to perform steps performed by the AS-AAC in any one of the above embodiments.

It should be understood that, the AS-AAC may implement corresponding flows implemented by the AS-AAC in each method of the embodiments of the present disclosure. For simplicity, elaborations are omitted herein.

An embodiment of the present disclosure further provides an AS-REQ. The AS-REQ is an AS trusted by the REQ. If the first AS trusted by the AAC and the second AS trusted by the REQ are two different ASs, the AS-REQ includes a processor and a memory. The memory is configured to store a computer program; and the processor is configured to call and run the computer program stored in the memory, so as to perform steps performed by the AS-REQ in any one of the above embodiments.

It should be understood that, the AS-REQ may implement corresponding flows implemented by the AS-REQ in each method of the embodiments of the present disclosure. For simplicity, elaborations are omitted herein.

It is to be noted that, the processor in the AAC, the REQ, the AS-AAC, or the AS-REQ in the embodiments of the present disclosure may further perform the method in other embodiments, for example, other methods in the above method embodiments, and the embodiments of the present disclosure are not limited thereto.

Figure 16:
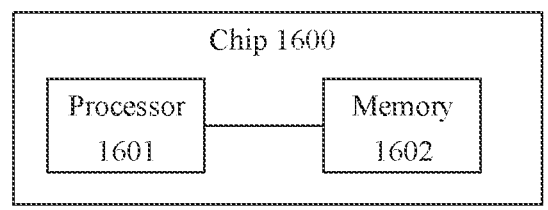
FIG. 16 is a schematic structural diagram of a chip according to an embodiment of the present disclosure.

FIG. 16 is a schematic structural diagram of a chip according to an embodiment of the present disclosure. As shown in FIG. 16, the chip 1600 includes a processor 1601 and a memory 1602. The processor 1601 is configured to call and run a computer program from a memory 1602, to enable an AAC having the chip 1600 mounted to perform steps performed by the AAC in any one of the above embodiments.

Or, the REQ having the chip 1600 mounted is enabled to perform steps performed by the REQ in any one of the above embodiments.

Or, the AS-AAC having the chip 1600 mounted is enabled to perform steps performed by the AS-AAC in any one of the above embodiments.

Or, the AS-REQ having the chip 1600 mounted is enabled to perform steps performed by the AS-REQ in any one of the above embodiments.

The memory 1602 may be included in the chip 1600, or the memory 1602 may be provided outside the chip 1600.

An embodiment of the present disclosure further provides a computer storage medium. The computer storage medium is configured to store a computer program. The computer program enables an AAC to perform steps performed by the AAC in any one of the above embodiments.

Or, the computer program enables an REQ having the chip mounted to perform steps performed by the REQ in any one of the above embodiments.

Or, the computer program enables an AS-AAC having the chip mounted to perform steps performed by the AS-AAC in any one of the above embodiments.

Or, the computer program enables an AS-REQ having the chip mounted to perform steps performed by the AS-REQ in any one of the above embodiments.

An embodiment of the present disclosure further provides a computer program. The computer program is configured to store a computer program. The computer program enables an AAC to perform steps performed by the AAC in any one of the above embodiments.

Or, the computer program enables an REQ having the chip mounted to perform steps performed by the REQ in any one of the above embodiments.

Or, the computer program enables an AS-AAC having the chip mounted to perform steps performed by the AS-AAC in any one of the above embodiments.

Or, the computer program enables an AS-REQ having the chip mounted to perform steps performed by the AS-REQ in any one of the above embodiments.

Those of ordinary skill in the art should know that all or part of the steps of the method embodiment may be implemented by related hardware instructed by means of a program, the program may be stored in a computer storage medium, and the program is performed to perform the steps of the method embodiment. The computer storage medium may be at least one of the following media; a Read-Only Memory (ROM), a Random Access Memory (RAM) and various media that can store program codes, such as a magnetic disk, or an optical disk.

Each component, the chip or the processor in the embodiments of the present disclosure may be an integrated circuit chip and has a signal processing capacity. During implementation, each step of the method embodiments may be completed by an integrated logical circuit of hardware in the processor or an instruction in a software form. Each component, the chip or the processor may include the integration of any one or at least two of the following: a general processor, an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a Graphics Processing Unit (GPU), a Neural-network Processing Unit (NPU), a controller, a microcontroller, a microprocessor, a programmable logic device, a discrete gate or transistor logic device, and a discrete hardware component.

It is to be noted that, each embodiment in this specification is described in a progressive manner, and reference may be made to each other for the same and similar parts among the various embodiments, and each embodiment focuses on the differences from other embodiments. In particular, for the device and system embodiments, since the device and system embodiments are consistent with and correspond to the method embodiments, the description is relatively simple, and for related parts, referen is made to the partial descriptions of the method embodiments. The above-described device and system embodiments are merely exemplary. The parts described as separate components may or may not be physically separated. The components displayed as parts may or may not be physical parts, that is, the components may be located in one place, or may be distributed on the plurality of network parts. Part or all of the modules may be selected according to actual requirements to achieve the purposes of the solutions of this embodiment. It can be understood and implemented by those of ordinary skill in the art without creative labor.

The above is only the exemplary implementations of the present disclosure and not intended to limit the scope of protection of the present disclosure. Any variations or replacements apparent to those skilled in the art within the technical scope disclosed by the present disclosure shall fall within the scope of protection of the present disclosure. Therefore, the protection scope of the present disclosure shall be subject to the protection scope of the claims.

INDUSTRIAL APPLICABILITY

The embodiments of the present disclosure disclose the identity authentication method and apparatus, and the device, the chip, the storage medium and the program. By means of performing confidential processing on identify information of the REQ and the AAC, the identify information of the REQ and the AAC may be prevented from being exposed during a transmission process. In addition, when the first verification result of the digital certificate of the AAC and the second verification result of the digital certificate of the REQ are transmitted between the first AS and the AAC, and between the AAC and the REQ, the first verification result and the second verification result may be prevented from being exposed during transmission by performing confidential processing on the first verification result and the second verification result. Therefore, during the process that the REQ accesses a network through the AAC, it is ensured that the attacker cannot obtain private and sensitive information. Moreover, by means of involving an AS, real-time MIA between the REQ and the AAC is achieved while the confidentiality of entity identity related information is guaranteed, such that the foundation that only a legitimate user can communicate with a legitimate network is laid.

The invention claimed is:

1. An identity authentication method, comprising:
acquiring, by an Authentication Access Controller (AAC), an identity ciphertext message sent by a Requester (REQ), wherein the identity ciphertext message comprises identity information ciphertext of the REQ, and the identity information ciphertext of the REQ is generated by using a public key of an encryption certificate to encrypt to-be-encrypted data comprising a digital certificate of the REQ and a first protection nonce;
sending, by the AAC, a first authentication request message to a first Authentication Server (AS) trusted by the AAC, wherein the first authentication request message comprises identity information ciphertext of the REQ and identity information ciphertext of the AAC, and the identity information ciphertext of the AAC is generated by using the public key of the encryption certificate to encrypt to-be-encrypted data comprising a digital certificate of the AAC and a second protection nonce;
receiving, by the AAC, a first authentication response message sent by the first AS, wherein the first authentication response message comprises first authentication result information ciphertext, a first digital signature, second authentication result information ciphertext and a second digital signature, and wherein the first authentication result information ciphertext is generated by using the second protection nonce to encrypt information comprising first authentication result information, the first authentication result information comprises a first verification result for the digital certificate of the AAC, the first digital signature is a digital signature generated by performing, by a second AS trusted by the REQ, calculation on to-be-signed data comprising the first authentication result information ciphertext, the second authentication result information ciphertext is generated by using the first protection nonce to encrypt information comprising second authentication result information, the second authentication result information comprises a second verification result for the digital certificate of the REQ, and the second digital signature is a digital signature generated by performing, by the first AS, calculation on to-be-signed data comprising the second authentication result information ciphertext;
verifying, by the AAC, the second digital signature by using a public key of the first AS;
when the verification of the second digital signature is successful, sending, by the AAC, a third authentication response message to the REQ, wherein the third authentication response message comprises authentication result information ciphertext, and the authentication result information ciphertext is generated by using a message encryption key to encrypt to-be-encrypted data comprising the first authentication result information ciphertext, the first digital signature and the second protection nonce;

decrypting, by the REQ, the authentication result information ciphertext by using the message encryption key, so as to obtain the first authentication result information ciphertext, the first digital signature and the second protection nonce;

verifying, by the REQ, the first digital signature by using a public key of the second AS, and if the verification is successful, decrypting, by the REQ, the first authentication result information ciphertext by using the second protection nonce, so as to obtain the first authentication result information, determining an identity authentication result of the AAC according to the first verification result in the first authentication result information, and when the REQ determines that the identity authentication result of the AAC is legal, sending a fourth authentication response message to the AAC; or verifying, by the REQ, the first digital signature by using the public key of the second AS, and if the verification is successful, sending, by the REQ, the fourth authentication response message to the AAC, decrypting the first authentication result information ciphertext by using the second protection nonce, so as to obtain the first authentication result information, and determining the identity authentication result of the AAC according to the first verification result in the first authentication result information; or verifying, by the REQ, the first digital signature by using the public key of the second AS, and if the verification of the first digital signature is successful, decrypting, by the REQ, the first authentication result information ciphertext by using the second protection nonce, so as to obtain the first authentication result information, determining the identity authentication result of the AAC according to the first verification result in the first authentication result information, and sending, by the REQ, the fourth authentication response message to the AAC, wherein the fourth authentication response message comprises first protection nonce ciphertext, and the first protection nonce ciphertext is obtained by using the message encryption key to encrypt information including the first protection nonce; and after receiving the fourth authentication response message, decrypting, by the AAC, the first protection nonce ciphertext by using the message encryption key, so as to obtain the first protection nonce, decrypt the second authentication result information ciphertext by using the first protection nonce, so as to obtain the second authentication result information, and determining an identity authentication result of the REQ according to the second verification result in the second authentication result information.

2. The method of claim 1, further comprising: before acquiring, by the AAC, the identity ciphertext message sent by the REQ, sending, by the AAC, a key request message to the REQ, wherein the key request message comprises a key exchange parameter of the AAC;

performing, by the REQ, key exchange calculation according to information comprising a temporary private key corresponding to a key exchange parameter of the REQ and a temporary public key comprised by the key exchange parameter of the AAC, so as to generate a first key, and calculating the message encryption key according to information comprising the first key by using a key derivation algorithm, accordingly, the identity ciphertext message further comprises a key exchange parameter of the REQ; and performing, by the AAC, key exchange calculation according to information comprising a temporary private key corresponding to the key exchange parameter of the AAC and a temporary public key comprised by the key exchange parameter of the REQ, so as to generate the first key, and calculating the message encryption key according to the information comprising the first key by using the key derivation algorithm.

3. The method of claim 2, wherein the key request message further comprises a first nonce generated by the AAC, calculating, by the REQ, the message encryption key further comprises:

calculating, by the REQ, the message encryption key according to information comprising the first key, the first nonce and a second nonce generated by the REQ; and correspondingly, the identity ciphertext message further comprises the second nonce, calculating, by the AAC, the message encryption key further comprises:

calculating, by the AAC, the message encryption key according to the information comprising the first key, the first nonce and the second nonce.

4. The method of claim 3, wherein the identity ciphertext message further comprises the first nonce; and before calculating, by the AAC, the message encryption key, the method further comprises:

verifying, by the AAC, consistency between the first nonce in the identity ciphertext message and the first nonce generated by the AAC; and if the verification is successful, calculating, by the AAC, the message encryption key.

5. The method of claim 2, wherein the key request message further comprises security capability parameter information supported by the AAC; and the method further comprises:

determining, by the REQ according to the security capability parameter information, a specific security policy used by the REQ, wherein the identity ciphertext message further comprises the specific security policy.

6. The method of claim 2, wherein the key request message further comprises an identity identifier of at least one AS trusted by the AAC, and the method further comprises:

determining, by the REQ according to the identity identifier of at least one AS trusted by the AAC, an identity identifier of at least one AS trusted by the REQ; and the identity ciphertext message further comprises the identity identifier of at least one AS trusted by the REQ, and the method further comprises:

determining, by the AAC, the first AS according to the identity identifier of at least one AS trusted by the REQ in the identity ciphertext message and the identity identifier of at least one AS trusted by the AAC in the key request message.

7. The method of claim 2, wherein:
the third authentication response message further comprises a first message integrity check code, wherein the first message integrity check code is generated by using, by the AAC, a message integrity check key to perform calculation on information comprising fields in the third authentication response message other than the first message integrity check code, and a manner of generating the message integrity check key of the AAC is the same as a manner of generating the message encryption key of the AAC; and the method further comprises:
verifying, by the REQ, the first message integrity check code, and if the verification is successful, then performing, by the REQ, the step of determining the identity authentication result of the AAC according to the first verification result; and/or
the fourth authentication response message further comprises a second message integrity check code, the second message integrity check code is generated by using, by the REQ, a message integrity check key to perform calculation on information comprising fields in the fourth authentication response message other than the second message integrity check code, and a manner of generating the message integrity check key of the REQ is the same as a manner of generating the message encryption key of the REQ; and the method further comprises:
verifying, by the AAC, the second message integrity check code, and if the verification is successful, then performing, by the AAC, the step of determining the identity authentication result of the REQ.

8. The method of claim 1, wherein the identity ciphertext message further comprises an identity identifier of at least one AS trusted by the REQ, and the method further comprises:
determining, by the AAC, the first AS according to the identity identifier of at least one AS trusted by the REQ and an identity identifier of at least one AS trusted by the AAC.

9. The method of claim 1, wherein to-be-encrypted data of the identity information ciphertext of the REQ further comprises an identity identifier of the REQ and a third protection nonce;
to-be-encrypted data of the identity information ciphertext of the AAC further comprises the identity identifier of the AAC and a fourth protection nonce;
correspondingly, the first authentication response message further comprises identity identifier ciphertext of the REQ and identity identifier ciphertext of the AAC, the identity identifier ciphertext of the REQ is generated by using the third protection nonce to encrypt information comprising the identity identifier of the REQ, and the identity identifier ciphertext of the AAC is generated by using the fourth protection nonce to encrypt information comprising the identity identifier of the AAC;
to-be-encrypted data of the authentication result information ciphertext in the third authentication response message further comprises the identity identifier ciphertext of the REQ, and
before the REQ determines the identity authentication result of the AAC, the method further comprises:
decrypting, by the REQ, the authentication result information ciphertext by using the message encryption key, so as to obtain the identity identifier ciphertext of the REQ, verifying the identity identifier ciphertext of the REQ according to the identity identifier of the REQ and the third protection nonce, and after the verification is successful, then determining the identity authentication result of the AAC; and
before the AAC determines the identity authentication result of the REQ, the method further comprises:
verifying, by the AAC, the identity identifier ciphertext of the AAC according to the identity identifier of the AAC and the fourth protection nonce, and after the verification is successful, then determining the identity authentication result of the REQ.

10. The method of 1, wherein the identity ciphertext message further comprises a digital signature of the REQ; and before the AAC determines the identity authentication result of the REQ, the method further comprises:
determining, by the AAC, whether the verification of the digital signature of the REQ is successful; and if it is determined that the verification of the digital signature of the REQ is successful, then determining, by the AAC, the identity authentication result of the REQ according to the second verification result.

11. The method of claim 10, wherein determining, by the AAC, whether the verification of the digital signature of the REQ is successful comprises:
if the second authentication result information that is obtained by using, by the AAC, the first protection nonce to decrypt the second authentication result information ciphertext further comprises the digital certificate of the REQ, verifying, by the AAC, the digital signature of the REQ by using the digital certificate of the REQ, and determining, according to a verification result, whether the verification of the digital signature of the REQ is successful; or
verifying, by the second AS, the digital signature of the REQ by using the digital certificate of the REQ that is obtained by decrypting the identity information ciphertext of the REQ, and if the AAC receives the first authentication response message, determining that the verification of the digital signature of the REQ has been successful.

12. The method of claim 1, wherein the fourth authentication response message further comprises a digital signature of the REQ, and the second authentication result information that is obtained by using, by the AAC, the first protection nonce to decrypt the second authentication result information ciphertext further comprises the digital certificate of the REQ; and before the AAC determines the identity authentication result of the REQ, the method further comprises:
verifying, by the AAC, the digital signature of the REQ by using the digital certificate of the REQ in the second authentication result information, and if it is determined that the verification of the digital signature of the REQ is successful, then determining, by the AAC, the identity authentication result of the REQ according to the second verification result.

13. The method of claim 1, further comprising: before determining, by the REQ, the identity authentication result of the AAC,
determining, by the REQ, whether verification of the digital signature of the AAC is successful; and if it is determined that the verification of the digital signature of the AAC is successful, then determining, by the REQ, the identity authentication result of the AAC according to the first verification result.

14. The method of claim 13, wherein determining, by the REQ, whether the verification of the digital signature of the AAC is successful comprises:
  when the first authentication request message further comprises the digital signature of the AAC, verifying, by the first AS, the digital signature of the AAC by using the digital certificate of the AAC that is obtained by decrypting the identity information ciphertext of the AAC, and if the REQ receives the third authentication response message, determining, by the REQ, that the verification of the digital signature of the AAC has been successful; or
  when the third authentication response message further comprises the digital signature of the AAC, if the first authentication result information obtained by decrypting, by the REQ, the first authentication result information ciphertext further comprises the digital certificate of the AAC, verifying, by the REQ, the digital signature of the AAC by using the digital certificate of the AAC in the first authentication result information, and determining, according to a verification result, whether the verification of the digital signature of the AAC is successful.

15. The method of claim 1, wherein the first AS trusted by the AAC and the second AS trusted by the REQ are the same AS; and before the first AS sends the first authentication response message, the method further comprises:
  acquiring, by the first AS, the digital certificate of the REQ, the first protection nonce, the digital certificate of the AAC and the second protection nonce that are obtained by using the private key corresponding to the encryption certificate to decrypt the identity information ciphertext of the REQ and the identity information ciphertext of the AAC; and
  performing, by the first AS, legality verification on the digital certificate of the AAC, so as to obtain the first verification result, performing legality verification on the digital certificate of the REQ, so as to obtain the second verification result, generating the first authentication result information according to information comprising the first verification result, encrypting the information comprising the first authentication result information by using the second protection nonce, so as to generate the first authentication result information ciphertext, generating the second authentication result information according to information comprising the second verification result, encrypting the information comprising the second authentication result information by using the first protection nonce, so as to generate the second authentication result information ciphertext, performing calculation on the to-be-signed data comprising the first authentication result information ciphertext to generate the first digital signature, performing calculation on the to-be-signed data comprising the second authentication result information ciphertext to generate the second digital signature, and generating the first authentication response message according to information comprising the first authentication result information ciphertext, the first digital signature, the second authentication result information ciphertext and the second digital signature.

16. The method of claim 1, wherein the first AS trusted by the AAC and the second AS trusted by the REQ are two different ASs; and before the first AS sends the first authentication response message, the method further comprises:
  acquiring, by the first AS, the digital certificate of the AAC and the second protection nonce that are obtained by using the private key corresponding to the encryption certificate to decrypt the identity information ciphertext of the AAC, performing legality verification on the digital certificate of the AAC, so as to obtain the first verification result, generating the first authentication result information according to the information comprising the first verification result, encrypting the information comprising the first authentication result information by using the second protection nonce, so as to generate the first authentication result information ciphertext, and performing calculation on to-be-signed data comprising the first authentication result information ciphertext and the identity information ciphertext of the REQ to generate a third digital signature;
  sending, by the first AS, a second authentication request message to the second AS, wherein the second authentication request message comprises the first authentication result information ciphertext, the identity information ciphertext of the REQ and the third digital signature; and verifying, the second AS, the third digital signature by using the public key of the first AS, after the verification is successful, performing legality verification on the digital certificate of the REQ that is obtained by using the private key corresponding to the encryption certificate to decrypt the identity information ciphertext of the REQ, so as to obtain the second verification result, generating the second authentication result information according to the information comprising the second verification result, then encrypting the information comprising the second authentication result information by using the first protection nonce that is obtained by decrypting the identity information ciphertext of the REQ, so as to generate the second authentication result information ciphertext, performing calculation on the to-be-signed data comprising the first authentication result information ciphertext to generate the first digital signature, and performing calculation on the to-be-signed data comprising the second authentication result information ciphertext to generate a fourth digital signature;
  receiving, by the first AS, a second authentication response message sent by the second AS, wherein the second authentication response message comprises the first authentication result information ciphertext, the first digital signature, the second authentication result information ciphertext and the fourth digital signature; and
  verifying, by the first AS, the fourth digital signature by using the public key of the second AS; and if the verification is successful, performing, by the first AS, calculation on the to-be-signed data comprising the second authentication result information ciphertext to generate the second digital signature, and generating the first authentication response message according to the first authentication result information ciphertext, the first digital signature, the second authentication result information ciphertext and the second digital signature.

17. The method of claim 1, wherein the message sent to the AAC by the REQ further comprises a hash value calculated by the REQ for a received latest preceding message sent by the AAC,
  when receiving the message sent by the REQ, the AAC first verifies the hash value in the received message, and then performs follow-up operations after the verification is successful;

the message sent to the REQ by the AAC further comprises a hash value calculated by the AAC for a received latest preceding message sent by the REQ, when receiving the message sent by the AAC, the REQ first verifies the hash value in the received message, and then performs follow-up operations after the verification is successful;

the message sent to the first AS by the AAC further comprises a hash value calculated by the AAC for a received latest preceding message sent by the first AS, when receiving the message sent by the AAC, the first AS first verifies the hash value in the received message, and then performs follow-up operations after the verification is successful;

the message sent to the AAC by the first AS further comprises a hash value calculated by the first AS for the received latest preceding message sent by the AAC, when receiving the message sent by the first AS, the AAC first verifies the hash value in the received message, and then performs follow-up operations after the verification is successful;

the message sent to the second AS by the first AS further comprises a hash value calculated by the first AS for a received latest preceding message sent by the second AS, when receiving the message sent by the first AS, the second AS first verifies the hash value in the received message, and then performs follow-up operations after the verification is successful; and the message sent to the first AS by the second AS further comprises a hash value calculated by the second AS for the received latest preceding message sent by the first AS, when receiving the message sent by the second AS, the first AS first verifies the hash value in the received message, and then performs follow-up operations after the verification is successful.

18. An Authentication Access Controller (AAC), comprising:

a memory storing processor-executable instructions; and a processor configured to execute the stored processor-executable instructions to perform operations of:

acquiring an identity ciphertext message sent by a Requester (REQ), wherein the identity ciphertext message comprises identity information ciphertext of the REQ, and the identity information ciphertext of the REQ is generated by using a public key of an encryption certificate to encrypt to-be-encrypted data comprising a digital certificate of the REQ and a first protection nonce;

sending a first authentication request message to a first Authentication Server (AS) trusted by the AAC, wherein the first authentication request message comprises identity information ciphertext of the REQ and identity information ciphertext of the AAC, and the identity information ciphertext of the AAC is generated by using the public key of the encryption certificate to encrypt to-be-encrypted data comprising a digital certificate of the AAC and a second protection nonce;

receiving a first authentication response message sent by the first AS, wherein the first authentication response message comprises first authentication result information ciphertext, a first digital signature, second authentication result information ciphertext and a second digital signature, and wherein the first authentication result information ciphertext is generated by using the second protection nonce to encrypt information comprising first authentication result information, the first authentication result information comprises a first verification result for the digital certificate of the AAC, the first digital signature is generated by performing, by a second AS, calculation on to-be-signed data comprising the first authentication result information ciphertext, the second authentication result information ciphertext is generated by using the first protection nonce to encrypt information comprising second authentication result information, the second authentication result information comprises a second verification result for the digital certificate of the REQ, and the second digital signature is generated by performing, by the first AS, calculation on to-be-signed data comprising the second authentication result information ciphertext;

verifying the second digital signature by using a public key of the first AS;

when the verification of the second digital signature is successful, sending a third authentication response message to the REQ, wherein the third authentication response message comprises authentication result information ciphertext, and the authentication result information ciphertext is generated by using a message encryption key to encrypt to-be-encrypted data comprising the first authentication result information ciphertext, the first digital signature and the second protection nonce;

receiving a fourth authentication response message sent by the REQ, wherein the fourth authentication response message comprises first protection nonce ciphertext, and the first protection nonce ciphertext is obtained by using the message encryption key to encrypt information including the first protection nonce;

decrypting the first protection nonce ciphertext by using the message encryption key, so as to obtain the first protection nonce, and decrypting the second authentication result information ciphertext by using the first protection nonce, so as to obtain the second authentication result information; and determining an identity authentication result of the REQ according to the second verification result in the second authentication result information.

19. A Requester (REQ), comprising:

a memory storing processor-executable instructions; and a processor configured to execute the stored processor-executable instructions to perform operations of:

sending an identity ciphertext message to an Authentication Access Controller (AAC), wherein the identity ciphertext message comprises identity information ciphertext of the REQ, and the identity information ciphertext of the REQ is generated by using a public key of an encryption certificate to encrypt to-be-encrypted data comprising a digital certificate of the REQ and a first protection nonce;

receiving a third authentication response message sent by the AAC, wherein the third authentication response message comprises authentication result information ciphertext; the authentication result information ciphertext is generated by using a message encryption key to encrypt to-be-encrypted data comprising first authentication result information ciphertext, a first digital signature and a second protection nonce; the first authentication result information ciphertext is generated by using the second protection nonce to encrypt information including first authentication result information, the first authentication result information includes a first verification result for a digital certificate of the AAC, and the first digital signature is a digital signature generated by performing, by an Authentication Server (AS) trusted by the REQ, calculation on to-be-signed data comprising the first authentication result information ciphertext;

decrypting the authentication result information ciphertext by using the message encryption key, so as to obtain the first authentication result information ciphertext, the first digital signature and the second protection nonce;

verifying the first digital signature by using a public key of the AS, wherein if the verification is successful, the first decryption portion decrypts the first authentication result information ciphertext by using the second protection nonce, so as to obtain the first authentication result information, a first determination portion determines an identity authentication result of the AAC according to the first verification result in the first authentication result information, and when the first determination portion determines that the identity authentication result of the AAC is legal, a second sending portion sends a fourth authentication response message to the AAC, or verifying the first digital signature by using the public key of the AS, wherein if the verification is successful, the second sending portion sends the fourth authentication response message to the AAC, the first decryption portion decrypts the first authentication result information ciphertext by using the second protection nonce, so as to obtain the first authentication result information, and the first determination portion determines the identity authentication result of the AAC according to the first verification result in the first authentication result information, or verifying the first digital signature by using the public key of the AS, wherein if the verification of the first digital signature is successful, the first decryption portion decrypts the first authentication result information ciphertext by using the second protection nonce, so as to obtain the first authentication result information, the first determination portion determines the identity authentication result of the AAC according to the first verification result in the first authentication result information, and the second sending portion sends the fourth authentication response message to the AAC, wherein the fourth authentication response message comprises first protection nonce ciphertext, and the first protection nonce ciphertext is obtained by using the message encryption key to encrypt information comprising the first protection nonce.

20. A first Authentication Server (AS), being an AS trusted by an Authentication Access Controller (AAC), and comprising:

a memory storing processor-executable instructions; and
a processor configured to execute the stored processor-executable instructions to perform operations of:
receiving a first authentication request message sent by the AAC, wherein the first authentication request message comprises identity information ciphertext of a Requester (REQ) and identity information ciphertext of the AAC, and the identity information ciphertext of the AAC is generated by using a public key of an encryption certificate to encrypt to-be-encrypted data comprising a digital certificate of the AAC and a second protection nonce, and the identity information ciphertext of the REQ is generated by using the public key of the encryption certificate to encrypt to-be-encrypted data comprising a digital certificate of the REQ and a first protection nonce; and sending a first authentication response message to the AAC, wherein the first authentication response message comprises first authentication result information ciphertext, a first digital signature, second authentication result information ciphertext and a second digital signature, the first authentication result information ciphertext is generated by using the second protection nonce to encrypt information comprising first authentication result information, the first authentication result information comprises a first verification result for the digital certificate of the AAC, the first digital signature is a digital signature generated by performing, by a second AS trusted by the REQ, calculation on to-be-signed data comprising the first authentication result information ciphertext, the second authentication result information ciphertext is generated by using the first protection nonce to encrypt information comprising second authentication result information, the second authentication result information comprises a second verification result for the digital certificate of the REQ, and the second digital signature is a digital signature generated by performing, by the first AS, calculation on to-be-signed data comprising the second authentication result information ciphertext.

21. A second Authentication Server (AS), being an AS trusted by a Requester (REQ), wherein if a first AS trusted by an Authentication Access Controller (AAC) and the second AS trusted by the REQ are two different ASs, the second AS comprises:

a memory storing processor-executable instructions; and
a processor configured to execute the stored processor-executable instructions to perform operations of:
receiving a second authentication request message sent by the first AS, wherein the second authentication request message comprises first authentication result information ciphertext, identity information ciphertext of the REQ, and a third digital signature; and the third digital signature is a digital signature generated by performing, by the first AS, calculation on to-be-signed data including the first authentication result information ciphertext and the identity information ciphertext of the REQ;

verifying the third digital signature by using a public key of the first AS;

when the verification of the third digital signature is successful, acquiring the digital certificate of the REQ and a first protection nonce that are obtained by using the private key corresponding to the encryption certificate to decrypt the identity information ciphertext of the REQ;

performing legality verification on the digital certificate of the REQ, so as to obtain a second verification result;

generating second authentication result information according to information including the second verification result, generating the second authentication result information ciphertext by using the first protection nonce to encrypt the information comprising the second authentication result information, performing calculation on the to-be-signed data including the first authentication result information ciphertext to generate the first digital signature, and performing calculation on the to-be-signed data comprising the second authentication result information ciphertext to generate a fourth digital signature; and sending a second authentication response message to the first AS, with the second authentication response message including the first authentication result information ciphertext, the first digital signature, the second authentication result information ciphertext, and the fourth digital signature.

* * * * *